United States Patent
Abdelmonem

(10) Patent No.: US 11,985,692 B2
(45) Date of Patent: May 14, 2024

(54) METHOD AND SYSTEM FOR ANTENNA INTEGRATED RADIO (AIR) DOWNLINK AND UPLINK BEAM POLARIZATION ADAPTATION

(71) Applicant: ISCO International, LLC, Schaumburg, IL (US)

(72) Inventor: Amr Abdelmonem, Northbrook, IL (US)

(73) Assignee: ISCO International, LLC, Schaumburg, IL (US)

( * ) Notice: Subject to any disclaimer, the term of this patent is extended or adjusted under 35 U.S.C. 154(b) by 0 days.

(21) Appl. No.: 18/315,951

(22) Filed: May 11, 2023

(65) Prior Publication Data
US 2024/0129945 A1    Apr. 18, 2024

Related U.S. Application Data

(60) Provisional application No. 63/416,876, filed on Oct. 17, 2022.

(51) Int. Cl.
*H04W 72/541* (2023.01)
*H04B 7/06* (2006.01)
*H04B 7/10* (2017.01)
*H04B 7/0426* (2017.01)

(52) U.S. Cl.
CPC ........ *H04W 72/541* (2023.01); *H04B 7/0617* (2013.01); *H04B 7/0695* (2013.01); *H04B 7/10* (2013.01); *H04B 7/0426* (2013.01)

(58) Field of Classification Search
CPC ...... H04B 7/0617; H04B 7/0695; H04B 7/10; H04B 7/0426; H04W 72/541
See application file for complete search history.

(56) References Cited

U.S. PATENT DOCUMENTS

| | | |
|---|---|---|
| 2,605,413 A | 7/1952 | Alvarez |
| 2,978,702 A | 4/1961 | Pakan |
| 3,093,824 A | 6/1963 | Ammerman |
| 3,656,166 A | 4/1972 | Klopach et al. |
| 3,718,935 A | 2/1973 | Ranghelli et al. |
| 3,827,051 A | 7/1974 | Foldes |

(Continued)

FOREIGN PATENT DOCUMENTS

| | | |
|---|---|---|
| CN | 1864302 A | 11/2006 |
| CN | 202523820 U | 11/2012 |

(Continued)

OTHER PUBLICATIONS

International Search Report & Written Opinion for PCT/US2023/015540 dated Jun. 14, 2023, 15 pp.

(Continued)

*Primary Examiner* — Fred A Casca
(74) *Attorney, Agent, or Firm* — Guntin & Gust, PLC; Kenneth S. Kwan

(57) ABSTRACT

Aspects of the subject disclosure may include, for example, detecting received signals (in an antenna integrated radio (AIR)) associated with multiple beams in a communications system, and performing action(s), such as polarization adjusting and/or signal conditioning, resulting in improved signal to noise ratio and mitigation/cancellation of interference impacting the beams. Other embodiments are disclosed.

20 Claims, 33 Drawing Sheets

(56) References Cited

U.S. PATENT DOCUMENTS

| | | |
|---|---|---|
| 4,222,017 A | 9/1980 | Foldes |
| 4,434,426 A | 2/1984 | Gaglione et al. |
| 4,723,321 A | 2/1988 | Saleh |
| 5,015,053 A | 5/1991 | Johnson |
| 5,068,667 A | 11/1991 | Mizoguchi |
| 5,929,820 A | 7/1999 | Caulfield et al. |
| 5,940,044 A | 8/1999 | Smith |
| 6,072,439 A | 6/2000 | Ippolito et al. |
| 6,111,542 A | 8/2000 | Day et al. |
| 6,201,801 B1 | 3/2001 | Dent |
| 6,310,585 B1 | 10/2001 | Marino |
| 6,380,903 B1 | 4/2002 | Hayes et al. |
| 6,621,465 B2 | 9/2003 | Teillet et al. |
| 6,631,277 B2 | 10/2003 | Berg et al. |
| 6,703,974 B2 | 3/2004 | White et al. |
| 6,704,557 B1 | 3/2004 | Krishnamurthy et al. |
| 6,717,555 B2 | 4/2004 | Teillet et al. |
| 6,801,160 B2 | 10/2004 | Henderson et al. |
| 6,801,790 B2 | 10/2004 | Rudrapatna |
| 6,960,650 B2 | 11/2005 | Pulst et al. |
| 6,998,908 B1 | 2/2006 | Sternowski |
| 7,023,398 B2 | 4/2006 | Gottl et al. |
| 7,123,194 B2 | 10/2006 | Park et al. |
| 7,196,674 B2 | 3/2007 | Timofeev et al. |
| 7,346,134 B2 | 3/2008 | Smith |
| 7,365,695 B2 | 4/2008 | Thomas et al. |
| 8,023,984 B2 | 9/2011 | Jin et al. |
| 8,072,384 B2 | 12/2011 | Morrow |
| 8,134,511 B2 | 3/2012 | Koh et al. |
| 8,238,318 B1 | 8/2012 | Negus |
| 8,289,218 B2 | 10/2012 | Payne |
| 8,954,023 B2 | 2/2015 | Hillstrom et al. |
| 8,976,072 B2 | 3/2015 | Lenormand et al. |
| 9,219,508 B1 | 12/2015 | Veysoglu et al. |
| 9,271,185 B2 | 2/2016 | Abdelmonem et al. |
| 9,313,680 B2 | 4/2016 | Galeev et al. |
| 9,472,852 B2 | 10/2016 | Oshea et al. |
| 9,531,482 B2 | 12/2016 | Sobczak et al. |
| 9,548,775 B2 | 1/2017 | Smith |
| 9,571,176 B2 | 2/2017 | Desclos et al. |
| 9,590,313 B2 | 3/2017 | Jan et al. |
| 9,712,259 B2 | 7/2017 | Sobczak et al. |
| 9,762,297 B2 | 9/2017 | Lee et al. |
| 9,800,355 B1 | 10/2017 | Lee et al. |
| 9,806,413 B1 | 10/2017 | Chukka et al. |
| 9,847,571 B2 | 12/2017 | Bit-Babik et al. |
| 9,887,467 B2 | 2/2018 | Aryanfar |
| 9,929,886 B2 | 3/2018 | Amadjikpe et al. |
| 9,960,500 B2 | 5/2018 | Song et al. |
| 9,972,918 B2 | 5/2018 | Lin et al. |
| 10,027,036 B2 | 7/2018 | Schmidt et al. |
| 10,056,675 B1 | 8/2018 | Dybdal |
| 10,116,048 B2 | 10/2018 | Mielke et al. |
| 10,454,185 B1 | 10/2019 | Moran et al. |
| 10,468,781 B1 | 11/2019 | Paulsen et al. |
| 10,530,033 B2 | 1/2020 | Moriguchi |
| 10,581,163 B2 | 3/2020 | Schmutzler et al. |
| 10,608,859 B2 | 3/2020 | Matitsine et al. |
| 10,652,835 B2 | 5/2020 | Tacconi et al. |
| 10,777,894 B2 | 9/2020 | Mcmichael |
| 10,862,518 B1 | 12/2020 | Labadie et al. |
| 10,868,350 B2 | 12/2020 | Oppenlaender et al. |
| 10,868,609 B1 | 12/2020 | Kossin et al. |
| 10,958,312 B2 | 3/2021 | Pollman et al. |
| 10,971,815 B1 | 4/2021 | West et al. |
| 11,025,472 B2 | 6/2021 | Matitsine et al. |
| 11,038,549 B1 | 6/2021 | Harley et al. |
| 11,158,956 B2 | 10/2021 | Le |
| 11,177,582 B2 | 11/2021 | Seo |
| 11,239,886 B2 | 2/2022 | Pollman et al. |
| 11,289,799 B2 | 3/2022 | Everest et al. |
| 11,296,429 B2 | 4/2022 | Biancotto et al. |
| 11,316,258 B2 | 4/2022 | Junttila |
| 11,329,387 B2 | 5/2022 | Da Silveira et al. |
| 11,336,028 B2 | 5/2022 | Shen et al. |
| 11,342,668 B2 | 5/2022 | Chen et al. |
| 11,349,530 B2 | 5/2022 | Frenger et al. |
| 11,349,581 B1 | 5/2022 | Dybdal et al. |
| 11,360,396 B2 | 6/2022 | Bauerschmidt et al. |
| 11,363,678 B2 | 6/2022 | Rosenschild et al. |
| 11,411,323 B2 | 8/2022 | Wu et al. |
| 11,437,701 B2 | 9/2022 | Rai et al. |
| 11,451,274 B2 | 9/2022 | El-Keyi et al. |
| 11,509,071 B1 | 11/2022 | Abdelmonem et al. |
| 11,509,072 B1 | 11/2022 | Abdelmonem et al. |
| 11,515,652 B1 | 11/2022 | Abdelmonem et al. |
| 11,594,821 B1 | 2/2023 | Abdelmonem et al. |
| 11,600,920 B2 | 3/2023 | Udagave |
| 11,626,667 B1 | 4/2023 | Abdelmonem et al. |
| 11,670,847 B1 | 6/2023 | Abdelmonem et al. |
| 11,705,940 B2 | 7/2023 | Abdelmonem et al. |
| 2002/0193071 A1 | 12/2002 | Waltho |
| 2003/0162566 A1 | 8/2003 | Shapira et al. |
| 2004/0082335 A1 | 4/2004 | Hirayama et al. |
| 2004/0106436 A1 | 6/2004 | Ochi et al. |
| 2005/0226353 A1 | 10/2005 | Gebara et al. |
| 2005/0239403 A1 | 10/2005 | Karabinis |
| 2006/0014491 A1 | 1/2006 | Cleveland et al. |
| 2006/0202906 A1 | 9/2006 | Okubo et al. |
| 2007/0020224 A1 | 1/2007 | Vetter et al. |
| 2007/0060059 A1 | 3/2007 | Kim et al. |
| 2007/0080868 A1 | 4/2007 | Hwang et al. |
| 2007/0205955 A1 | 9/2007 | Korisch et al. |
| 2008/0062062 A1 | 3/2008 | Borau et al. |
| 2008/0150799 A1 | 6/2008 | Hemmi et al. |
| 2008/0253308 A1 | 10/2008 | Ward et al. |
| 2008/0280571 A1 | 11/2008 | Rofougaran et al. |
| 2009/0040127 A1 | 2/2009 | Williams |
| 2009/0189820 A1 | 7/2009 | Saito et al. |
| 2009/0224995 A1 | 9/2009 | Puente et al. |
| 2010/0304680 A1 | 12/2010 | Kuffner et al. |
| 2010/0311353 A1 | 12/2010 | Rabinovich et al. |
| 2011/0057849 A1 | 3/2011 | Naym et al. |
| 2011/0059694 A1 | 3/2011 | Audic |
| 2011/0069633 A1 | 3/2011 | Schmidt et al. |
| 2011/0116569 A1 | 5/2011 | Vaughan et al. |
| 2011/0134001 A1 | 6/2011 | Sakata et al. |
| 2011/0150118 A1 | 6/2011 | Asplund et al. |
| 2011/0171922 A1 | 7/2011 | Kim et al. |
| 2012/0063529 A1 | 3/2012 | Choi et al. |
| 2012/0108178 A1 | 5/2012 | Lee et al. |
| 2012/0188137 A1 | 7/2012 | Lalezari |
| 2012/0229232 A1 | 9/2012 | Mahon et al. |
| 2013/0157601 A1 | 6/2013 | O'Keeffee et al. |
| 2014/0022125 A1 | 1/2014 | Zhu et al. |
| 2014/0035698 A1 | 2/2014 | Schadler et al. |
| 2014/0035792 A1 | 2/2014 | Schadler et al. |
| 2014/0097987 A1 | 4/2014 | Worl et al. |
| 2014/0191924 A1 | 7/2014 | Payne et al. |
| 2014/0236546 A1 | 8/2014 | Payne |
| 2014/0274094 A1 | 9/2014 | Abdelmonem et al. |
| 2015/0015372 A1 | 1/2015 | Hara et al. |
| 2015/0092621 A1 | 4/2015 | Jalloul et al. |
| 2015/0108210 A1 | 4/2015 | Zhou |
| 2015/0156642 A1 | 6/2015 | Sobczak et al. |
| 2015/0195001 A1 | 7/2015 | Barker et al. |
| 2015/0200709 A1 | 7/2015 | Negus et al. |
| 2015/0340875 A1 | 11/2015 | Prasad |
| 2015/0351103 A1 | 12/2015 | Kim et al. |
| 2016/0036505 A1 | 2/2016 | George et al. |
| 2016/0087348 A1 | 3/2016 | Ko et al. |
| 2016/0088572 A1 | 3/2016 | Bi et al. |
| 2016/0112111 A1 | 4/2016 | Bull |
| 2016/0126633 A1 | 5/2016 | Keller et al. |
| 2016/0142229 A1 | 5/2016 | Bevan et al. |
| 2016/0254595 A1 | 9/2016 | Sobczak et al. |
| 2016/0380690 A1 | 12/2016 | Jidhage |
| 2017/0077612 A1 | 3/2017 | Aryanfar |
| 2017/0077616 A1 | 3/2017 | Corum et al. |
| 2017/0085398 A1 | 3/2017 | Liu |
| 2017/0093048 A1 | 3/2017 | Chen et al. |
| 2017/0156119 A1 | 6/2017 | Neves et al. |
| 2017/0237484 A1 | 8/2017 | Heath et al. |
| 2017/0353929 A1 | 12/2017 | Tacconi et al. |

(56) References Cited

U.S. PATENT DOCUMENTS

| | | |
|---|---|---|
| 2018/0034164 A1 | 2/2018 | Jang et al. |
| 2018/0083368 A1 | 3/2018 | Teillet et al. |
| 2018/0167148 A1 | 6/2018 | Vannucci et al. |
| 2018/0176802 A1 | 6/2018 | Rosenhouse et al. |
| 2018/0219636 A1 | 8/2018 | Gale et al. |
| 2019/0007078 A1 | 1/2019 | Tsui et al. |
| 2019/0052381 A1 | 2/2019 | Abdelmonem |
| 2019/0074864 A1 | 3/2019 | Henry et al. |
| 2019/0074865 A1 | 3/2019 | Henry et al. |
| 2019/0103309 A1 | 4/2019 | Lin |
| 2019/0103909 A1 | 4/2019 | Bengtsson et al. |
| 2019/0165822 A1 | 5/2019 | Chen |
| 2019/0212699 A1 | 7/2019 | Waldern et al. |
| 2019/0222329 A1 | 7/2019 | Abdelmonem |
| 2019/0273315 A1 | 9/2019 | Hu et al. |
| 2019/0273326 A1 | 9/2019 | Sanford et al. |
| 2019/0334636 A1 | 10/2019 | Li et al. |
| 2019/0372237 A1 | 12/2019 | Yman et al. |
| 2019/0393598 A1 | 12/2019 | Logothetis et al. |
| 2020/0052388 A1 | 2/2020 | Jang et al. |
| 2020/0136247 A1 | 4/2020 | Ai et al. |
| 2020/0145032 A1 | 5/2020 | Ayala et al. |
| 2020/0185825 A1 | 6/2020 | Palud |
| 2020/0236630 A1 | 7/2020 | Tacconi et al. |
| 2020/0321697 A1 | 10/2020 | Zimmerman et al. |
| 2020/0373663 A1 | 11/2020 | Xu |
| 2021/0028829 A1 | 1/2021 | Rios |
| 2021/0098896 A1 | 4/2021 | Wang et al. |
| 2021/0127284 A1 | 4/2021 | Abdelmonem et al. |
| 2021/0175622 A1 | 6/2021 | Jing et al. |
| 2021/0226315 A1 | 7/2021 | Liu |
| 2021/0227400 A1 | 7/2021 | Jia |
| 2021/0320413 A1 | 10/2021 | Wu et al. |
| 2021/0344122 A1 | 11/2021 | Kaistha et al. |
| 2021/0359406 A1 | 11/2021 | Yang et al. |
| 2022/0006167 A1 | 1/2022 | P |
| 2022/0037753 A1 | 2/2022 | Tang et al. |
| 2022/0069463 A1 | 3/2022 | Abdelmonem et al. |
| 2022/0069853 A1 | 3/2022 | Abdelmonem et al. |
| 2022/0069855 A1 | 3/2022 | Abdelmonem et al. |
| 2022/0069865 A1 | 3/2022 | Abdelmonem et al. |
| 2022/0069897 A1 | 3/2022 | Abdelmonem et al. |
| 2022/0069898 A1 | 3/2022 | Abdelmonem et al. |
| 2022/0069927 A1 | 3/2022 | Abdelmonem et al. |
| 2022/0109977 A1 | 4/2022 | Zander et al. |
| 2022/0123821 A1* | 4/2022 | Sakhnini ............. H04B 7/0695 |
| 2022/0131269 A1 | 4/2022 | Choi et al. |
| 2022/0200139 A1 | 6/2022 | Ryu et al. |
| 2022/0209428 A1 | 6/2022 | Raghavan et al. |
| 2022/0279520 A1* | 9/2022 | Tsui ..................... H04B 17/345 |
| 2022/0311477 A1 | 9/2022 | Sun et al. |
| 2022/0320756 A1 | 10/2022 | Hassan et al. |
| 2022/0321241 A1 | 10/2022 | Bennett et al. |
| 2022/0322321 A1* | 10/2022 | Dai .................. H04W 52/0206 |
| 2022/0352942 A1 | 11/2022 | Kalantari et al. |
| 2022/0365224 A1 | 11/2022 | Rose et al. |
| 2023/0318174 A1 | 10/2023 | Abdelmonem et al. |
| 2023/0318175 A1 | 10/2023 | Abdelmonem et al. |
| 2023/0318197 A1 | 10/2023 | Abdelmonem et al. |
| 2023/0318198 A1 | 10/2023 | Abdelmonem et al. |
| 2023/0327708 A1 | 10/2023 | Abdelmonem |

FOREIGN PATENT DOCUMENTS

| | | |
|---|---|---|
| CN | 108631055 A | 10/2018 |
| CN | 209910515 U | 1/2020 |
| CN | 209963261 U | 1/2020 |
| CN | 112103653 A | 12/2020 |
| CN | 213637748 U | 7/2021 |
| CN | 113451764 A | 9/2021 |
| CN | 113922101 A | 1/2022 |
| WO | 2009120237 A1 | 10/2009 |
| WO | 2020064914 A1 | 4/2020 |

OTHER PUBLICATIONS

Amendment Under Article 34/Response to Written Opinion for PCT/US2021/046881 filed Jun. 16, 2022, 16 pages.

Amendment Under Article 34 / Response to Written Opinion filed for PCT/US2021/046807 dated Jun. 15, 2022, 19 pages.

PCT/US2021/046804, Amendment under Article 34 and response to Written Opinion, filed May 31, 2022, 19 pages.

PCT/US2021/046804, International Preliminary Report on Patentability, dated Sep. 13, 2022, 31 pages.

"Amendment Under Article 34 / Response to Written Opinion", for application No. PCT/US2021/046806, dated Feb. 8, 2022, 8 pages.

"International Preliminary Report", for Application PCT/US2021/046805, dated Mar. 9, 2023, 9 pgs.

"International Preliminary Report on Patentability", For Application PCT/US2021/046807, dated Aug. 20, 2021, 28 Pages.

"International Preliminary Report on Patentability", for Application No. PCT/US2021/46881, dated Feb. 17, 2023, 25.

"International Preliminary Report on Patentability", PCT/US2021/046872, dated May 4, 2022, 12 pgs.

"International Search Report and Written Opinion", for Application No. PCT/US2021/046875, dated Nov. 23, 2021, 10 pages.

"International Search Report and Written Opinion", for Application No. PCT/US2021/046872, dated Nov. 23, 2021, 13 pages.

"International Search Report and Written Opinion", for Application No. PCT/US2021/46805, dated Nov. 8, 2021, 15 pages.

"International Search Report and Written Opinion", for Application No. PCT/US2021/46881, dated Dec. 3, 2021, 12 pages.

"International Search Report and Written Opinion", for Application No. PCT/US2021/046804, dated Dec. 3, 2021, 14 pages.

"International Search Report and Written Opinion", For Application No. PCT/US2021/046807, dated Dec. 3, 2021, 15 pages.

"International Search Report and Written Opinion", PCT/US2023/015534, dated Apr. 19, 2023, 7 pages.

"International Search Report and Written Opinion", for Application No. PCT/US2021/046806, dated Nov. 8, 2021, 9 pages.

"Notification of Transmittal of International Preliminary Report on Pa Tentability", PCT/US2021/046875, dated May 2, 2022, 16 pages.

"Notification of Transmittal of International Preliminary Report on Patentability", PCT/US2021/046806 dated May 4, 2022, May 4, 2022, 16 pages.

"PCT/US2021/046872—Article 34 Amendment", dated Feb. 10, 2022, 8 pgs.

"PCT/US2021/046875—Article 34 Amendments", dated Apr. 13, 2022, 8 pgs.

"PCT/US2023/015538", International Search Report, dated Apr. 17, 23, Apr. 17, 2023, 6 pgs.

International Search Report & Written Opinion for PCT/2023/076690 dated Nov. 17, 2023, 4 pp.

International Search Report and Written Opinion for PCT/US2023/076674, dated Nov. 17, 2023, 3 pp.

"Examination Report for India Application No. 202347019825", dated Sep. 12, 2023, 7 Pages.

"International Search Report and Written Opinion", Appln. No. PCT/US2023/023403, dated Sep. 15, 2023, 10 pages.

"International Search Report and Written Opinion for Application No. PCT/US2023/076650", dated Nov. 16, 2023, 7 pages.

"International Search Report and Written Opinion for PCT/US2023/023402", dated Sep. 15, 2023, 11 Pages.

"International Search Report and Written Opinion for PCT/US2023/023405", dated Sep. 18, 2023, 10 Pages.

\* cited by examiner

Analog beamforming

Digital beamforming

Hybrid beamforming

One Antenna Radio

Passive Antennas
Below 3GHz bands

Massive MIMO Radio
Mid band

```
┌─────────────────────────────────────────────────────────────┐
│  Obtaining data regarding interference or PIM originating   │
│       from one or more interference sources 1232            │
└─────────────────────────────────────────────────────────────┘
                              │
                              ▼
┌─────────────────────────────────────────────────────────────┐
│  Electronically adjusting polarizations of signals relating │
│  to radiating elements of an antenna system, the            │
│  electronically adjusting being performed for multiple      │
│  frequency bands and facilitating mitigation of the         │
│  interference or the PIM 1234                               │
└─────────────────────────────────────────────────────────────┘
```

METHOD AND SYSTEM FOR ANTENNA INTEGRATED RADIO (AIR) DOWNLINK AND UPLINK BEAM POLARIZATION ADAPTATION

CROSS-REFERENCE TO RELATED APPLICATION

This application claims the benefit of and priority to U.S. Provisional Ser. No. 63/416,876, filed Oct. 17, 2022. The contents of the foregoing are hereby incorporated by reference into this application as if set forth herein in full.

FIELD OF THE DISCLOSURE

The subject disclosure relates to detecting received signals (in an antenna integrated radio (AIR)) associated with multiple beams in a communications system, and performing action(s), such as polarization adjusting and/or signal conditioning, resulting in improved signal to noise ratio and mitigation/cancellation of interference impacting the beams.

BACKGROUND

The deployment of fifth generation (5G) networks has made component requirements for cellular systems more stringent and sophisticated. In addition to capacity, throughput, latency, speed, and power consumption requirements, there is a need for multiple wireless services, bands, and networks to coexist and operate without impacting one another. Antennas and radios are key components in all wireless networks whether they are on the base station side or the handset side. Antenna and radio designs have evolved over the past twenty years to meet the increasingly complex requirements of cellular standards. For example, almost all antennas now have multiple functions that create conflicting antenna design requirements. This antenna design evolution needs to continue to meet the growing demands of 5G networks as well as future demands of higher generation networks.

BRIEF DESCRIPTION OF THE DRAWINGS

Reference will now be made to the accompanying drawings, which are not necessarily drawn to scale, and wherein:

FIG. 12B depicts an illustrative embodiment of a method in accordance with various aspects described herein.

DETAILED DESCRIPTION

Figure 1A:
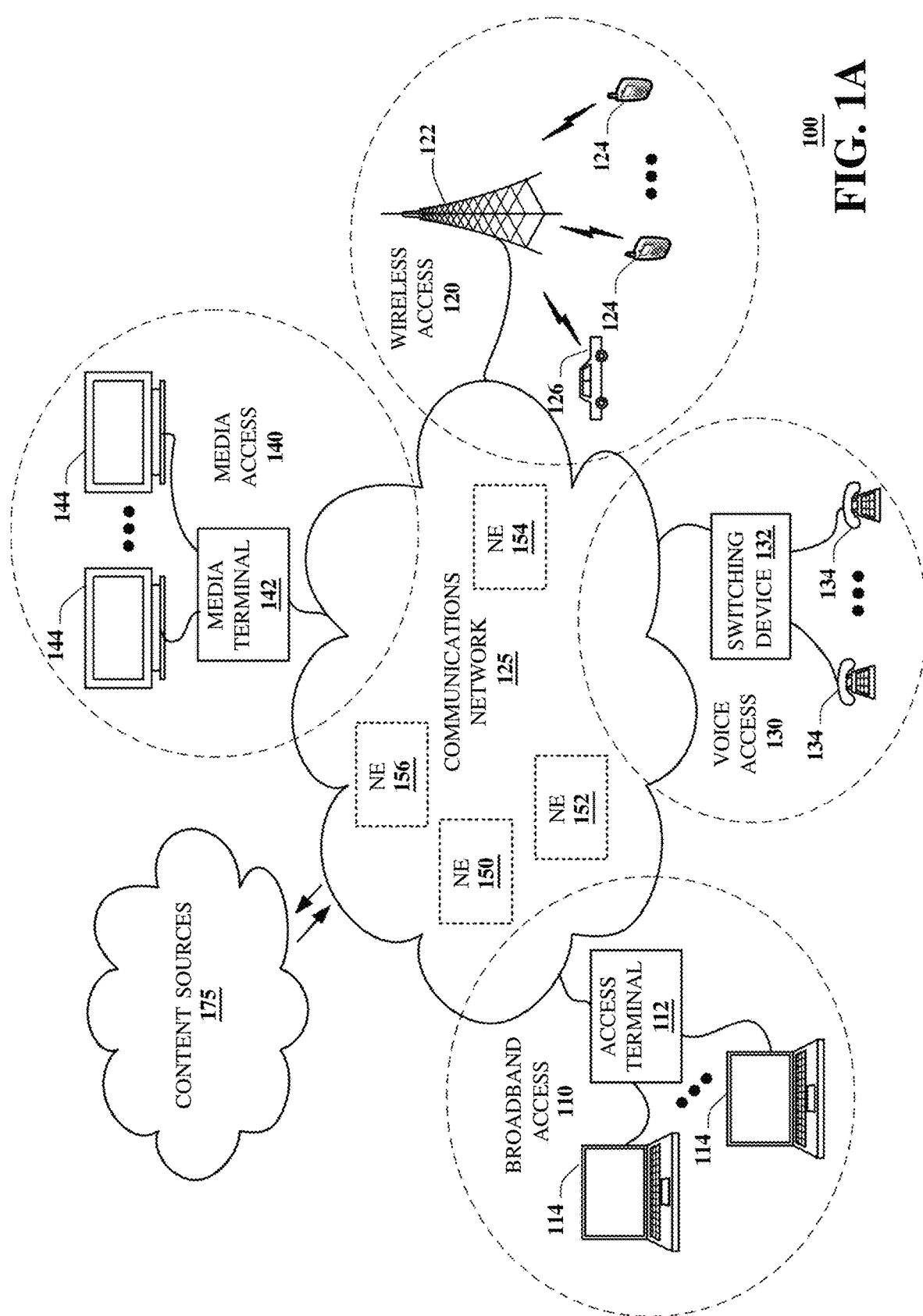
FIG. 1A is a block diagram illustrating an exemplary, non-limiting embodiment of a communications network in accordance with various aspects described herein.

Early antennas were mostly single-input, single-output (SISO), but currently, the majority are multiple-input, multiple-output (MIMO). MIMO is a key antenna technology for wireless communications in which multiple antennas are used at both the source (transmitter) and the destination (receiver), where the antennas at each end of the communication circuit are combined to enhance data speed. In MIMO, each spatial stream is transmitted from a different radio/antenna in the same frequency channel as the transmitter. The receiver receives each stream on each of its identical radios/antennas and reconstructs the original streams.

The first MIMO specifications appeared in 3rd Generation Partnership Project (3GPP) standards at the tail end of the 3G Universal Mobile Telecommunications System (UMTS) era, but it was of limited use as it was not built into the design from the beginning. It was only with the introduction of Long-Term Evolution (LTE) in 2008 that MIMO started to be mainstream. The goal of MIMO is to increase data rates by sending multiple data streams at the same time in the same frequency, known as spatial multiplexing. In a single antenna system, one cannot send multiple streams of data, but with MIMO, the signals transmitted from each antenna take different paths to the receivers. By applying the right mix of each data stream to each transmit antenna, the signals received at each receiving antenna only "see" one of the original data streams. In effect, MIMO systems use a combination of multiple antennas and multiple signal paths to gain knowledge of the communications channel. By using the spatial dimension of a communications link, MIMO systems can achieve significantly higher data rates than traditional SISO channels.

In a communications system, a main objective is to increase the signal to interference plus noise ratio (SINR) of a communication channel. Let's take a 2×2 MIMO case as an example. MIMO gains over SISO is achieved when the SINR of the channel is higher than is necessary to support the maximum SISO data rate. Such high SINR conditions occur when the user is near the cell center, or when interference from adjacent cells is low. When practical field deployments are considered, in a typical urban macro environment, it is estimated that 2×2 MIMO only provides approximately 20% gain over SISO. The 2×2 MIMO configuration can be increased by adding more antennas at each end of the link. In the original 3GPP Release 8 Long-Term Evolution (LTE) standard in 2008, 2× and 4× operation was specified, and 8×8 was added later in Release 10. As the number of antennas increases, it becomes less likely that the channel will support orthogonal transmission paths. These orthogonal paths are known as Eigenmodes.

For UEs (smartphones, etc.), it can be difficult to support higher order MIMO due to space limitations for the required number of receive antennas. For example, it took eight years after Release 8 specified 4× single-user (Su)-MIMO for UEs with four receivers to start appearing on the market. And to take full advantage of that, networks would have to upgrade their base stations with 4 transmit (Tx)/receive (Rx) antennas.

There are alternative forms of MIMO, including Su-MIMO, where multiple streams of data can be transmitted to one user to increase peak data rates, and multi-user (Mu)-MIMO, where the same number of streams can be transmitted towards multiple users, each getting one or more streams. Mu-MIMO has the effect of increasing cell capacity, but not increasing peak data rates to any one user over the SISO case.

Physically, an antenna can include radiating elements (or antenna elements (AEs)) arranged in interconnected columns and sharing the same radio frequency (RF) connector. Most low frequency bands (e.g., 600 megahertz (MHz)) up to 2.5 gigahertz (GHz)) antennas in the marketplace today are multi-band (two or more bands), with each band having its own remote electronic/electrical tilt for separate optimization capability. The radiating elements can also be combined into an antenna array capable of creating multiple, steerable beams by utilizing a beamforming feed network (e.g., a butler matrix feed). Antennas for high frequency bands or millimeter (mm) waves are usually integrated with the receiver.

An antenna's radiation has a pattern (power distribution) in the horizontal direction (an azimuth direction) and a pattern in the vertical direction usually referred to as the elevation. Antennas comprise a number of radiating elements, which may each be an orthogonally polarized element pair, such as a dipole (e.g., a crossed-dipole) with certain properties and a particular structure. Radiating elements can be arranged in columns, and antennas that have multiple columns can form arrays. While each radiation array may have its own radiation pattern, the RF effect of the entire array can depend on the spacing, phase shifts, and amplitude variations between its radiating elements. Together, these three variables can be used to describe the array factor pattern. Multiplying the array factor pattern and the element pattern can yield the overall radiation pattern of the array antenna and define the far field.

There are various types of radiating antenna elements, such as those with wire and aperture elements that include dipole and monopole elements. Aperture elements can also include slot elements. Some designs incorporate combinations of both types and can also be built over printed circuit boards (PCBs) or micro strip patches. Each antenna element has a radiation pattern, usually referred to as an element pattern, whose characteristics are determined by the overall design of the element. Some or all of the principles, embodiments, and/or aspects described herein can apply equally to the various types of antennas.

A dipole radiating element transmits electromagnetic waves that result in radiation around it. Near the dipole antenna, the radiated energy is oscillating as it is flowing outwards. At any instant of time, the magnetic field is "behind" the electric field by half of a period (or half of the wavelength). The near field is composed of two regions: the reactive near field and the radiating near field (also called the Fresnel zone or region). In the far-field region (also called the Fraunhofer zone or region), the field components are transverse to the radial direction of the antenna. The far-field E (electric) and H (magnetic) strength decrease by inverse law 1/r, where r is the distance from the antenna. Embodiments described herein define and account for a new region between/overlapping the Fresnel region and the Fraunhofer region, namely an "intermediate" (or intermediate-field) region.

Smart antenna system technology relates to intelligent antennas, phased arrays, Spatial Division Multi Access (SDMA), spatial processing, digital beamforming, adaptive antenna systems, and others. Smart antenna systems are customarily categorized as either switched beam with a finite number of fixed, predefined patterns or combining strategies (sectors) or as adaptive arrays with an infinite number of patterns (scenario-based) that are adjusted in real-time. The dual purpose of a smart antenna system is to augment the signal quality of the radio-based system through more focused transmission of radio signals, while enhancing capacity through increased frequency reuse.

Active Antenna Systems (AAS) use flexible cell splits (e.g., vertical, or horizontal) and/or beamforming to provide increased system flexibility and performance. An AAS base station uses multiple transceivers on an antenna array to produce a radiation pattern that can be dynamically adjusted. Spatial selectivity in both the transmit and receive directions is important. For example, compared to fixed beam antennas, an AAS may experience different spatial selectivity since it does not achieve full spatial selectivity until after digital baseband processing of the multiple elements in the array.

Referring now to FIG. 1A, a block diagram is shown illustrating an example, non-limiting embodiment of a system 100 in accordance with various aspects described herein. For example, system 100 can facilitate, in whole or in part, providing or effecting of polarization shifting for SINR improvement or optimization and/or to mitigate or avoid detected interference/PIM. A communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, Ultra-wideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets, or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway, or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 1B:
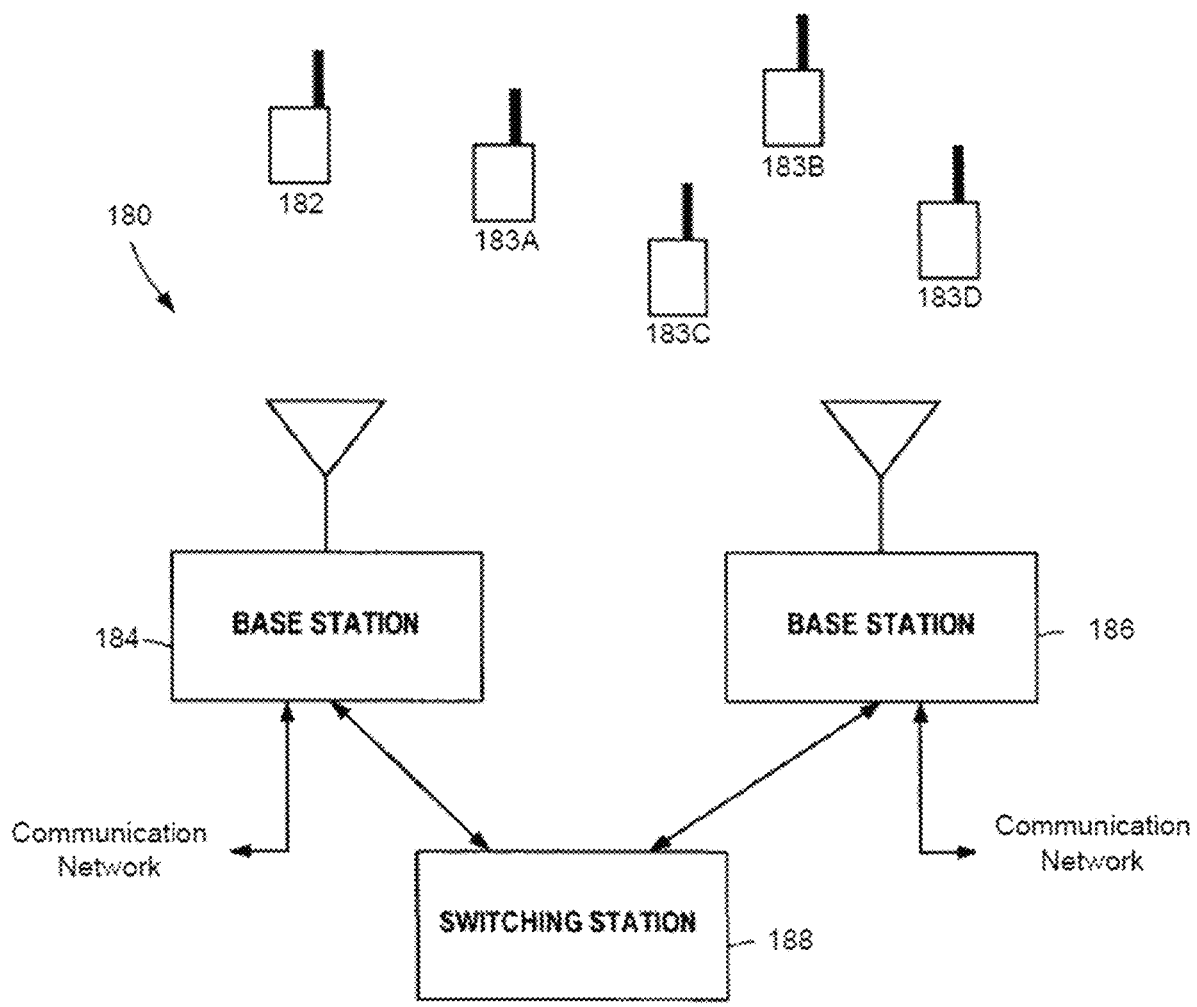
FIG. 1B depicts an exemplary, non-limiting embodiment of a communications system functioning within, or operatively overlaid upon, the communications network of FIG. 1A in accordance with various aspects described herein.

FIG. 1B depicts an exemplary, non-limiting embodiment of a telecommunication system 180 functioning within, or operatively overlaid upon, the communications network 100 of FIG. 1A in accordance with various aspects described herein. For example, system 180 can facilitate, in whole or in part, providing or effecting of polarization shifting for SINR improvement or optimization and/or to mitigate or avoid detected interference/PIM. As shown in FIG. 1B, the telecommunication system 180 may include mobile units 182, 183A, 183B, 183C, and 183D, several base stations, two of which are shown in FIG. 1B at reference numerals 184 and 186, and a switching station 188 to which each of the base stations 184, 186 may be interfaced. The base stations 184, 186 and the switching station 188 may be collectively referred to as network infrastructure.

During operation, the mobile units 182, 183A, 183B, 183C, and 183D exchange voice, data, or other information with one of the base stations 184, 186, each of which is connected to a conventional land line communications network. For instance, information, such as voice information, transferred from the mobile unit 182 to one of the base stations 184, 186 is coupled from the base station to the communications network to thereby connect the mobile unit 182 with, for example, a land line telephone so that the land line telephone may receive the voice information. Conversely, information, such as voice information may be transferred from a land line communications network to one of the base stations 184, 186, which in turn transfers the information to the mobile unit 182.

The mobile units 182, 183A, 183B, 183C, and 183D and the base stations 184, 186 may exchange information in either narrow band or wide band format. For the purposes of this description, it is assumed that the mobile unit 182 is a narrowband unit and that the mobile units 183A, 183B, 183C, and 183D are wideband units. Additionally, it is assumed that the base station 184 is a narrowband base station that communicates with the mobile unit 182 and that the base station 186 is a wideband digital base station that communicates with the mobile units 183A, 183B, 183C, and 183D.

Narrow band format communication takes place using, for example, narrowband 200 kilohertz (KHz) channels. The Global system for mobile phone systems (GSM) is one example of a narrow band communication system in which the mobile unit 182 communicates with the base station 184 using narrowband channels. Alternatively, the mobile units 183A, 183B, 183C, and 183D communicate with the base station 186 using a form of digital communications such as, for example, code-division multiple access (CDMA), Universal Mobile Telecommunications System (UMTS), 3GPP Long Term Evolution (LTE), or other next generation wireless access technologies. CDMA digital communication, for instance, takes place using spread spectrum techniques that broadcast signals having wide bandwidths, such as, for example, 1.2288 megahertz (MHz) bandwidths. The terms narrowband and wideband referred to above can be replaced with sub-bands, concatenated bands, bands between carrier frequencies (carrier aggregation), and so on, without departing from the scope of the subject disclosure.

The switching station 188 is generally responsible for coordinating the activities of the base stations 184, 186 to ensure that the mobile units 182, 183A, 183B, 183C, and 183D are constantly in communication with the base station 184, 186 or with some other base stations that are geographically dispersed. For example, the switching station 188 may coordinate communication handoffs of the mobile unit 182 between the base station 184 and another base station as the mobile unit 182 roams between geographic areas that are covered by the two base stations.

In various circumstances, the telecommunication system 180, and more particularly, one or more of the base stations 184, 186 can be undesirably subjected to interference. Interference can represent emissions within band (narrowband or wideband), out-of-band interferers, interference sources outside cellular (e.g., TV stations, commercial radio or public safety radio), interference signals from other carriers (inter-carrier interference), interference signals from UEs operating in adjacent base stations, PIM, and so on. Interference can represent any foreign signal that can affect communications between communication devices (e.g., a UE served by a particular base station).

Figure 2A:
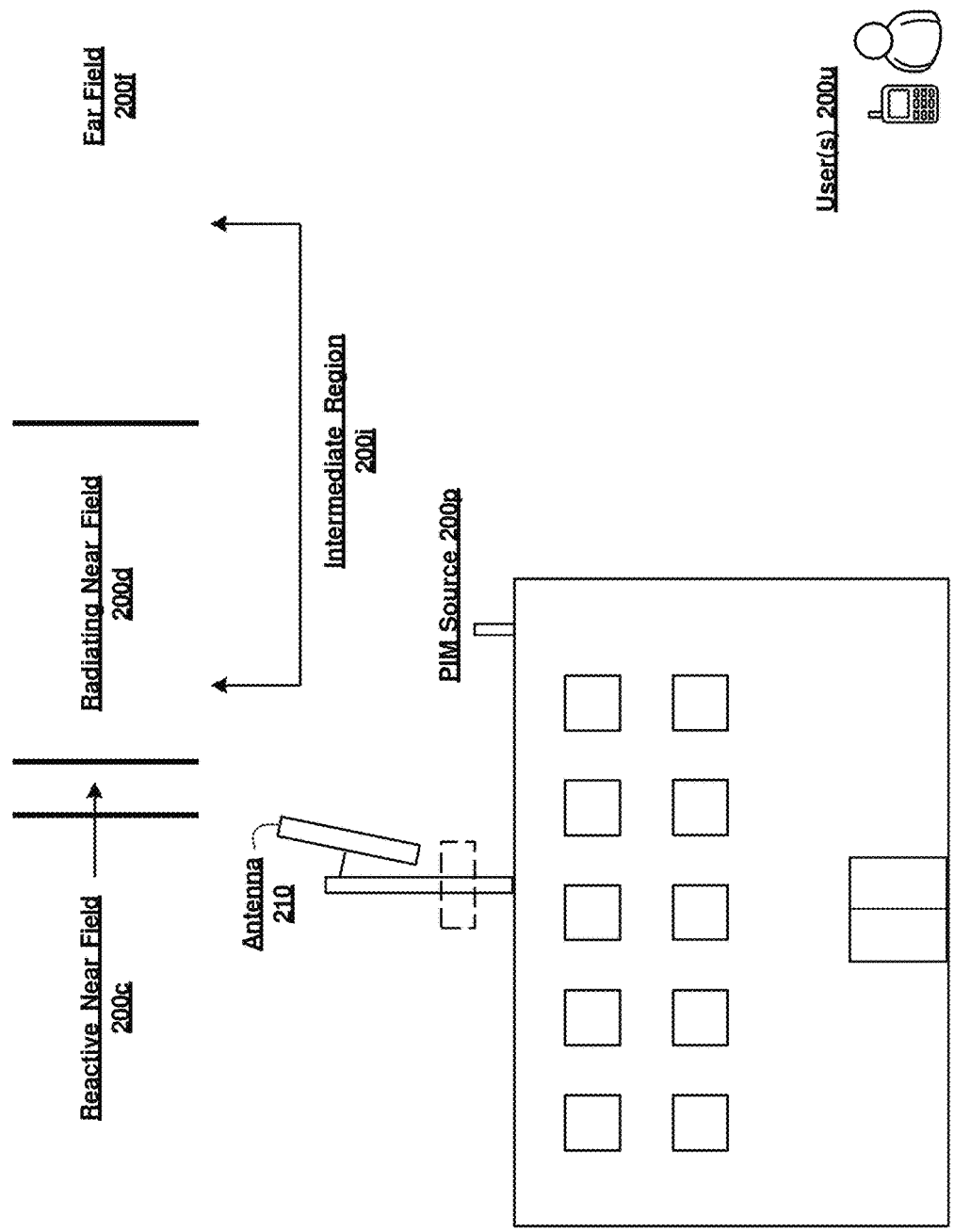
FIG. 2A is a block diagram illustrating an example, non-limiting embodiment of a system functioning within, or operatively overlaid upon, the communications network of FIG. 1A and/or the communications system of FIG. 1B in accordance with various aspects described herein.

FIG. 2A is a block diagram illustrating an example, non-limiting embodiment of a system 200 functioning within, or operatively overlaid upon, the communications network 100 of FIG. 1A and/or the communications system 180 of FIG. 1B in accordance with various aspects described herein. As depicted, the system 200 can include an antenna (or antenna system) 210. In various embodiments, the antenna 210 may include multiple radiating elements. In one or more embodiments, the antenna 210 may include multiple columns and/or rows of radiating elements, forming one or more antenna arrays or panels. As shown in FIG. 2A, the antenna 210 can be associated with various spatial regions, including a reactive near-field region 200c, a radiating near-field region 200d, a far-field region 200f, and an intermediate region 200i. One or more UEs/users 200u may be in the far-field region 200f. The intermediate region 200i may include a zone that overlaps a portion of the radiating near-field region 200d and a portion of the far-field region 200f.

As depicted in FIG. 2A, the antenna 210 may be disposed or deployed on a structure, such as a building rooftop. It is to be appreciated and understood that the antenna 210 may be deployed in any suitable manner. As one example, the antenna 210 may be mounted on one or more towers where few or no objects may be located nearby (e.g., an unobstructed antenna on a tower), and thus a far-field representation may be adequate. As another example, multiple antennas 210 may be located within proximity to one another (e.g., within a threshold distance from one another), where the antennas 210 may or may not have overlapping degrees of coverage, and thus the near-field region may have an impact on antenna performance. As yet another example, one or more antennas 210 may be deployed on building rooftop(s) in densely populated areas (e.g., towns or cities).

In various antenna deployments, antennas (or more particularly, the uplink (UL)) may be subject to interference and/or PIM—e.g., a PIM source 200p. PIM interference may be due to nonlinearities external to antennas that, when subjected to electromagnetic waves emitted by antenna elements in the downlink (DL) frequency band, generate reflections at frequencies in the UL frequency band. PIM interference may also be due to antenna(s) of a base station transmitting and receiving in DL and UL frequency bands that are close to one another, or due to different antennas of different base stations transmitting in frequency bands that are close to one another. In these cases, intermodulation of signals transmitted in different (but sufficiently close) frequencies can result in passive signals falling into an UL frequency band. In any case, interference/PIM decreases UL sensitivity and thus negatively impacts UL coverage, reliability, performance, and data speeds.

With recent advances in active antenna technology, it is possible to deploy base stations with many antenna elements to enhance cell capacity and coverage. Antenna elements can be deployed in two-dimensional (2D) arrays, providing horizontal (azimuth) as well as vertical beamforming. In urban environments, with high rise buildings, this can improve indoor coverage and increase capacity. Wireless networks with base stations having many antenna elements are known as massive MIMO, or Elevation Beamforming/Full Dimension (EB/FD) MIMO systems. Beamforming can rely on or can be performed in conjunction with some or all the techniques described herein to further improve or optimize performance.

For a 2D array of M by N elements not equally spaced and that uses variable amplitude element excitations and phase scanning, the array factor can be represented by:

$$AF(\Phi) = \sum_{m=0}^{M-1} \sum_{n=0}^{N-1} A_{mn} e^{jm\left(\frac{\omega \hat{r} \cdot \bar{r}_{mn} + \delta_{mn}}{c}\right)}, \quad \text{(EQ 1)}$$

where $\hat{r} \cdot \bar{r}_{mn} = d \sin(\theta) \cos(\varphi) + d \sin(\theta) \sin(\varphi) + d \cos(\theta)$.

Figure 2B:
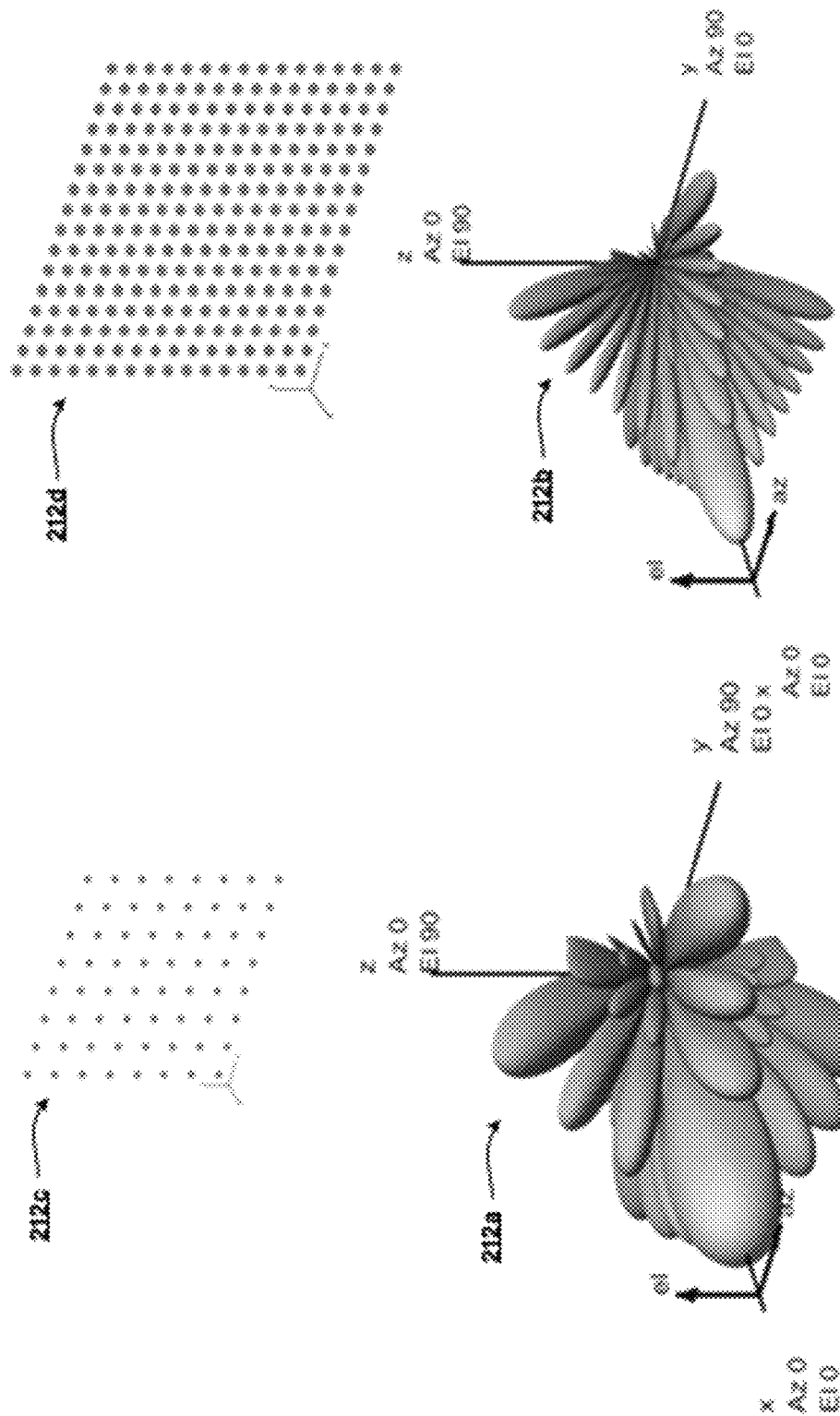
FIG. 2B depicts an example radiation pattern of a first antenna array and an example radiation pattern of a second antenna array in accordance with various aspects described herein.

FIG. 2B depicts an example radiation pattern 212a of a first antenna array 212c (i.e., an 8×8 array) and an example radiation pattern 212b of a second antenna array 212d (e.g., a 16×16 array) in accordance with various aspects described herein. In various embodiments, one or more of the antenna arrays 212c and 212d may correspond to the antenna 210 of FIG. 2A.

Examples of fixed beam techniques include butler matrix, Blass matrix, and Wullenweber array. Adaptive beam forming methods include the block adaptive method and the sample-by-sample method. Block implementation of the adaptive beamformer uses a block of data to estimate the adaptive beamforming weight vector and is known as sample matrix inversion (SMI). The sample-by-sample method updates the adaptive beamforming weight vector with each sample. Sample-by-sample methods include the least mean square (LMS) algorithm, the constant modulus algorithm (CMA), the least square CMA, and the recursive least square (RLS) algorithm. In various embodiments, some or all these methods/algorithms may be adapted and utilized. For example, some or all these methods/algorithms may be modified to account for variations in antenna array elements.

FD-MIMO systems are distinct from the MIMO systems of LTE and LTE-Advanced standards in that many antennas are employed at the eNodeB (eNB). As the number of eNB antennas M by N increases, cross-correlation of two random channel realizations becomes zero such that inter-user interference in the downlink can be controlled via a simple linear precoder. Such a benefit can be realized, however, only when perfect channel state information (CSI) is available at the eNB. While CSI acquisition in TDD systems is relatively simple due to channel reciprocity, such is not the case for FDD systems, where the time variation and frequency response of the channel are measured via downlink reference signals (RS) and returned to the eNB after the quantization. Identifying potential issues of CSI acquisition and developing the proper solutions are, therefore, important for successful commercialization of FD-MIMO systems. Interference/PIM minimization or cancellation, as described herein, can have a direct impact thereto that be exploited using non-symmetrical elements.

FD-MIMO systems also employ active antennas with 2D planar arrays. In active antenna-based systems, gain and phase are controlled by the active components, such as a power amplifier (PA) and a low noise amplifier (LNA) attached to each antenna element. In a 2D-structured antenna array, the radio wave can be controlled on both the vertical (elevation) and horizontal (azimuth) directions such that control of the transmit beam in three-dimensional (3D) space is possible. This type of wave control mechanism is also referred to as 3D beamforming. 2D AAS can accommodate many antennas without increasing deployment space.

Smart antenna systems (which can leverage the SDMA method) employ adaptive algorithm(s) that enable signal extraction. While an antenna by itself can convert electrical signals into electromagnetic waves or vice versa, the adaptive algorithm(s) provide the intelligence of a smart antenna system. An adaptive algorithm can be designed to account for challenges that prevent an antenna from combining bands. Embodiments for interference/PIM minimization or cancellation, described herein, can enable further enhancements to such adaptive algorithm(s).

Figure 3A:
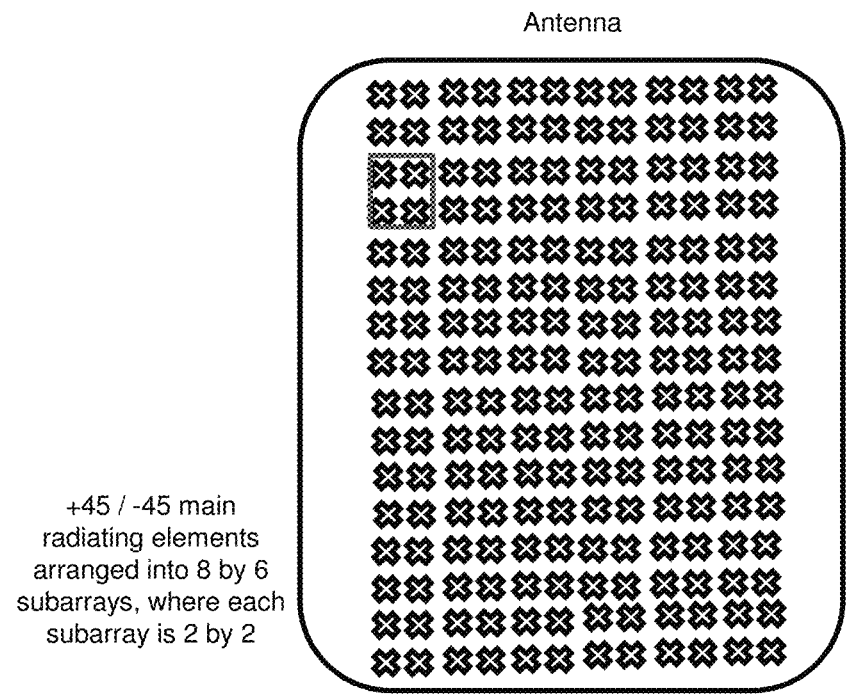
FIG. 3A depicts an example antenna array with 8 rows and 6 columns of subarrays in accordance with various aspects described herein.

In order to deliver higher speeds, massive connections, and premium user experience, 5G networks generally cannot use fixed broadcast beams of 3G and 4G networks. To address growing demands of wireless data, 3GPP LTE and LTE-Advanced Releases 8 through 11 have introduced cutting edge techniques to improve spectral efficiency, such as MIMO, coordinated multipoint (CoMP) transmission/reception, and heterogeneous networks. New technologies to further boost the spectral efficiency are strongly desired for cellular wireless communications. There is a need to focus on massive MIMO transmission/reception. When used with multi-user precoding schemes, such as maximum ratio transmission (MRT), massive MIMO systems experience small inter-user and intercell interference, and consequently achieve significantly higher throughput than the state-of-the-art MIMO systems. One of the challenges to building massive MIMO systems in practice is that the number of antennas that can be equipped at a base station (BS) is often limited by the BS form factors and operating carrier frequencies. For example, to install many antenna elements (e.g., >8) horizontally at the top of a BS tower operating at the lowest LTE carrier frequency of 700 MHz, just eight antenna elements with ($\lambda/2$) spacing require a horizontal span of ~1.7 m, where $\lambda$ is the carrier wavelength. For the typical LTE carrier frequency of 2.5 GHz, fitting 32 antenna elements with ($\lambda/2$) spacing requires a horizontal span of ~1.9 m, which is still not feasible for many BSs that have only limited room on the tower. This practical limitation has motivated full-dimension MIMO cellular communication systems in which many active antenna elements are placed in a two-dimensional grid at the BSs, as shown in FIG. 3A. To evaluate and design FD-MIMO, three-dimensional spatial channel models (3D SCMs) are necessary. The 3D SCM should consider azimuth direction as well as the elevation direction of signal propagation between a BS and a UE device. Release 15 suggested that beamforming be used to improve 5G broadcast and traffic beam coverage, adding that the theoretical improvement can reach 3 dB. A minimum of two antenna arrays are required to generate beamforming beams. Beams with narrower widths mean more 5G broadcast beams are available, but this requires more antenna arrays. Therefore, 5G antennas must support a minimum of two arrays on each band, meaning that they must support a minimum 4T4R configuration on each band.

Figure 2C:
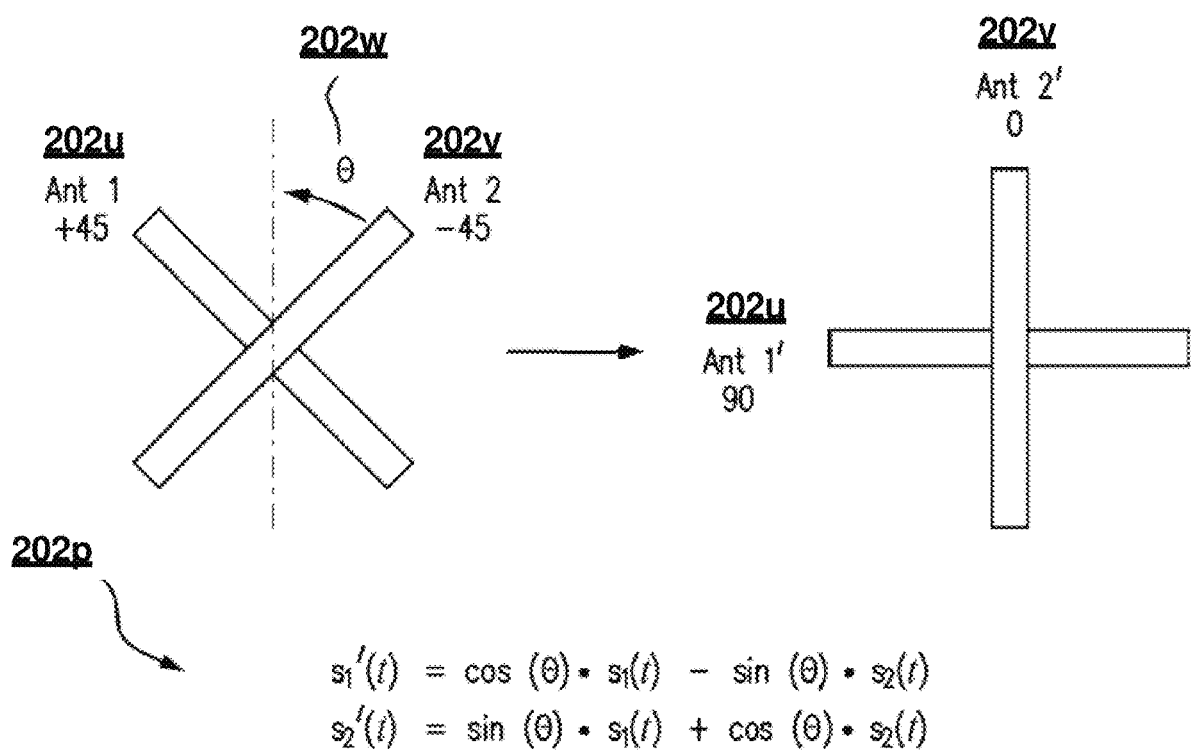
FIGS. 2C-2E are diagrams illustrating example, non-limiting embodiments of polarization adjusting and associated equations in accordance with various aspects described herein.
Figure 2D:
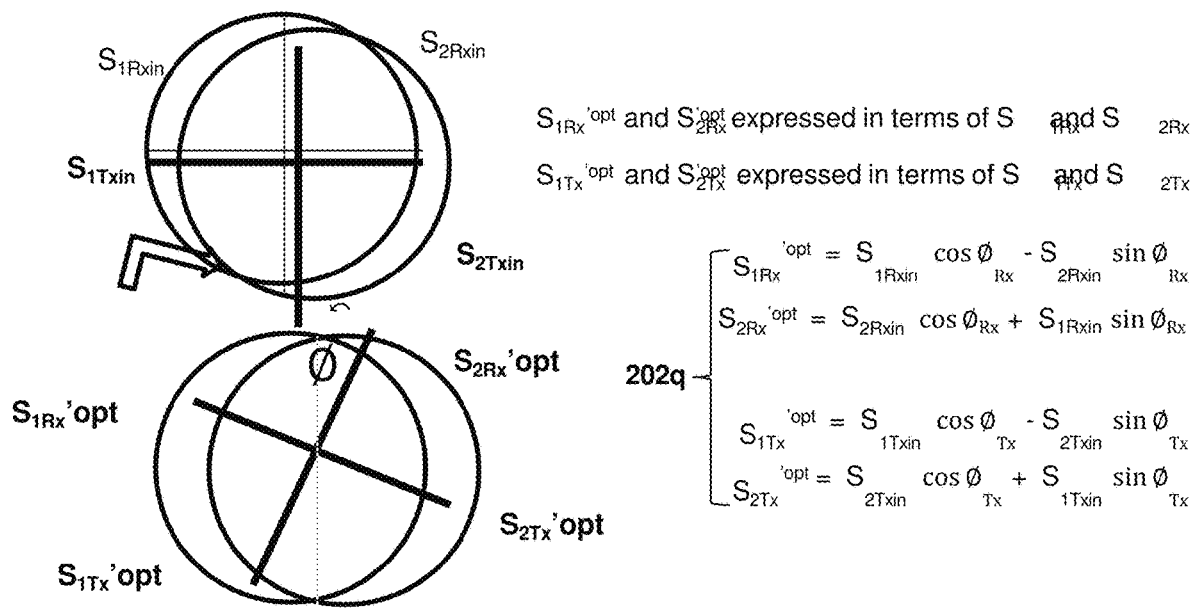
Figure 2D:
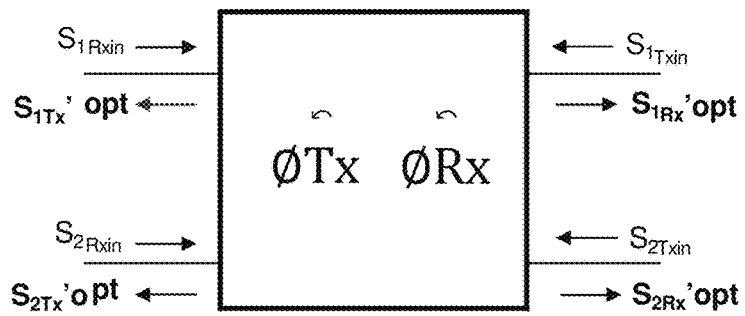
Figure 2E:
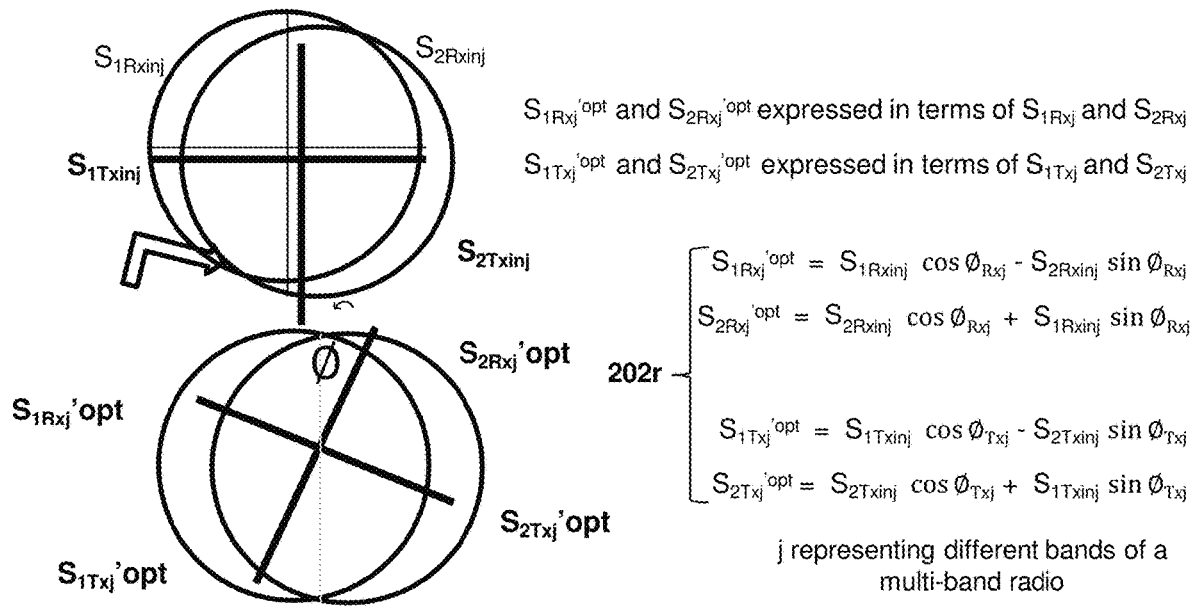
Figure 2E:
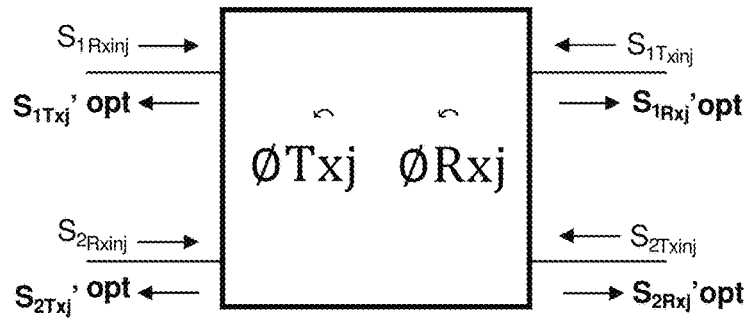

FIGS. 2C-2E are diagrams illustrating example, non-limiting embodiments of polarization adjusting and associated equations in accordance with various aspects described herein. As shown in FIG. 2C, the polarizations of signals transmitted/received by an orthogonally polarized pair of elements, such as a crossed-dipole antenna 202u, 202v, may be changed. Here, suppose signals WO and 52(t) are transmitted/received by the +45 degree dipole 202u and the −45 degree dipole 202v, respectively—that is, where signal $s_1(t)$ may be transmitted/received with a +45 degree polarization and signal 52(t) may be transmitted/received with a −45 degree polarization. In a case where (e.g., based on a desire to mitigate or cancel interference/PIM, such as likely PIM combinations) there is a need to "rotate" or modify the polarization of the signal $s_1(t)$ to 90 degrees (e.g., horizontal) and the polarization of the signal $s_2(t)$ to 0 degrees (e.g., vertical), equations 202p can be applied to derive new signals $s_1'(t)$ and $s_2'(t)$. As shown, the new signals can be computed or derived by processing/manipulating (or mixing) the original signals $s_1(t)$ and $s_2(t)$, which is equivalent to a "rotation" of the crossed-dipole antenna by an angle 202w (here, for example, 45 degrees in the counter-clockwise direction). In this way, when signals $s_1'(t)$ and $s_2'(t)$ are transmitted/received from the +45 dipole and the −45 dipole, it is equivalent to transmitting/receiving $s_1(t)$ and $s_2(t)$ from dipoles oriented at 90 degrees and 0 degrees. Selection of certain polarizations can be viewed as a projection of signals in different axes. The weights in the polarization shifting equations 202p are real values (rather than complex values) and operate to mathematically adjust the orthogonal signals to desired polarizations.

In various embodiments, the antenna 210 may be configured to perform polarization shifting of orthogonal signals (in the RF domain) for Tx only, for Rx only, or for both Tx and Rx. FIG. 2D shows example equations 202q (similar to equations 202p) that the antenna 210 may implement to effect shifting in Tx/Rx directions. The polarization adjusting (via angle $\theta_{Tx}$) of orthogonal signals on the Tx side ($s_{1Tx}$ and $s_{2Tx}$) may be the same as or different from the polarization adjusting (via angle $\theta_{Rx}$) of orthogonal signals on the Rx side ($s_{1Rx}$ and $s_{2Rx}$). Implementation in a radio, where there might be access to individual Tx and Rx signals across the different RF lines, can enable more flexible polarization adjusting for Tx and Rx (i.e., where angles $\theta_{Tx}$ and $\theta_{Rx}$ may be different).

Figure 2F:
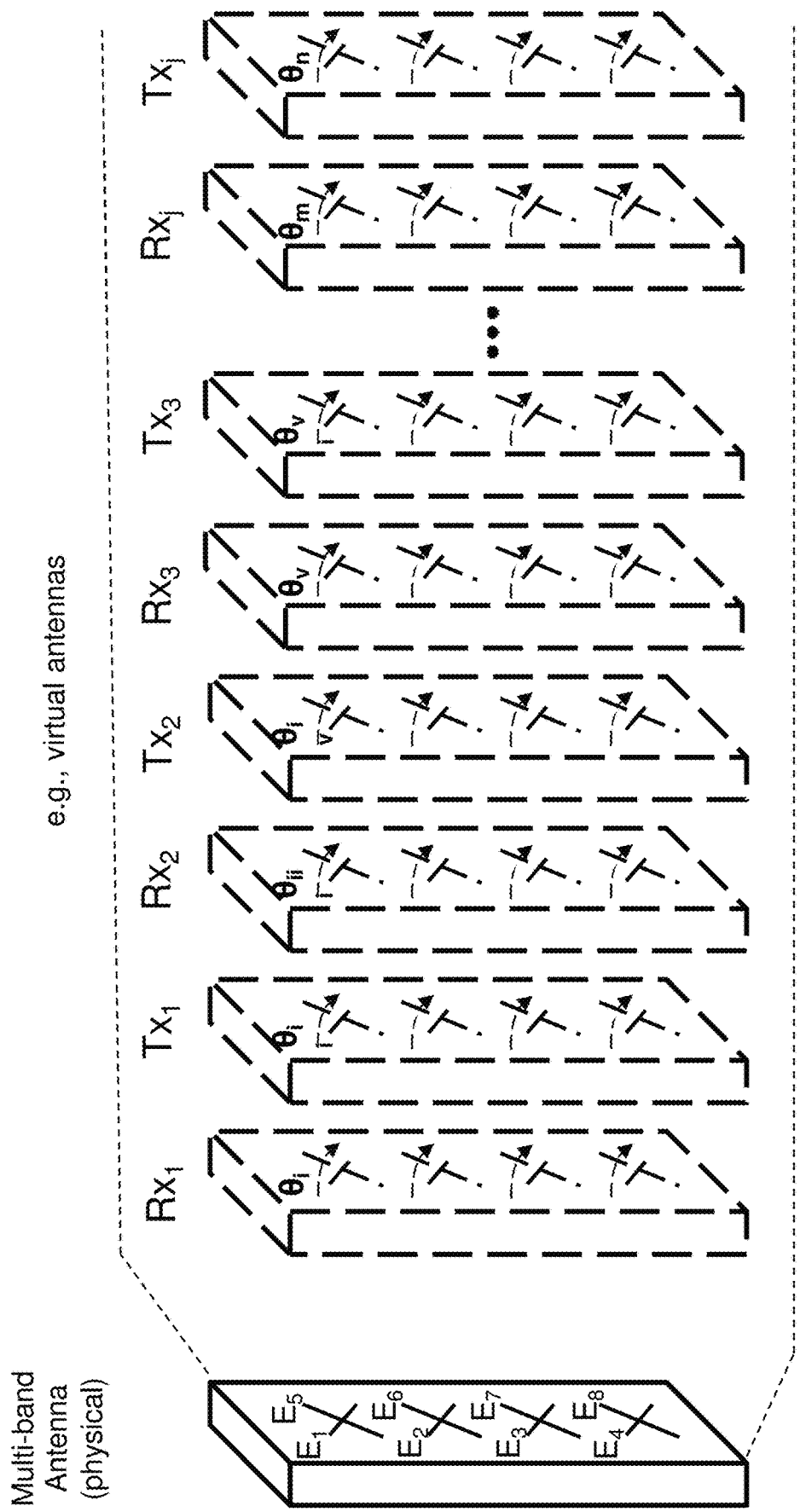
FIG. 2F illustrates a conceptualization of flexible polarization adjusting for transmit (Tx) and receive (Rx) across various frequency bands of an example multi-band antenna in accordance with various aspects described herein.

In antenna implementations where each radiating element operates in multiple frequency bands (e.g., a multi-band radio system), the antenna 210 may be configured to perform polarization shifting of orthogonal signals (in the RF domain) for one or more of the bands and for Tx only, for Rx only, or for both Tx and Rx. FIG. 2E shows example equations 202r that the antenna 210 may implement to effect polarization shifting in a multi-band communications system, where "j" represents the different bands (e.g., Band 1, Band 2, etc.) of the system. Implementation in a radio, where there might be access to individual Tx and Rx signals across the different RF lines and across the different bands, can enable more flexible polarization adjusting for Tx and Rx across the different frequency bands (i.e., where an angle $\theta_{Tx}$ for one band may be the same as or different from an angle $\theta_{Tx}$ for another band and/or where an angle $\theta_{Rx}$ for one band may be the same as or different from an angle $\theta_{Rx}$ for another band). FIG. 2F illustrates a conceptualization of flexible polarization adjusting for Tx and Rx across various frequency bands of an example multi-band antenna in accordance with various aspects described herein. As shown in FIG. 2F, the multi-band antenna may include crossed-dipole radiating elements—here, a single column of four crossed-dipole radiating elements is shown, although the column may include more or fewer crossed-dipole radiating elements and/or there may be additional columns of crossed-dipole radiating elements in the antenna. The crossed-dipole radiating elements in this example may each be designed to operate in Tx and Rx across multiple adjacent frequency bands 1, 2, 3, . . . , j, and can be treated as a stack or layer of virtual antennas as shown—i.e., as a set of crossed-dipole radiating elements for Rx in Band 1 ($Rx_1$), a set of crossed-dipole radiating elements for Tx in Band 1 ($Tx_1$), a set of crossed-dipole radiating elements for Rx in Band 2 ($Rx_2$), a set of crossed-dipole radiating elements for Tx in Band 2 ($Tx_2$), and so on. The virtual antennas may be mathematically or virtually rotated (e.g., in accordance with equations 202r of FIG. 2E) independently, where their virtual rotations are mutually distinct from one another. In this way, the virtual rotation angle or polarization rotation angles ($\theta_i$, $\theta_{ii}$, $\theta_{iii}$, $\theta_{iv}$, $\theta_v$, $\theta_{vi}$, . . . $\theta_m$, $\theta_n$) may be the same as or different from one another as needed to avoid interference in the Rx and Tx directions and across the multiple frequency bands.

For example, $\theta_i$ may be the same as or different from $\theta_{ii}$, which may be the same as or different from $\theta_{iii}$, and so on. It is to be appreciated and understood that, while the various virtual rotation angles are shown in the clockwise direction, some or all of them may alternatively be in the counter-clockwise direction.

The increase in spectrum bandwidth requirements to support higher data traffic created the need to use higher frequencies, in particular C band 3.5 GHz and mmWaves. High gain antenna arrays are one of the main technologies used for the higher frequency ranges. Generally, the higher the frequency, the higher the propagation loss, which led to the use of massive MIMO technology in which the antenna can generate a high number of independent beams of radiation.

Figure 3B:
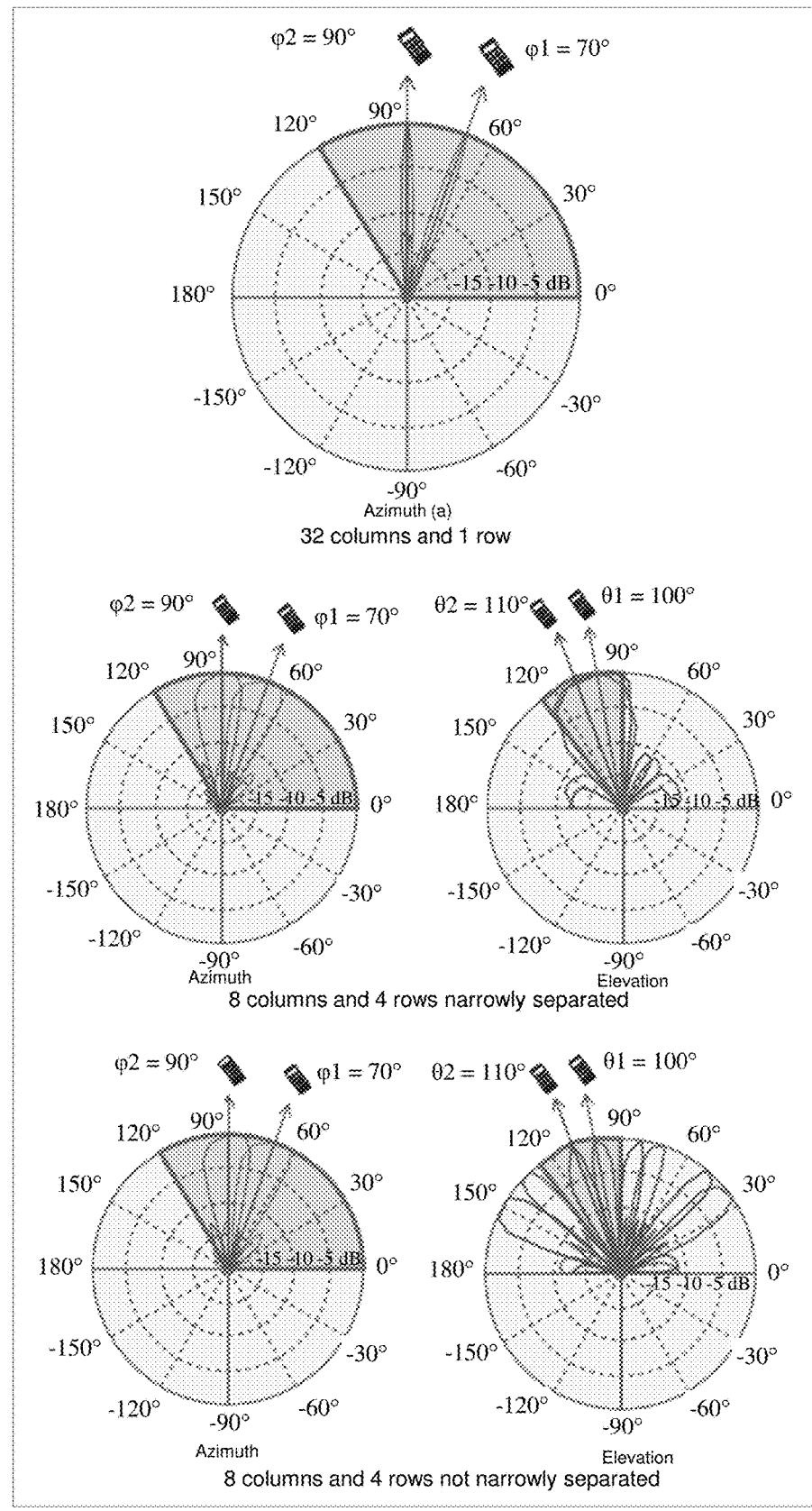
FIG. 3B depicts example radiation patterns of an antenna with 32 columns and 1 row of radiating elements and an antenna with 8 columns and 4 rows of radiating elements in accordance with various aspects described herein.

A massive MIMO antenna consists of radiating elements that form a subarray. A subarray may be in a 2 by 2 format—i.e., with 2 rows and 2 columns of radiating elements, where all of the subarrays may be arranged in rows and columns to form a panel. In each subarray, the radiating element spacings may generate a radiation pattern. The wider the spacing, the narrower the beams. Each subarray may be connected to an antenna port. An example MIMO antenna is shown in FIG. 3A, with R rows (e.g., 8 rows) and C columns (e.g., 12 columns). Here, the antenna may have 48 subarrays arranged in a horizontal (6) and vertical (8) configuration with 48 ports (or 48×2 if the radiating elements are cross-polarized). A typical spacing in the horizontal direction is half of the wavelength (i.e., $\lambda/2$) and twice the wavelength (i.e., $2\lambda$) in the vertical direction. FIG. 3B shows the beam pattern generated by an antenna with 4 rows and 8 columns. Note that an antenna composed of 1 row and 32 columns will have a narrower beam width in the azimuth direction by a factor of 4 as shown in FIG. 3B. The dimension of an antenna used for intermediate frequencies 3 GHz would be about 40 cm by 80 cm in the 4 rows by 8 columns design versus a wide 160 cm for the 1 row by 32 columns design, making it impractical. Note that if the vertical separation was only half of the wavelength ($\lambda/2$), the vertical angle range would overlap and the beams serving different users would not be sufficiently separated, thus interfering with one another.

To deliver higher speeds, massive connections, and premium user experience, 5G networks cannot use fixed broadcast beams of 3G and 4G networks. 5G broadcast beams are a group of narrow beams of appropriate widths and varied directivity that are achieved by using beamforming technology. These narrow beams sweep across intended areas and avoid coverage holes while maximizing SINR and providing minimal overlapping coverage. To create 5G broadcast beams with these characteristics, 5G antennas must support beamforming technology.

Massive MIMO is one of the promising techniques for improving spectral efficiency and network performance and that can be leveraged to reach targeted multi-gigabit throughput in 5G systems. Beamforming with large-scale antenna arrays has become a common design approach to address the issue of higher propagation loss as well as to improve spectral efficiency in 5G NR mmWave communication. Beamformers comprise an array of antennas that control the radiation pattern through the constructive and destructive superposition of signals from the different antenna elements. Beamforming can be classified as passive or active. Passive beamformers are fixed directive antennas made of passive components, such as transmission lines, that point the beam in a fixed direction. Active beamformer antennas (commonly known as phased arrays) have active phase shifters at each antenna element to change the relative phase among the elements; because they are active, the beam can be dynamically steered. Electronically steerable antennas can adopt one of three approaches to beamforming: analog, digital, and hybrid.

Analog beamforming (ABF) can be implemented in three ways: RF, local oscillator (LO), and analog baseband. With RF beamforming, phase shifting is implemented in both the RF Rx and Tx paths prior to the mixer. Reduced component cost is one of the reasons for its popularity, particularly at mmWave, where the small size of the phase shifter allows for better integration in the RF front end (RFFE). However, phase shifter precision and noise figure degradation due to the phase shifters are performance challenges for this technique. LO beamforming uses the LO distribution network for phase shifting, addressing the noise figure challenge by shifting the phase shifter from the signal path to the LO path. This increases power consumption, and the complexity scales with the size of the antenna. With analog baseband beamforming, beamforming occurs in the baseband, after down-conversion and before up-conversion, enabling the use of higher precision phase shifters. The size of the phase shifters and the complexity of the beamforming network (BFN)—i.e., mixers in each RF chain and a network of baseband splitters and combiners—are challenges.

Digital Beamforming (DBF) is performed digitally at baseband, requiring one beam former and the RFFE at each antenna element. Offering a high degree of control, DBF is considered the most flexible beamforming approach and superior to ABF for receiving and transmitting wideband signals and, more importantly, for multi-beam applications. The digital implementation has greater reconfigurability and enables treatment of RF impairments at each antenna element. In a digital array, the RF signal is converted to a digital signal at the sub array or element level and the digital signal processor is used for beamforming. The sub-array digital beamformer provides multiple simultaneous beams over a limited scan sector. Each element of the array uses a separate receiver/exciter. The digital phase shifting allows arbitrary time delays at each element which is useful to avoid unwanted beam squint effects in large arrays operating over wide bandwidth. Also, it significantly improves the array performance by producing improved adaptive pattern nulling and multiple simultaneous beams over full scan volume. It has several additional advantages compared to analog beamformers, including, e.g., antenna self-calibration, ultra-low side-lobes, array element pattern correction, and flexible power and time management. However, it requires data converters and RFFEs for each antenna element, which increases the complexity and power consumption. Fortunately, recent advances in silicon processes have reduced the complexity, power, and cost of digital beamforming, making it feasible for some phased arrays.

Figure 4A:
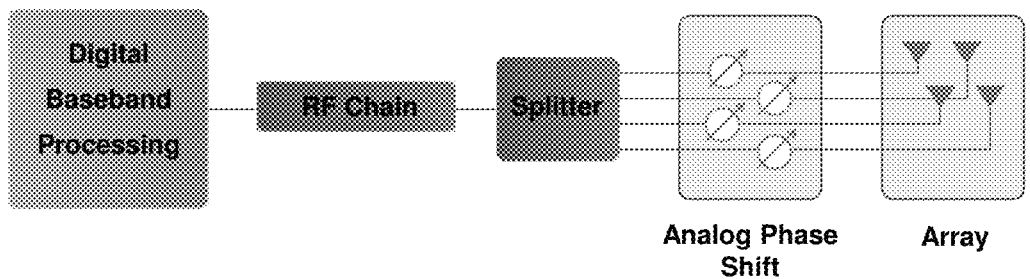
FIG. 4A shows block diagrams of an analog beam forming module, a digital beam forming module, and a hybrid beam forming module in accordance with various aspects described herein.
Figure 4A:
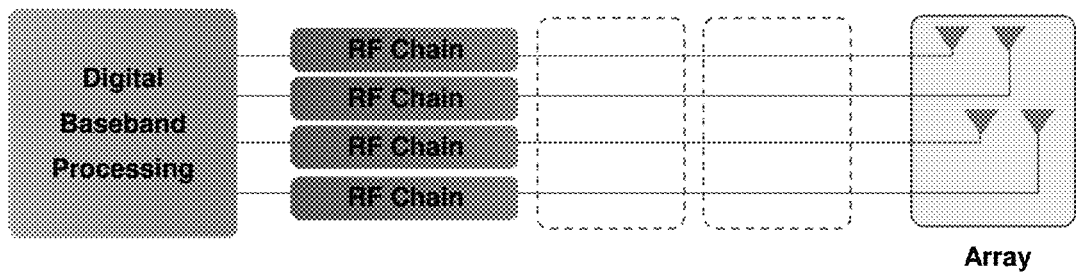
Figure 4A:
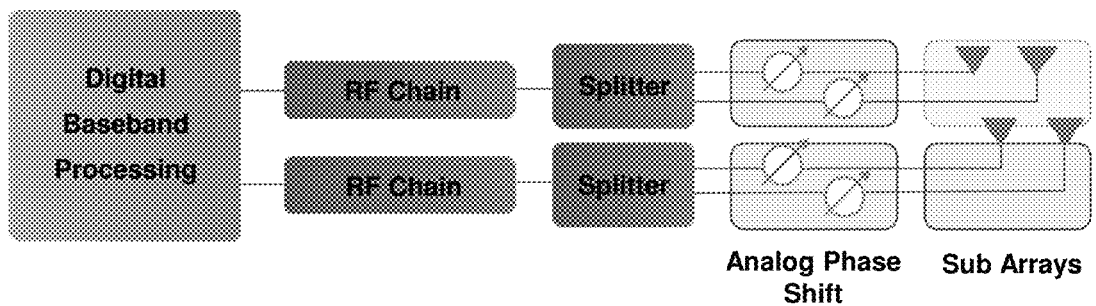

Hybrid beamforming uses the best of both alternatives: analog and digital. To reduce the complexity of digital beamforming (i.e., requiring control at each antenna element), the hybrid approach uses "two stage" beamforming—the concatenation of analog and digital beamforming—and provides a reasonable compromise between performance and complexity. FIG. 4A shows a block diagram of analog, digital, and hybrid beamforming. Each analog beamforming network serves as a subarray for the next level of digital beamforming, forming a more directive "super element" whose signal is coherently combined in the digital domain with the signals from the other super elements. Hybrid beamformers provide limited multi-beam capability.

Figure 4B:
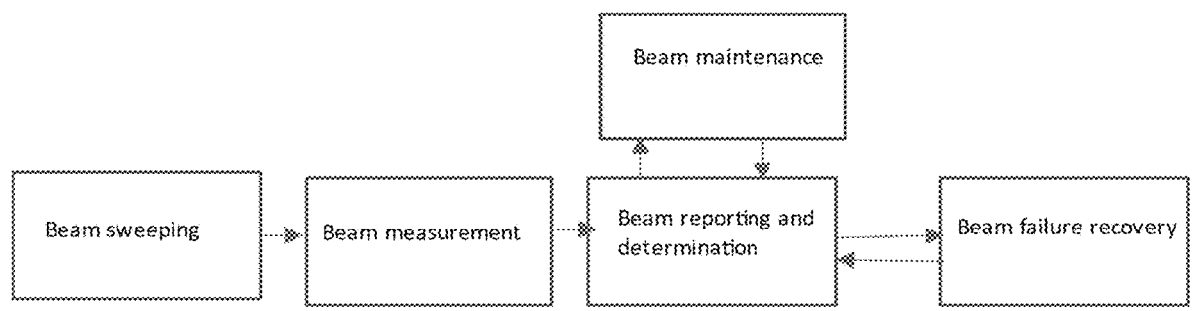
FIG. 4B is a block diagram illustrating various steps in beam management in accordance with various aspects described herein.

Beam management is critical under fast changing environments including mobility. Beam management is a physical Layer procedure that acquires and maintains a set of beam pair links. The beam pair links can be used for DL and UL transmission/reception. Beam management procedures may include the aspects shown in FIG. 4B, namely, beam sweeping (which covers a spatial area with beams transmitted and received in a predetermined way), beam measurement, beam reporting and determination (by the transmitter and a UE), beam maintenance (so that the UE has candidate beams to adapt to channel challenges), and beam recovery (after detecting beam failure). Narrower beams are crucial for better connections between the UE and the base station.

Figure 4C:
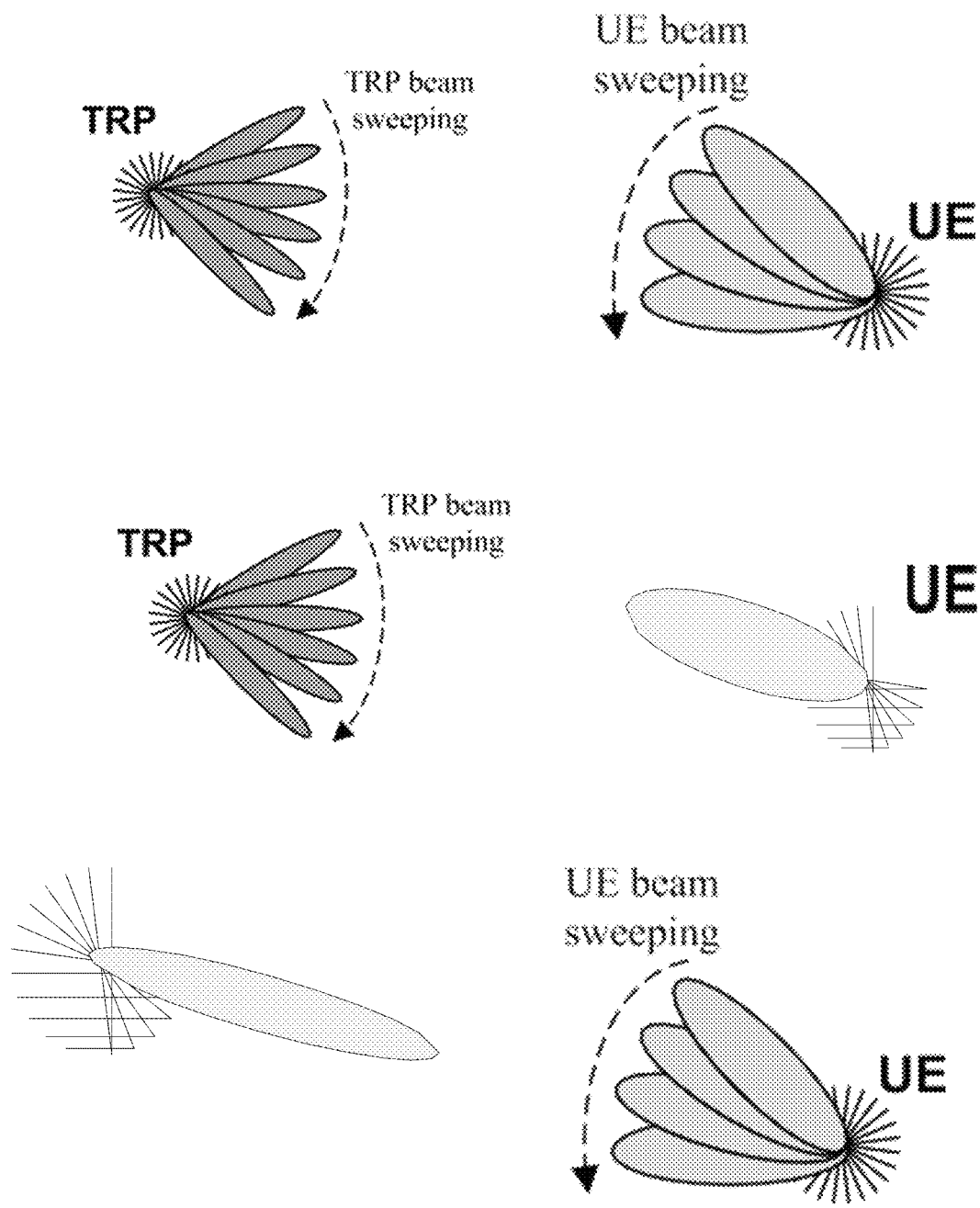
FIG. 4C illustrates beam sweeping by a transmit receive point (TRP) and a user equipment (UE) in accordance with various aspects described herein.

FIG. 4C shows three examples of beam sweeping. A first type of beam sweeping involves beam sweeping over multiple Tx beams, where each Tx beam can be transmitted on a reference signal (RS) resource for beam management. To perform sweeping over multiple Rx beams, each Tx beam can be transmitted repeatedly multiple times in the same reference signal resource set so that the receive side can sweep its Rx beams in multiple transmission instants. If there is one Rx beam (second type in FIG. 4C), the process is simplified. A third type of beam sweeping involves one transmit beam. Beam management is crucial for a successful connection between a UE and the base station.

Figure 5A:
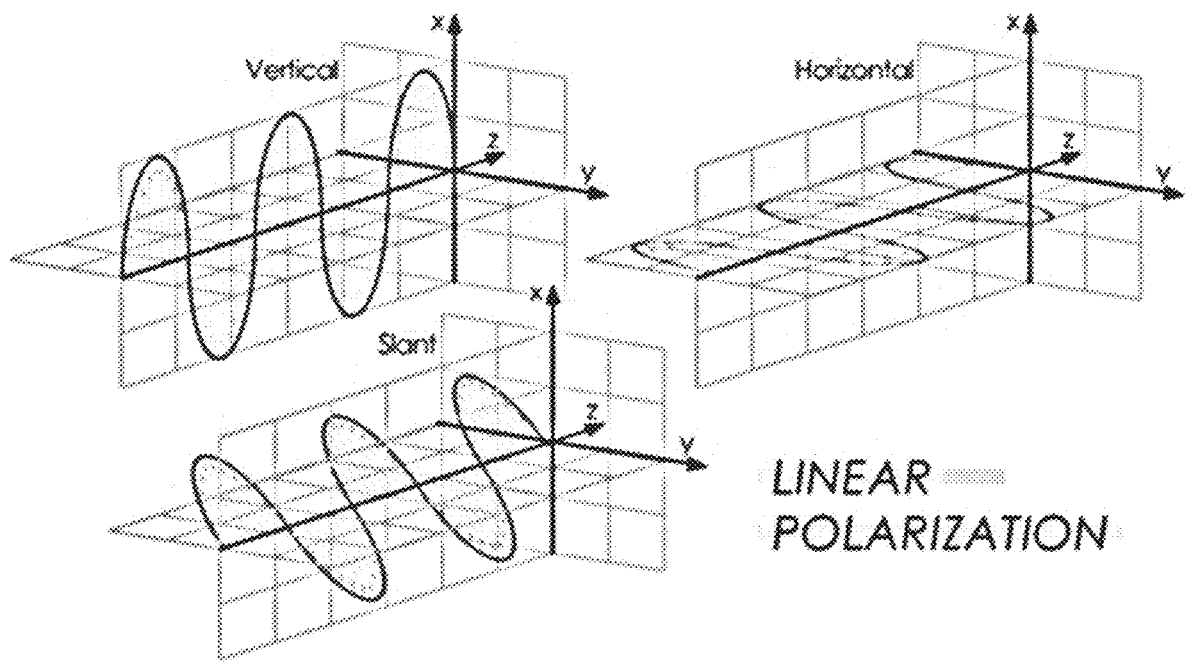
FIG. 5A illustrates electromagnetic fields in a linearly horizontal polarization, a linearly vertical polarization, and a linearly slanted polarization in accordance with various aspects described herein.

Antenna polarization is an important factor when designing radio antennas or incorporating them into small wireless or mobile communications systems. Antennas may be vertically polarized, horizontally polarized, or polarized in forms. Radio antennas with a particular polarization are generally not effective at receiving electromagnetic wave signals of a different polarization. The polarization of an electromagnetic wave is essentially the plane in which the electric wave vibrates. This is important when analyzing, designing, or configuring antennas because they are sensitive to polarization, and generally only receive or transmit a signal with a particular polarization. FIG. 5A shows the different electromagnetic waves with linear polarization. It is important to match the polarization of the RF antenna to that of the incoming signal so as to allow the maximum signal to be received. If the RF antenna polarization does not match that of the signal, there is a corresponding decrease in the level of the detected signal—i.e., it is reduced by a factor of cosine of the angle between the polarization of the RF antenna and the signal. Accordingly, the polarization of the antennas located in free space should be in the same plane to provide an improved or optimum signal. Different electromagnetic wave polarizations propagate in different ways under various circumstances. That is, for some forms of broadcasting, radio communications, or wireless systems, different forms of polarization may be used. The advantages and disadvantages of the various forms of polarization are relatively subtle, but these small differences can make a big difference for various forms of broadcasting, wireless links for radio communications, or mobile communications systems.

There are several categories of polarization, and within each type, there are several subcategories. A first type is linear polarization, which is the most common form of antenna polarization. It is characterized by the fact that all the radiation is in one plane—hence the term linear. Liner polarization can be horizontal polarization, which is a form of antenna polarization with horizontal elements in the antenna. Here, a linearly polarized antenna can pick up and radiate horizontally polarized signals (i.e., electromagnetic waves with the electric field in the horizontal plane). Linear polarization can be vertical polarization, which is a form of antenna polarization with vertical elements in the antenna (e.g., a single or multiple vertical elements). Vertical polarization (such as with an antenna having a single vertical element) can radiate equally around it in the horizontal plane. Typically, vertically polarized antennas have what is termed a low angle of radiation, which enables a large proportion of their power to be radiated at an angle close to the earth's surface. Vertically polarized antennas are generally convenient for use with automobiles.

A second type of polarization is slant polarization, which is a form of antenna polarization that is at an angle to the horizontal or vertical planes. Here, both vertically and horizontally polarized antennas can receive slant polarized signals. Most antennas today are slanted at +/−45 degrees. A third type of polarization is circular polarization. This type of polarization has particular benefits in satellite applications, where it helps overcome the effects of propagation anomalies, ground reflections, and the effects of the spin that occur on many satellites. While circular polarization might be more difficult to visualize than linear polarization, it can be imagined by visualizing a signal propagating from an RF antenna that is rotating. The tip of the electric field vector will then be seen to trace out a helix or corkscrew as it travels away from the antenna. A fourth type of polarization is mixed polarization (also known as elliptical polarization), which involves a mix of linear and circular polarizations. This can be visualized by imagining a tip of the electric field vector tracing out an elliptically shaped corkscrew. It is possible for linearly polarized antennas to receive circularly polarized signals and vice versa. The strength will be equal whether the linearly polarized antenna is mounted vertically, horizontally, or in any other plane, but directed towards the arriving signal. There will be some degradation because the signal level will be 3 dB less than if a circularly polarized antenna of the same sense is used. The same situation exists when a circularly polarized antenna receives a linearly polarized signal.

Now that we have described beams and polarization, it is important to distinguish between beamforming and polarization. More particularly, it is critical to differentiate between the direction of the beam and the direction of the electric field. First, note that all of the fields in FIG. 5A have their beam directions in the z-axis. From a beam direction point of view, they are all identical. However, from a polarization point of view, all three of the depicted fields are different. One has a vertical polarization, the second has a horizontal polarization, and the third has a slanted polarization. What defines the direction of the beam is the relative phase between the radiating elements of an antenna, but what defines the direction of the electric field is the direction of the dipole. As described above, signals transmitted/received by an orthogonally polarized pair of elements, such as a crossed-dipole antenna 202u, 202v shown in FIG. 2C, may have different polarizations—i.e., signal $s_1(t)$ may be transmitted/received with a +45 degree polarization and signal $s_2(t)$ may be transmitted/received with a −45 degree polarization. Beam direction is thus different from polarization direction (or signal direction).

Figure 6A:
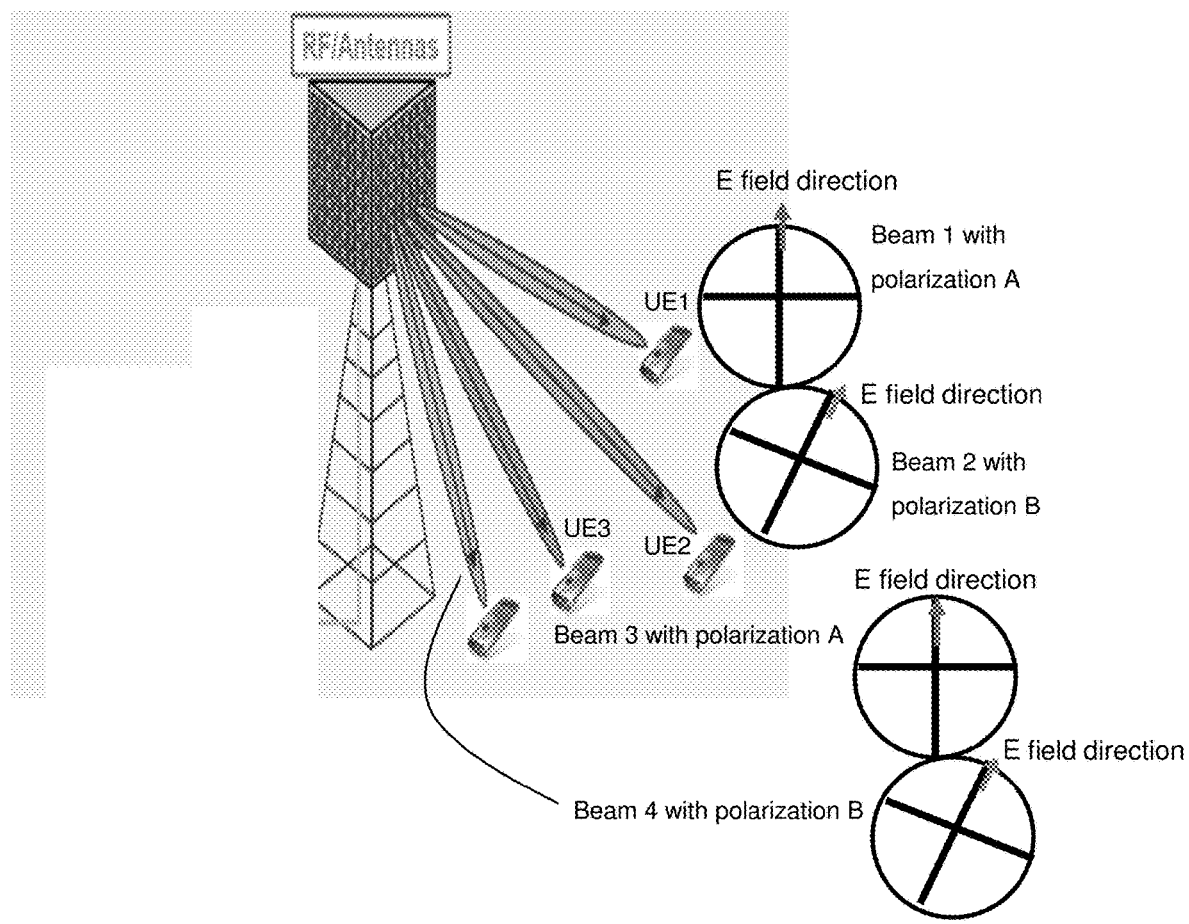
FIG. 6A is a diagram illustrating an antenna with multiple beams at various polarizations in accordance with various aspects described herein.

There is often confusion between beam rotation and polarization rotation (or adjusting). Beamforming involves defining a pattern, and more particularly a shape (e.g., width), of a beam, and beamsteering or beam rotation (which can be considered a subset of beamforming) involves pointing of a beam in particular directions. Beamsteering can be achieved by physically tilting an antenna or its housing or, alternatively, by introducing phase shifts (or changing the relative phase) between the radiating elements associated with the beam (which can be done mathematically or via circuitry). For crossed-dipole antennas, the phase shifts for beamsteering may be introduced between the dipoles that are of the same orientation (i.e., introduce relative phase shifts between some or all of the +45° dipoles; introduce relative phase shifts between some or all of the −45° dipoles). In stark contrast, polarization rotation involves adjusting the orientation of signals that are received via the beams. With polarization adjusting, the direction of a given beam is not changed. Polarization can be achieved by physically rotating the individual antenna elements or via electronic rotation of the signals. For instance, in the case of an antenna with columns of crossed-dipole antennas, a feed to +45° dipoles may be electronically processed to rotate signals for all of the +45° dipoles by the same amount (i.e., there would be no relative difference in signal polarization from one +45° dipole to the next +45° dipole in a given column of radiating elements) and a feed to −45° dipoles may be electronically processed to rotate signals for all of the −45° dipoles by the same amount (i.e., there would be no relative difference in signal polarization from one −45° dipole to the next −45° dipole in a given column of radiating elements), such that an axis of projection of the signals associated with the beam is altered without changing the orthogonality of the signals. In polarization adjusting, no phase differences are introduced between antenna dipoles of the same orientation (e.g., no phase differences are introduced between +45° dipoles and no phase differences are introduced between −45° dipoles). Instead, to rotate the signal polarization, a different kind of phase shift is applied—i.e., the phase shift may be applied to the cross-polarized pairs of all of the radiating elements (e.g., of a subarray) to simulate projecting them in another orthogonal direction following the equation shown in FIG. 2C. For instance, FIG. 6A shows four beams (beams 1 through 4) that all point in different directions. Beams 1 and 3 each has the same polarization A while beams 2 and 4 each has the same polarization B different from polarization A. However, the polarization of any of the beams can be adjusted as desired without affecting directionality of that beam. For example, the polarization of beam 1 can be adjusted from polarization A to polarization B (or to any other polarization) without affecting the direction at which beam 1 is pointing. Manipulating the polarizations of beams or their associated signals (which, again, is not the same as beamsteering or beam rotation) provides an additional degree of freedom in exploiting beam isolation. As another example, referring to the antenna of FIG. 2F for purposes of illustration, beamforming or beam steering can be achieved by introducing phases difference(s) between signals associated with E1, E2, E3, and/or E4; additionally, or alternatively, beamforming or beam steering can be achieved by introducing phases difference(s) between signals associated with E5, E6, E7, and/or E8. However, such phase differences (between E1, E2, E3, and/or E4 or between E5, E6, E7, and/or E8) do not affect the polarizations of the signals associated with those elements. Rather, polarization adjustment can be achieved by introducing phase difference(s) between signals associated with E1 and E5, between signals associated with E2 and E6, between signals associated with E3 and E7, and/or between signals associated with E4 and E8.

Different types of polarization are used in different applications to leverage their different advantages. Linear polarization is by far the most widely used in radio communications applications as the radio antennas are generally simpler and more straightforward. In recent years, there has been a phenomenal amount of growth in the use of mobile phone and short-range wireless communications. Everything from cellular communications to Wi-Fi and a host of other standards have enabled short range wireless communications to be achieved. Linear polarization is typically used for UEs because linearly polarized antennas are easier to fabricate in these devices. Because of this, the base stations are also designed to have a similar polarization. Although vertical polarization is often used, many devices like Wi-Fi routers have adjustable antennas. Also, the fact that these communications often have signal paths that may reflect from a variety of surfaces, the polarization that reaches the receiver can be relatively random, and therefore it can be less of an issue. There are many traditional mobile two-way radio communication systems still in use (for everything from emergency services to a host of private mobile radio applications where radio transceivers are in vehicles). Because vertically polarized radio antenna designs have an omni-directional radiation pattern and thus do not have to be re-oriented (as may otherwise be needed for mobile radio communications due to movement of a counterparty), vertical polarization is often used for these mobile two-way radio communications.

Assume an indoor wireless system involving a vertically polarized dipole antenna. Depolarization is defined as coupling, due to the interaction with the environment, into a state of polarization orthogonal to the original state of polarization, so that some of the power incident at the receiver may be carried by a horizontally polarized wave. Such coupling occurs because of oblique reflections from the walls as well as due to scattering from indoor clutter, such as furniture. Reflection off horizontal and vertical surfaces, such as the floors, the ceiling, or the walls, would otherwise preserve the transmitted polarization. Polarization diversity is a technique that mitigates deep fading due to random UE (e.g., handset) orientation and multi-path propagation.

The field of multiple element communications systems has been developed to maximize achievable data rates for wireless applications. Their spectral efficiency depends on the average received power as well as the decorrelation properties of the equivalent sub-channels. The issue of polarization is pertinent because polarization coupling tends to result in a lower average received power (most of the energy stays in the same polarization), but it results in a higher sub-channel decorrelation.

In microcellular systems, the base station antennas are positioned below the surrounding buildings to confine propagation area. Thus, most of the received power propagates along the street, where the transmitter is located, and in streets branched from it. In other words, the coverage area extends along a main street and side-street—hence the name "street microcell" is often used. In street microcellular systems, the cell coverage area depends on the positions of the surrounding buildings. For cellular communication systems (i.e., involving an elevated base station antenna), the primary propagation mechanism between the base station transmitter and mobile receiver is due to multiple forward diffraction over rooftops of buildings and diffraction down to the mobile terminal. However, the reduced base station antenna height in a microcellular system results in different propagation mechanisms where the signal is dominated by multiple reflections along the streets and buildings' surfaces and diffraction at street corners into side-streets. Consequently, for microcellular communications, the street configuration and reflectivity of the buildings' surfaces have a strong influence on the propagation characteristics.

Figure 5B:
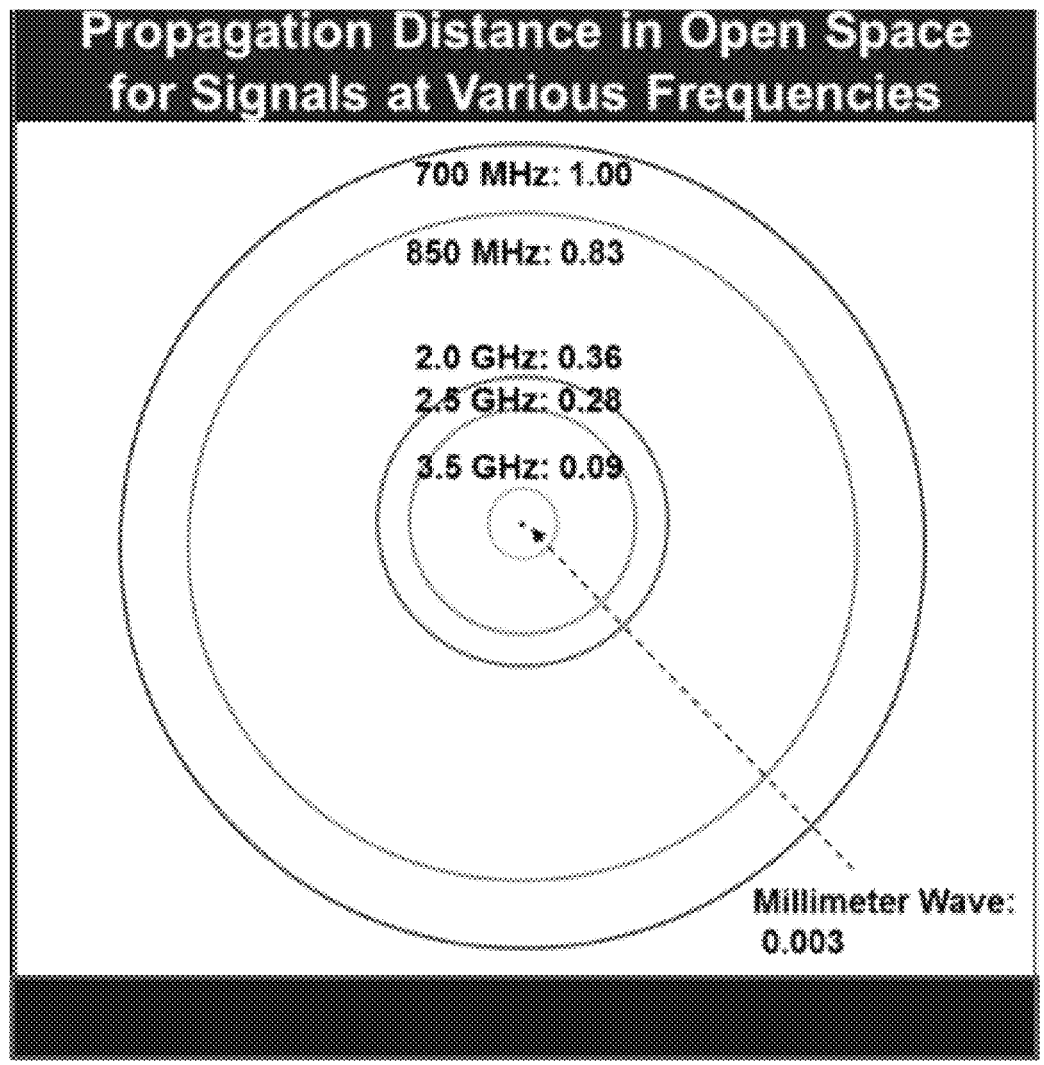
FIG. 5B shows relative converge circles for different frequency ranges in accordance with various aspects described herein.

High data demands in wireless communications has led to a large spectral requirement. The medium frequency bands in the 2.5 GHz to 6 GHz range as well as the high frequency ranges for mmWaves offer the opportunity for very wide spectrum. However, as the frequency increases, the propagation loss also increases. FIG. 5B shows relative coverage circles for different frequency ranges.

5G broadcast beams use beamforming to form a group of narrow beams of accurate widths and directivity to achieve high SINR. 5G traffic beams are more advanced and require not only accurate pointing toward multiple UEs to ensure maximal gains, but also accurate null-steering to UEs. In this way, the UEs can have improved (or maximum) coverage, reduced (or minimum) interference, and improved (or optimal) SINR. The accurate coverage of both 5G broadcast and traffic beams depends on beamforming. Therefore, high-precision beamforming is a mandatory feature for antennas to ensure consistent beam amplitudes and phases between antenna arrays. In exemplary embodiments, the beams can be of different polarizations pointing towards different UEs, as shown in FIG. 6A. Each beam may originate from a different antenna subarray and each subarray may be connected to a different RF front end with gain and phase controlled by the active components, such as a power amplifier (PA) and a low noise amplifier (LNA) attached to each subarray.

Propagation mechanisms, e.g., diffraction and reflections, are polarization dependent. For an elevated base station, a vertically polarized electric field has lower path loss as compared to a horizontally polarized electric field. However, reducing antenna height would result in a different dominant propagation mechanism. For out of sight propagation, the signal couples into side-streets via multiple reflections as well as diffraction by street corners. At larger distances in the side-street, the diffraction rays are dominated. Therefore, any of the two polarizations can be better due to dependence of the multipath propagation characteristics in out-of-sight microcellular environments. Accordingly, there is a particular slanted polarization that would be better for a particular case and scenario.

For a variety of applications, at a particular (fixed or near fixed) location, there may be multiple types of fading on a received signal, including large scale and small scale fading, typically categorized as slow and fast fading. When the fading is dominated by more predictable conditions, the system (e.g., a base station radio and/or transmitter) can identify or predict one or more polarizations (e.g., a best or optimal polarization slant (or signal direction)) as well as a beam direction pair for reception so to overcome some or all of the known or identified obstacles.

Most service providers have access to about 50 MHz of spectrum for low frequency bands, about 100 MHz to 200 MHz in the 2.5 GHz to 6 GHz range, and about 1 GHz of spectrum in the mmWave. Managing transmitted power for low frequency bands and meeting regulated (e.g., Federal Communications Commission (FCC)) maximum radiated power and required power for medium and high frequency bands to achieve reasonable coverage is a challenging task. Embodiments of adapting polarization, described herein, enable service providers to achieve the desired results.

In various embodiments, the base station (e.g., the radios and/or transmitter) can define or engineer a network to transmit information at a certain frequency and select beam direction as well as signal direction or polarization to reduce or minimize propagation losses and improve the link budget so as to obtain the best coverage while reducing power consumption.

At a basic level, in the case of a crossed-dipole antenna array, which can be a building block for beamforming, each subarray of crossed-dipole radiating elements (say a 4×4 element subarray) may form two orthogonal beams for Tx (and/or two orthogonal beams for Rx) that can be manipulated in shape and directionality in the azimuth plane and the elevation plane. As briefly mentioned above, introducing different phase shifts to the various elements (e.g., a phase difference between element 1 and element 2, a phase difference between element 1 and element 3, etc.) in the subarray may result in steering of a given beam to a desired direction. In exemplary embodiments, polarization adjusting can additionally be performed by selecting and/or adjusting beams or their associated signals, such as by selecting or utilizing only one dipole of a crossed-dipole element for beams (e.g., where only a DL beam of a +45° dipole is selected for use or where only a DL beam of a −45° dipole is selected for use), or by applying a phase difference between the orthogonal beams or associated orthogonal signals (e.g., by feeding +45° dipoles and the −45° dipoles the same signal but where the −45° dipoles are fed the signal at a different phase relative to what is fed to the +45° dipoles) so that the resulting (or summations of) orthogonal beams or associated orthogonal signals are adjusted or rotated in their projection or space (e.g., similar to that described above with respect to FIGS. 2C-2E). In the latter case, the (e.g., common or same) phase shift for or between the two different dipole orientations may be implemented on top of (or in addition) to any of the aforementioned phase shifts that might be introduced (between dipoles of the same orientation) to steer the beam or associated signal in different directions. However, again, it is to be understood and appreciated that the (e.g., common or same) phase shift for or between the two different dipole orientations does not affect the direction of the beam or associated signal (i.e., the beam or associated signal will still point in the same direction), but rather only affects how the beam or associated signal is rotationally or angularly orientated (i.e., the polarization or signal direction). In this way, an angle of orientation of a beam or associated signal may be adjusted to a different polarization (e.g., see FIG. 5A for some example orientations) such that electric (and magnetic) fields are oriented at different angles about the beam or signal path. This enables the antenna array to transmit respective beams, for different UEs (located close to one another, such as within a threshold distance from one another), in the same general direction in elevation or azimuth, but where the signals associated with those beams have different adjusted or adapted polarizations (such as one at +45° polarization and another at +90° polarization, one vertically polarized and another horizontally polarized, etc.) and thus avoid interfering with (or have reduced interference on) one another.

Returning briefly to FIG. 3B, in a first example (the top set of depictions), an antenna array is shown communicating with two UEs using individual DL beams. In a second example (the middle set of depictions), the two DL beams may be substantially separated in an azimuth direction so as to not overlap and interfere with one another; however, the two DL beams may have a vertical separation that is only half of the wavelength (λ/2) and thus may nevertheless overlap and interfere with one another in an elevation direction, which can negatively impact signal reception at the two UEs. That is, the vertical angle range may overlap and the beams serving the two different users would not be sufficiently separated. One solution to this issue is to physically increase the vertical spacing between radiating elements in the antenna array, which allows for narrower DL beams that can be more easily separated from another in the elevation direction. More generally, conventional techniques to achieve more narrow beams include adding additional antenna elements and widening the spacing between antenna elements; however, both of these techniques undesirably increase the dimensions of the overall antenna. For instance, in the third example (the bottom set of depictions), the two DL beams might be sufficiently separated from one another (e.g., by twice the wavelength (2λ)), in which case the beam overlap issue in the elevation direction is practically eliminated; however, the antenna size may have had to have quadrupled in order to provide such beam separation.

In exemplary embodiments, no change in the radiating element spacing and no increase to the antenna size may be needed; rather, the two DL beams can have different polarizations (e.g., their polarizations or the polarizations of signals associated with those beams may be adjusted or adapted so as to be different from one another) such that they do not (or only minimally) interfere with one another. In other words, the signal polarization direction of the beams can be adapted to improve beam overlap (signal isolation) while keeping the dimensions of the antenna the same or where the size of the antenna may even be reduced while achieving the same isolation.

In one or more embodiments, a best or optimal polarization to utilize for a given beam or associated signal may be determined (e.g., based on reference signal information (e.g., provided by a UE), based on noise detection techniques, based on measurements obtained for different polarizations, based on known information regarding a receiver location or orientation (such as one or more best or optimal polarizations to use for a known fixed location/orientation), and/or the like) and the beam or associated signal may be adapted or adjusted to that polarization, whether by selecting or utilizing only one dipole of a crossed-dipole element for beams or by applying a phase difference between the orthogonal beams or associated orthogonal signals, as described above, which improves signal reception at a receiver (e.g., where a stronger signal is received or where detected noise relative to detected signal information is reduced). A case where only one dipole of a crossed-dipole element is used for beams also has the advantage of reduced transmit power consumption.

Figure 6B:
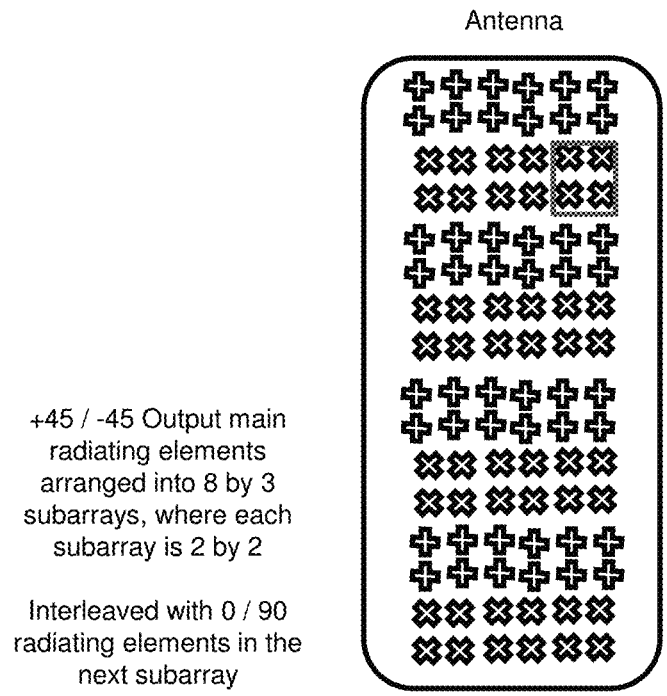
FIG. 6B is a diagram illustrating an array antenna with 8 rows and 6 columns of subarrays configured to cause different beam polarizations in accordance with various aspects described herein.

In exemplary embodiments, the polarization of a beam or associated signal for a particular subarray of an antenna may be different (e.g., adjusted) relative to the polarization of a beam or associated signal for another sub array adjacent to the particular subarray. That is, each subarray and its antenna beam may act as an independent antenna from its neighboring antennas and can have its polarization adapted and changed separately. A special case is shown in the array antenna of FIG. 6B, which has 3 by 8 subarrays. In this example, an alternating subarray in each row with 45° polarization shift forms the following rows. This can be generalized in which any subarray can have a polarization that is different from that of its neighbors. For instance, the subarrays in a vertical column of subarrays may have their respective polarizations varied in an alternating manner (e.g., the beam or associated signal for a first subarray in the vertical column may be adjusted to have a 45° polarization, the beam or associated signal for a second subarray below the first subarray in the vertical column may be adjusted to have a polarization of a different angle (such as 90° or another angle), the beam or associated signal for a third subarray below the second subarray in the vertical column may be adjusted to have a 45° polarization, and so on). As another example, a similar alternating scheme may be used for subarrays in a horizontal row of subarrays.

In this way, even in a case where two beams happen to overlap with one another (e.g., in the elevation direction or otherwise), SINR may be improved or optimized by virtue of the polarizations of the two beams (or their respective associated signals) being different from one another. There would also be no need to increase the dimensions (e.g., number of antenna elements and overall size) of the antenna; in fact the dimensions can even be reduced in some cases. In sum, the BTS and the UE can have improved (or maximum) coverage, reduced (or minimum) interference, and improved (or optimal) SINR, as beam polarization is added as another dimension to its spatial, frequency, and time properties. For instance, a stronger signal may be received or detected noise relative to detected signal information may be reduced.

In exemplary embodiments, beam-related polarization adjusting can be performed at a UE. For instance, a UE may form a beam (e.g., for UL or DL transmissions) using one or more of its antennas. In a case where there is determined signal interference (e.g., as identified by a base station) caused by an overlap of the UE's beam with a beam of another UE, the base station may identify a polarization for the UE that is different from a polarization associated with the other UE, and may instruct the UE to adjust signals associated with the beam to that polarization. In this way, signals from the UE and the other UE can have different polarizations, thereby reducing interference when those signals are received at the UL.

In various embodiments, the base station may determine a particular polarization to be the best or optimal polarization (in the UL or the DL direction) for a given UE. For UL communications, the base station may instruct the UE to adjust UL signals (associated with a signal transmit beam formed by the UE) to that particular polarization prior to transmitting those signals to the base station, thereby improving signal reception in the UL (e.g., where a stronger signal is received or where detected noise relative to detected signal information is reduced). For DL communications, the base station may instruct the UE to adjust DL signals (associated with a signal receive beam formed by the UE) to that particular polarization, thereby improving signal reception at the UE (e.g., where a stronger signal is received or where detected noise relative to detected signal information is reduced). In one or more embodiments, the base station may determine the particular polarization, in either the UL or DL direction, based on a location of the UE device, a comparative location of the UE device and one or more other UEs devices, or a combination thereof. In certain embodiments, the base station may provide data that enables the UE to determine the particular polarization. For instance, the base station may provide information regarding signal to noise ratio and/or other signal-related parameters, where the UE may, in turn, apply one or more analyses to determine the appropriate polarization adjustment needed such that a desired signal characteristic (e.g., a signal to noise ratio that is above a threshold) is achieved.

Figure 7A:
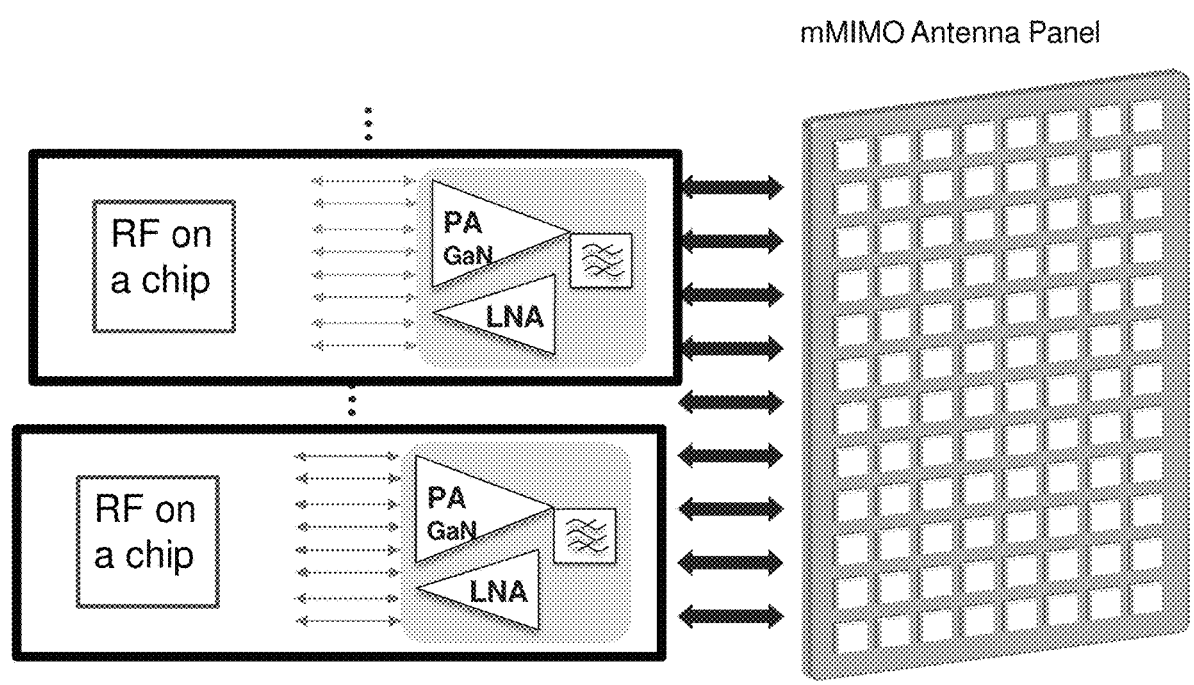
FIG. 7A is a diagram illustrating a MIMO antenna panel with a radio frequency (RF) on a chip module in accordance with various aspects described herein.

The recent developments of silicon-based RF integrated circuit (IC) design and fabrication allow for the use of low-cost element level digital transceivers with reduced cost, size, and power consumption. Thus, element level digital beamforming has become more popular in recent years. FIG. 7A shows an implementation of a panel antenna and RF on a chip that provides various functions.

Figure 7B:
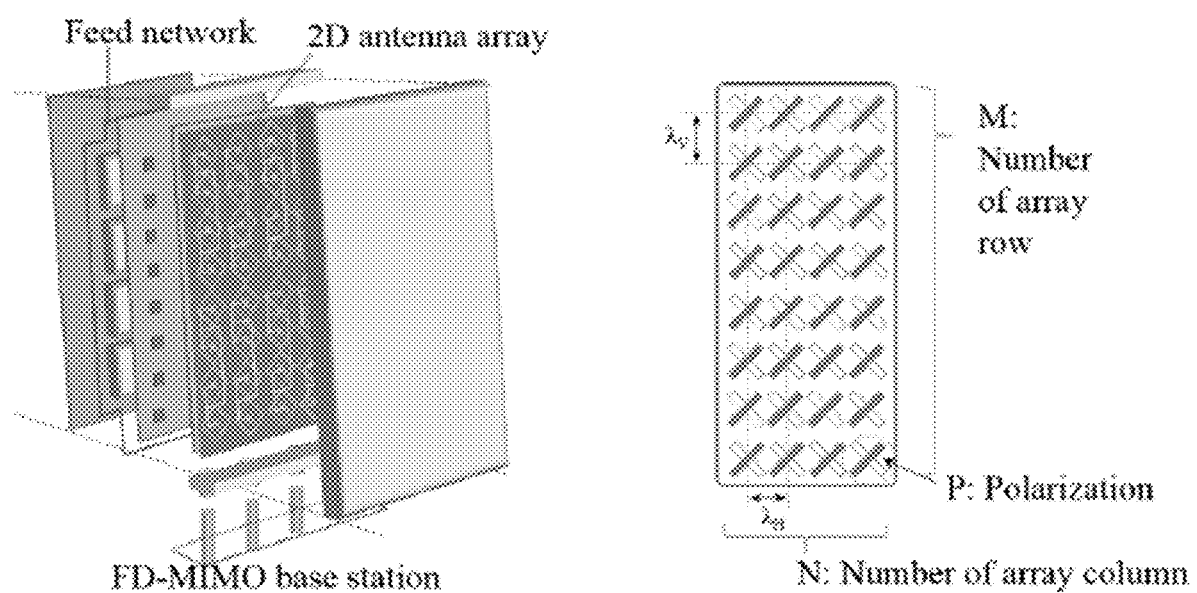
FIGS. 7B and 7C are diagrams illustrating an antenna integrated radio (AIR) in accordance with various aspects described herein.
Figure 7C:
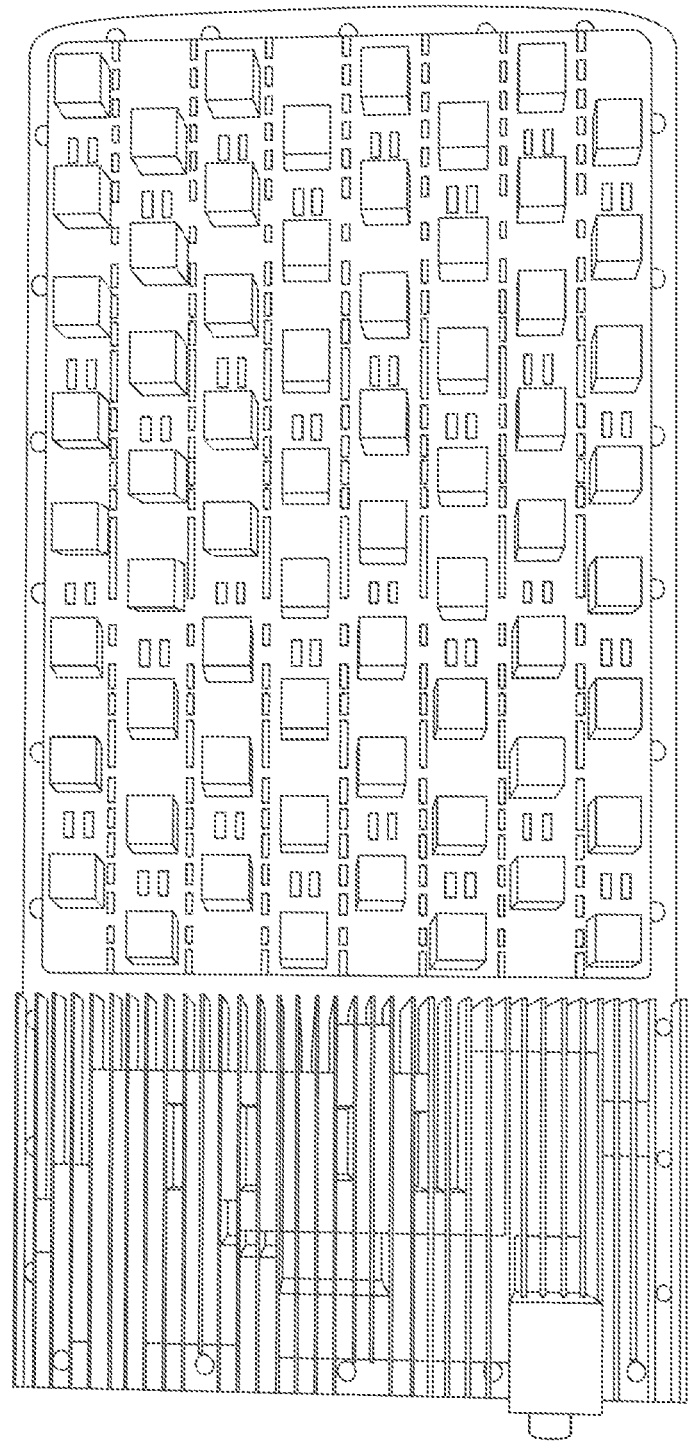

An antenna integrated radio (AIR) is a radio solution in which an antenna is integrated with a radio unit. Integration of the antenna with the radio unit helps reduce energy consumption and installation time significantly. The time required to install an antenna integrated radio is shortened, since it has fewer interconnections as compared to conventional site solutions. This significantly reduces power consumption (up to 42%) largely due to reduced feeder loss and simplified cooling. Operators continue to face the challenge of securing more space for the installation of radio units and antennas. Installation of Remote Radio Head (RRH) and antennas on a building rooftop or on a small tower in big cities has become quite difficult, both from an aesthetics perspective and network development/building point of view. Therefore, an AIR was developed to solve this problem in a distributed cell site. FIGS. 7B and 7C show an integrated antenna radio.

In various embodiments described herein, additional conditioning of aggregated beams may be performed in the AIR, a remote radio unit (RRU), an RRH, a Common Public Radio Interface (CPRI) device, a baseband unit, or another device in a radio access network (RAN). In one or more embodiments described herein, electronic rotation of polarization may be performed in an AIR, an RRU, an RRH, a CPRI device, a baseband unit, or another device in a RAN, in coordination with the conditioning of the aggregated beams.

Conditioning (or signal conditioning) may include processing that provides SINR improvements for each signal associated with a particular beam, by collecting information from each beam, compiling an estimated SINR from such information, and adjusting RF parameters of the RF link, such as the polarization of each beam or associated signal, the assigned frequency in the spectrum, and/or the like. This advantageously improves overall network performance for all signals in all of the beams in a given cell site sector. SINR can be described according to the following equation:

$$\text{SINR} = \frac{\text{Signal}}{\text{Interference} + \text{Noise}} = \frac{S}{N + N_{cp} + N_{out} + \sum I} \quad (EQ\ 2)$$

where S is the received signal level, N is the thermal noise, $Nc_p$ is the cross pole interference from cross pole beams, $N_{out}$ is the out-of-band noise, and $\Sigma I$ is the summation of the inter-cell interference contributed from surrounding cell sites with beams detected by a UE. Aggregating information for all of the beams and their corresponding signals and applying polarization rotation, frequency adjustments, etc. based on such information provides for better signal to noise ratios.

In exemplary embodiments, different solutions may be combined or aggregated. For instance, one or more of the following may be performed: polarization adjusting (whether performed in a radio, an antenna, etc.) to reduce or minimize an impact of PIM or interference (e.g., in an UL); polarization adjusting of beams or associated signals (for some or all subarrays), as described herein, to avoid interference between DL transmissions; polarization adjusting of DL beams or associated signals (for some or all subarrays), as described herein, based on a determined best or optimal polarization for a known receiver location or orientation; and signal conditioning (e.g., processing of I/Q data in a baseband unit or the like) for aggregate signals of an antenna (in the UL and/or the DL).

Figure 8:
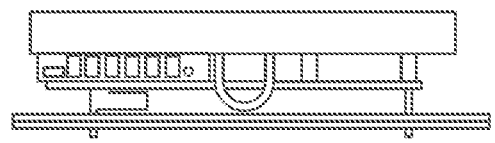
FIG. 8 illustrates an AIR design with low and mid band (e.g., below 3 GHz) passive antennas combined into a single form factor in accordance with various aspects described herein.
Figure 8:
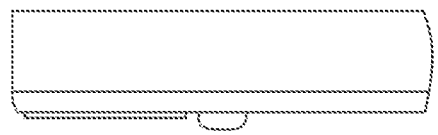
Figure 8:
Figure 8:
Figure 8:
Figure 8:
Figure 8:
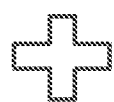
Figure 8:

Several designs have introduced an integrated antenna that combines massive MIMO AIR design with a low and mid band (below 3 GHz) passive antenna into a single form factor, such as that shown in FIG. 8. This configuration saves space and avoids footprint restrictions on sites and towers.

Communication at mmWave frequencies may affect end-to-end performance and the quality of experience perceived by users. The main issues are related to high propagation loss and the sensitivity to blockage from common materials. To overcome these limitations, the NR standard includes new physical (PHY) and medium access control (MAC) layer operations to support directional communications, and new deployment options related to multi-connectivity and inter-networking with sub-6 GHz networks such as LTE. Directional communications are enabled by antenna arrays with many elements, which are feasible at mmWave due to the small wavelength. They provide an additional beam-forming gain to the link budget, compensating for the increase in propagation loss, and enable spatial multiplexing. Exemplary embodiments described herein provide for the control of beam polarization to reduce or minimize propagation loss and link budgeting.

Directional links need precise alignment of the beams at the transmitter and the receiver, with procedures that might introduce a delay in accessing the network and updating the beam pair, thereby impacting the overall end-to-end performance. Therefore, reliable networks will need robust and optimized beam management operations, both for initial access (IA), that is, when the UE is idle, and for tracking, that is, when the UE is exchanging data with the network. Multi-connectivity solutions improve the end-to-end performance in mmWave networks by combining a reliable sub-6 GHz link (e.g., using LTE) with a high-capacity mmWave connection. In particular, NR networks can be deployed in standalone (SA) mode, which includes the NR core and RAN, and non-standalone (NSA) mode, which relies on the LTE Evolved Packet Core (EPC) and uses the LTE RAN as a radio overlay.

Figure 9:
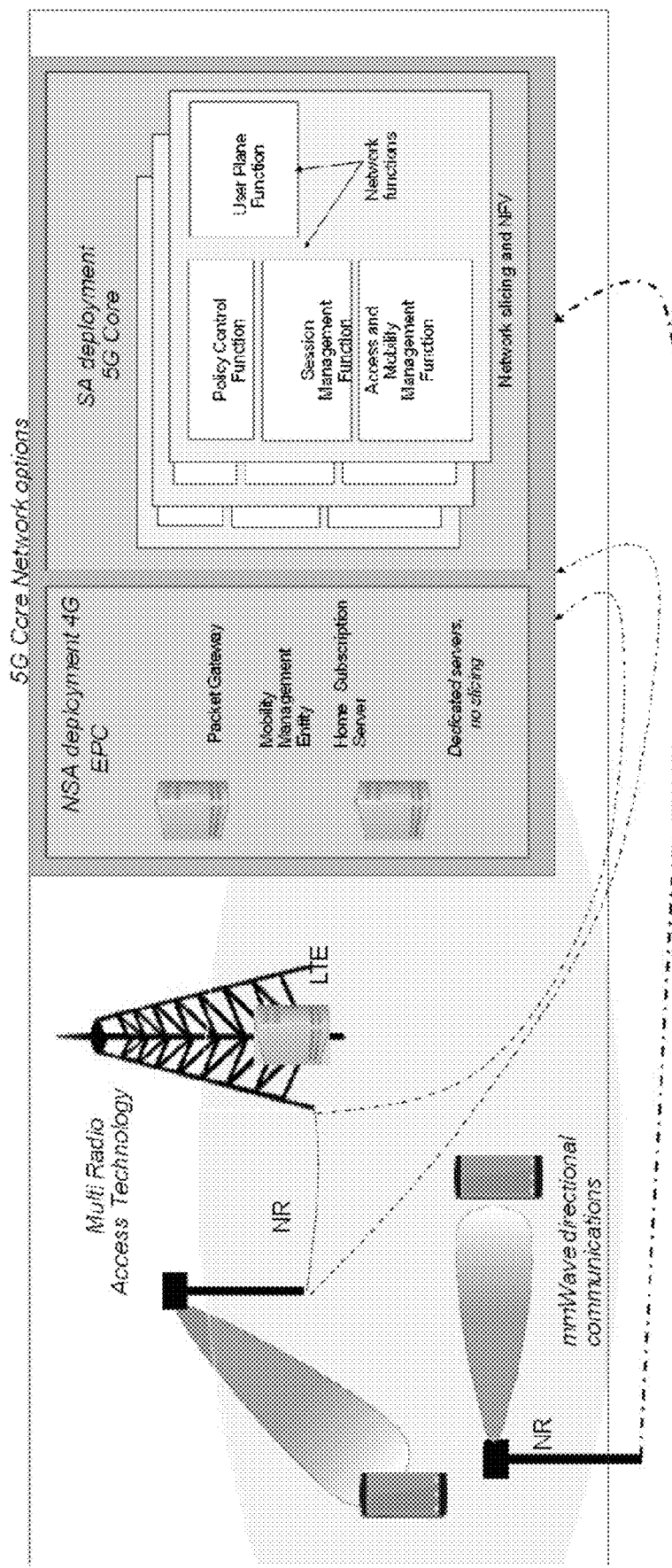
FIG. 9 illustrates standalone and non-standalone New Radio (NR) with core network options in accordance with various aspects described herein.

NR and 5G Core (5GC) are the 3GPP specifications for the RAN and the core network of 5G networks, respectively. Their main characteristic is flexibility: the specifications indeed provide a general technology framework that addresses different and, in some cases, conflicting 5G requirements and is forward compatible to accommodate future applications and use cases. FIG. 9 shows the main novelties of NR with respect to LTE. NR supports a much larger spectrum, with frequencies also in the mmWave band, and the design of PHY and MAC layer procedures for beam management. In the core network, the 5GC introduces network slicing and a higher level of flexibility and virtualization with respect to the traditional LTE EPC.

A UE's antennas are generally linearly polarized because of its simplicity, compactness, and not having a 3 dB gain drop that is typical of circular polarization. A pure horizontal polarization may be blocked by structures, such as a building. A pure vertical polarization provides the best availability or coverage for a network over long distances since the gap between a structure (e.g., building) and the base station tower are usually vertical gaps; however, at short range coverage and combined with the likely horizontal position of handhelds, these UEs may not properly receive signals. Therefore, the slant polarization is the best polarization type for retaining acceptable signal levels for all devices on a network over both short and long ranges.

Figure 10:
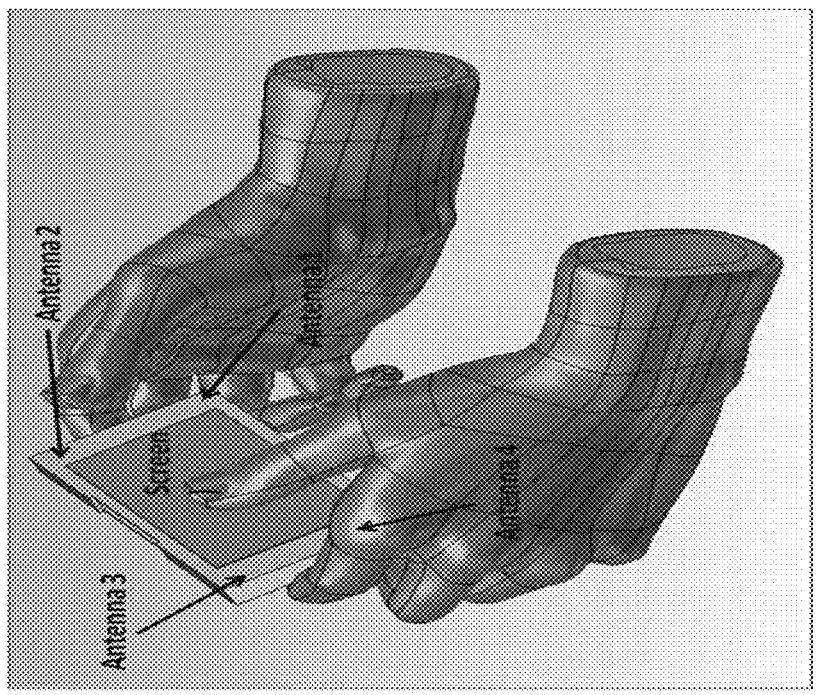
FIG. 10 illustrates models with antenna element locations in a (a) specific anthropomorphic mannequin (SAM) head and personal digital assistant (PDA) hand (talk mode), (b) PDA hand (data mode), and (c) dual hand (read mode) in accordance with various aspects described herein.
Figure 10:
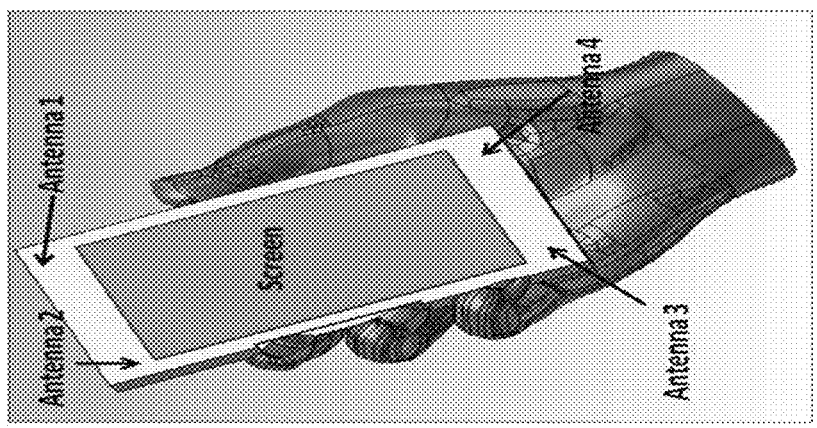
Figure 10:
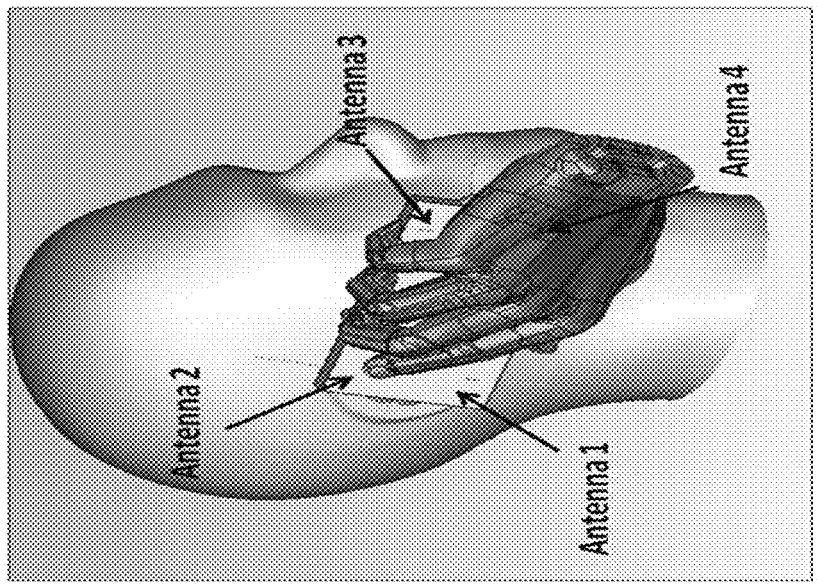

UEs must generally deal with an environment having strong fading. A multiple antenna system can usually be used in MIMO mode or diversity mode according to the SINR level. In a high SNR environment, the MIMO mode may be selected, and the highest data rate can be achieved. If the SNR is low, a diversity mode may be utilized, and diversity performance can be evaluated through mean effective gain (MEG), correlation coefficient, and diversity gains (DG). To achieve high MIMO channel performance, a (e.g., LTE) MIMO system may need envelope correlation coefficients between antenna elements to be low, and the efficiency of each element to be as high as possible. One of the first challenges is the conflict between the limited space of mobile devices and the technical requirements for a UE's MIMO antennas (i.e., multiple wideband, low correlation, and good efficiency). A compact MIMO antenna array with dual-band and dual-isolation properties can operate at multiple frequency bands. Single-band and dual-band MIMO arrays for the 700 MHz LTE ban can only provide low efficiency and a narrow bandwidth, which cannot satisfy the needs for some mobile terminal applications. Isolated antennas have been introduced to design a MIMO antenna with a very high total efficiency (e.g., higher than 2 dB) at lower frequencies. However, this "good" isolation is only realized for the MIMO array with one wideband element and one very narrow-band element. An asymmetrical dual-element antenna array with a large ground plane and wideband property has also been introduced. However, different MIMO performance may result depending on whether a user utilizes the UE on a right or left hand. Another challenge is the interaction between mobile terminals and users, which typically results in shifting of the resonant frequencies and absorption of some of the radiated/received power and thus reduced total efficiency of UE antennas. A user's hand and head effects (FIG. 10) on mobile terminal antennas have been documented. Exemplary embodiments provide an adaptive (e.g., antenna) system with beamforming and signal polarization adjusting capabilities that improve or enhance signal to noise ratio in relation to various user effects, including specific anthropomorphic mannequin (SAM) head and personal digital assistants (PDA) hand (talk mode), PDA hand (data mode), and dual hands (read mode). A UE and its antennas are typically neither horizontally nor vertically oriented all of the time. Thus, depending on their orientations (or the mode of use), polarization adaptation can provide improved signal communications with a base station. In exemplary embodiments, a UE can collect data regarding its signal to noise ratio for a particular connection and perform polarization adjusting by rotating the DL beam signal polarization such that the received signal to noise ratio is improved (e.g., above a threshold). In certain embodiments, the data can also be used as a starting point for the polarization of the UL beam signal transmitted by the UE back to the base station based on reciprocity. For instance, in some embodiments, the UE may adjust the polarization of the UL beam signal based on the data regarding the received signal's signal to noise ratio, such as by choosing a polarization for which the signal to noise ratio is at or above a threshold and not choosing a polarization for which the signal to noise ratio is below the threshold.

Many UEs, such as new generations of smartphones, include built-in sensors, such as gyroscope(s) and/or accelerometer(s). A gyroscope can track the orientation of the device based on its rotational movement. An accelerometer, on the other hand, can track acceleration or sense device vibration. A gyroscope allows a UE to measure and maintain orientation. Gyroscopic sensors can monitor and control device positions, orientation, direction, angular motion, and rotation. On-board gyroscope(s) and accelerometer(s) may work in combination with a UE's KPIs and may provide information on a current orientation of the device that is useful for determining a best or optimal signal polarization direction associated with a beam. In exemplary embodiments, the data from gyroscopes, accelerometers, or other sensors may be employed by a UE's communication signal processing system to adjust the polarization of received signals associated with a DL beam. In some embodiments, the UE may additionally, or alternatively, transmit the data from gyroscopes, accelerometers, or other sensors to a base station, which the base station (e.g., radio and/or transmitter) may utilize to adjust the polarization of its DL beam for the UE. In this way, polarization adjusting of beams or associated signals by a UE and/or a base station may provide SINR improvement or optimization as well as the benefit of interference mitigation in various embodiments.

Exemplary embodiments of polarization shifting (or adjusting) of signals in particular beams for UL or DL interference mitigation or avoidance are described herein. Polarization shifting (or adjusting) of a signal in a beam may be effected via a (e.g., mathematical) rotation of the signal. In exemplary embodiments, polarization shifting (or adjusting) may include polarization rotation of orthogonal signals in a particular beam without affecting their orthogonality. In the context of a communications system that includes an antenna with crossed-dipole radiating elements, polarization shifting of each signal in a pair of orthogonal signals corresponding to a given radiating element or a subarray may involve defining polarizations/projections that provide a "mixing" effect, where the signals in a beam are projected in a different set of axes (e.g., represented by equations $202p/202q/202r$ described in more detail above with respect to FIGS. 2C-2E). For instance, crossed-dipole radiating elements in a certain subarray may be oriented in a default (e.g., +45/−45 degree) polarization configuration, and signals associated with these radiating elements may be orthogonal and oriented in that default polarization (e.g., +45/−45 degrees). Polarization shifting may involve adjusting the orientations of orthogonal signals in a beam corresponding to the radiating elements—e.g., from a +45/−45 degree default orientation to a different orientation, such as a +30/−60 degree orientation—to effect "rotation" of the two signals in that beam. This mimics actual, physical rotation of those radiating elements without requiring or involving any movement of the radiating elements or the antenna system housing. Consequently, one resulting polarization direction (or signal in that polarization) may receive/include the interference and the other polarization direction (or signal in the other polarization) may receive/include little to none of the interference, thereby enabling mitigation or avoidance of the interference via selective signal extraction/usage. Also, on the transmit side, one polarization will be much more favorable to be received by a UE than another polarization.

In one or more embodiments, the polarization rotation may be implemented as an RF device that is configured to manipulate orthogonal RF signals. In various embodiments, the RF device may include input ports for receiving orthogonal RF signals, and output ports that provide polarization-adjusted RF signals. In certain embodiments, the ports of the RF device may be reciprocal or symmetrical in that each port may simultaneously function as an input port and an output port. In these embodiments, where a given dipole element corresponding to an RF line (and port of a communications system) operates in both the transmit (Tx) and receive (Rx) directions and/or operates in multiple frequency bands, signal manipulation by the RF mechanical device may (e.g., equally) affect both the Tx and Rx signals on that RF line across the multiple bands.

Embodiments of the polarization rotation may be implemented in any portion of an RF chain of a communications system. For instance, in various embodiments, some or all of the aspects may be implemented/integrated in a (e.g., standalone) construction or device that interfaces an antenna system and a radio (e.g., an RRH or an RRU) of the communications system and may provide for interference avoidance independently of the radio and/or based on commands from the radio.

In one or more embodiments, some, or all of the aspects of the polarization rotation may additionally, or alternatively, be integrated in the antenna system (i.e., within a housing of the antenna system (e.g., as part of smart antenna functionality)) independently of the radio and/or based on commands from the radio.

In one or more embodiments, some, or all of the aspects of the polarization rotation may additionally, or alternatively, be implemented/integrated in the radio, where polarization adjusting may be performed for Tx only, for Rx only, or for both Tx and Rx. Polarization adjustments for Tx and Rx may be the same, similar, or different. Polarization adjusting may also be performed in the same manner, in a similar manner, or differently for Tx and Rx. In some of these embodiments, where the radio provides access to individual Tx and Rx signals across the different RF lines and/or across the different frequency bands (thus obviating the need to consider constraints relating to reciprocity and nonlinearities associated with high power RF), the design of the antenna may be simplified.

Exemplary embodiments described herein also provide for polarization shifting (or adjusting) of signals that is affected electronically and/or in the digital domain. Electronic and/or digital manipulation of signals involves both real and complex (I/Q values, and thus enables processing techniques that are difficult to implement using real numbers alone (i.e., in the RF domain). In any case, electronic and/or digital processing or manipulation (e.g., based on the equations $202p/202q/202r$ described in more detail below with respect to FIGS. 2D and 2E or equivalents of equations $202p/202q/202r$) can similarly affect the above-described (e.g., mathematical) rotation of signals to mimic actual, physical rotation of radiating elements without requiring or involving any movement of the radiating elements or the antenna system housing.

In various embodiments, electronic and/or digital manipulation of signals may be implemented in a radio. With access to individual Tx and Rx signals across different RF lines and/or across different frequency bands, electronic- or digital-based polarization shifting of signals can be flexibly implemented without the need to consider constraints relating to reciprocity and nonlinearities associated with high power RF.

A CPRI device (e.g., server) may be deployed on a CPRI uplink (UL) between a radio and a baseband unit (BBU) of a communications system and may be configured to analyze and manipulate baseband I/Q data to remove various types and sources of interference and provide insight into overall spectrum health. For instance, a CPRI device may be capable of performing PIM cancellation, SINR optimization, narrow/wideband interference cancellation, etc. In one or more embodiments, electronic and/or digital manipulation of signals may additionally, or alternatively, be implemented in a CPRI device. While a CPRI device might not have flexible access to individual Tx and Rx signals across different RF lines and/or across different frequency bands, electronic and/or digital manipulation of signals (e.g., based on the equations $202p/202q/202r$ described in more detail below with respect to FIGS. 2C-2E or equivalents of equations $202p/202q/202r$) may nevertheless be performed based on I/Q data to effect signal rotations.

Based on an analysis of known or likely interference/PIM levels, characteristics, and/or combinations, proper selection of polarization shifting/adjusting parameters/values, phase shifts, and/or the like may be determined and utilized to facilitate interference/PIM mitigation or avoidance. For instance, adjusting the polarization of orthogonal RF signals such that one resulting polarization direction (or signal in that polarization) receives/includes the interference/PIM and the other polarization direction (or signal in the other polarization) receives/includes little to none of the interference/PIM enables mitigation or avoidance of the interference/PIM via selective signal extraction/usage. Additionally, or alternatively, DL signals can be manipulated or otherwise influenced in a way that minimizes or reduces the amount of interference/PIM that is received in the UL, which can improve overall UL performance and coverage. The principle of orthogonality between the different modes of transmission can also be considered, where interference/PIM source(s) minimally interact with transmissions, thereby reducing the level of interference/PIM detected/received by a communications system. In one or more of the implementations described above that provide for manipulation or polarization adjusting of orthogonal signals (e.g., whether to reduce or minimize an impact of PIM or interference in an UL, avoid interference between DL transmissions, accommodate a desired polarization for a known receiver location or orientation so as to avoid interference and thus improve SINR, and so on), one or more algorithms may be defined to perform and/or control the polarization adjusting. The algorithm(s) may perform polarization rotation of first and second RF signals of an orthogonal signal pair such that interference/PIM that might be imposed on the first RF signal may be reduced while increasing interference/PIM that might be imposed on the second RF signal. The algorithm(s) may be implemented in an RRU, a RRH, a CPRI device, a baseband unit, or another device in a RAN. The algorithm(s) may perform polarization adjusting by way of digital signal processing of digital data associated with the first and second RF signals or by way of analog signal processing of analog signals associated with the first and second RF signals. Additionally, or alternatively, the algorithm(s) may be performed for Tx signals, Rx signals, or both. In some embodiments, the algorithm(s) may provide polarization adjusting without requiring any physical rotation of the crossed-dipole radiating elements or a housing of the antenna system.

In various embodiments, some or all the polarization shifting functionality provided by any of the antenna implementation(s) or via electronic and/or digital processing may be performed automatically (based on detected interference/PIM levels) by one or more smart detection/mitigation/cancellation devices, systems, and/or algorithms. In certain embodiments, some or all of the polarization shifting functionality may be performed manually—e.g., by one or more operators or administrators in light of detected interference/PIM level(s). In these embodiments, one or more preset conditions or settings (e.g., relating to particular adjustments, such as physical (e.g., linear and/or rotational) displacement values, polarization/projection amounts or values, etc.) may be available for user selection, and may, when selected, cause the appropriate polarization shifting to be effected accordingly.

In certain embodiments, some or all of the aspects of the polarization shifting functionality provided via electronic and/or digital processing may be combined with each other and/or with one or more other interference/PIM mitigation or avoidance techniques. For instance, either or both polarization adjusting and electronic-/digital-based polarization adjusting may be combined with physical rotation of radiating elements and/or hardware-based (and/or software-based) signal conditioning of (e.g., UL) signals to provide overall (e.g., complementary) interference/PIM mitigation or avoidance.

In some embodiments, various polarization shifting techniques described herein can be exploited in time-division duplex (TDD) systems and/or frequency-division duplex (FDD) systems to relax, loosen, or otherwise decrease the number of system implementation requirements, such as those relating to guard times/bands in TDD and frequency separation in FDD.

Interference or PIM can seriously degrade UL performance in a communications system, such as 4G/5G base stations. Transmissions in two or more frequency bands by a base station or by multiple base stations can lead to nonlinear mixing of DL signals, resulting in an intermodulation product—i.e., PIM. PIM can be internal to a base station and its antenna system or external thereto. Internal PIM may be caused by non-linearities in passive devices (e.g., filters, duplexers, connectors, cables, antenna components, etc.) within a transmit signal path of a multi-band base station. The mixing of DL signals within each path can result in internal PIM. That is, a given path may suffer from internal PIM simply due to the mixing of DL carriers transmitted in that path. Internal PIM generated by the mixing of DL signals transmitted in different paths is generally not a problem. External PIM may be generated by an object that is external to a base station and its antenna system—e.g., a non-linear metallic object in the vicinity of an antenna (typically within 10 feet), such as the PIM source 200p of FIG. 2A. DL signals transmitted over different paths may illuminate an external PIM source and mix to generate PIM externally. Both multi-band and single-band base stations are susceptible to external PIM. Consider a base station operating over two band in different bands—e.g., DL 1 and DL 2 (e.g., 1102 of FIG. 11A). Note that DL1 and DL2 can be from different or the same beam. For PIM to be generated by a PIM source, both DL signals must be received by the PIM source. If only one of the DL signals is received by the PIM source, no PIM will be generated since there will be no intermodulation mixing. Thus, PIM can be avoided if simultaneous reception of either DL 1 or DL 2 by the PIM source is prevented.

In exemplary embodiments, PIM may be avoided or mitigated by modifying or adjusting path/port mapping and/or the polarization of DL signals. In particular, DL swapping and DL swapping and rotation implementations/algorithms are described herein that prevent or reduce the generation of internal or external PIM by altering DL path/port mapping, leveraging DL signal transmission timing differences, and/or manipulating the polarization of one or more of multiple DLs such that DL signals of different frequencies are not received simultaneously (or at the same strength) by a PIM source. While the description hereafter describes examples of DL swapping and DL swapping and rotation involving two carriers, it is to be appreciated and understood that the DL swapping and DL swapping and rotation implementations may be applied in communications systems that operate over three or more carriers or multiple beams. In any case, by preventing the reception by the PIM source of one or more DL signals, the frequency of the intermodulation product may be altered, thereby avoiding, or preventing PIM from being generated and impacting ULs.

Figure 11A:
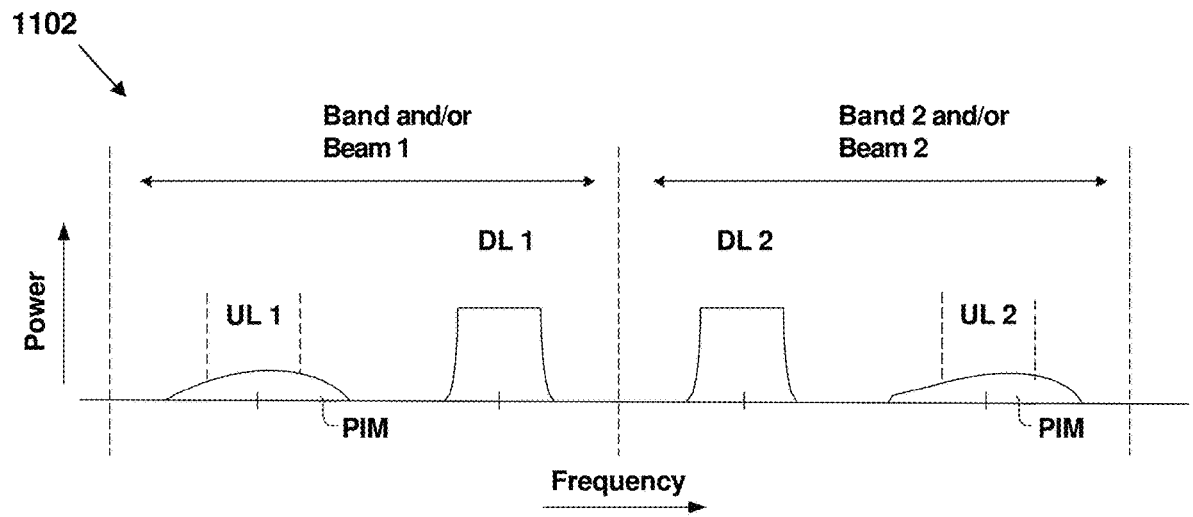
FIG. 11A shows graphical representations of a multi-band (i.e., dual band) communications system subject to PIM in accordance with various aspects described herein.
Figure 11A:
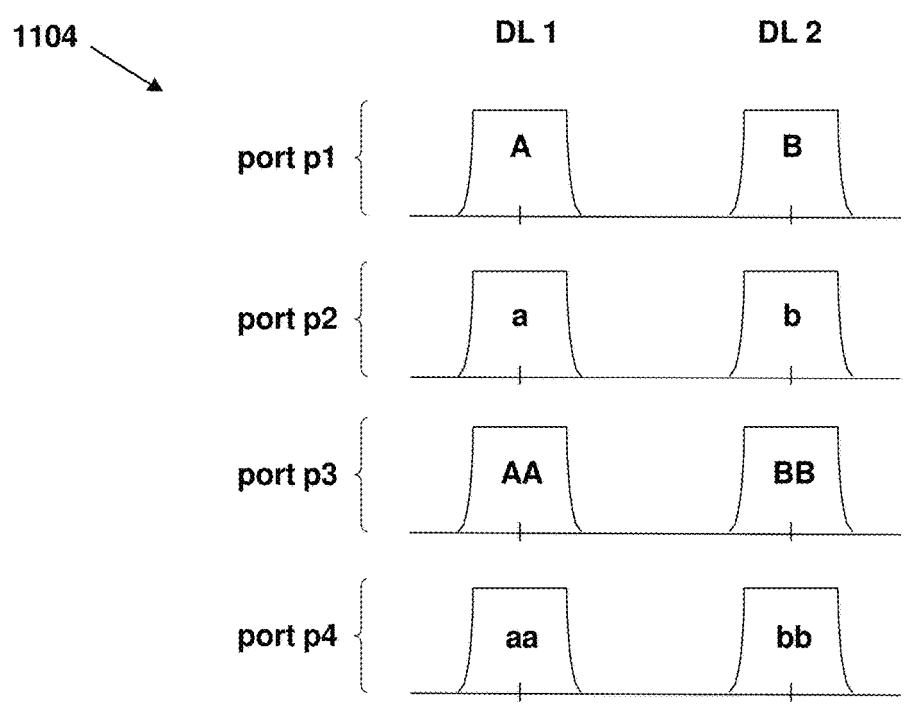

To illustrate the DL swapping and DL swapping and rotation implementations, reference is made to MIMO systems in which multiple signals, referred to as constituent signals, are transmitted over each DL carrier. In a 2- or 4-port DL transmission system (2 Tx or 4 Tx), for instance, 2- or 4-port dual-slant cross-polarized (Xpol) antennas may be used (e.g., FIGS. 11B). In the case of multi-band operation where two signals (one in each of two bands) DL 1 and DL 2 are each configured to transmit four signals (4 Tx), and where a 4-port antenna (with two arrays of dual-slant crossed dipoles) is employed for transmitting over the two bands, we can have the following:

- A, a, AA, aa represent constituent signals for beam 1 (DL 1);
- B, b, BB, bb represents constituent signals for beam 2 (DL 2); and
- p1, p2, p3, p4 represent the [+45, −45, +45, −45] ports of the Xpol antenna (e.g., from left to right) (1104 of FIG. 11A).

Typically, DL signals in such a configuration may be mapped (by default) to transmitter paths and antenna ports as follows:

- path 1 to p1=A, B;
- path 2 to p2=a, b;
- path 3 to p3=AA, BB; and
- path 4 to p4=aa, bb, which can also be written as: [A a AA aa]=[p1 p2 p3 p4], [B b BB bb]=[p1 p2 p3 p4], where path mapping may determine which signals are transmitted via a +45 degree dipole polarization and which signals are transmitted via a −45 degree dipole polarization. Here, the DL signals may be combined into a multi-carrier signal before they are converted into high power RF signals by signal path blocks. Such signal path blocks may include power amplifiers, filters, duplexers, connectors, cabling to the antenna, etc. and, therefore, can introduce multiple sources of internal PIM. In particular, internal PIM may be generated in path 1 from the mixing of A and B, may be generated in path 2 from the mixing of a and b, and so on. Additionally, the default path and antenna port mapping may also play a role in external PIM generation.

Figure 11B:
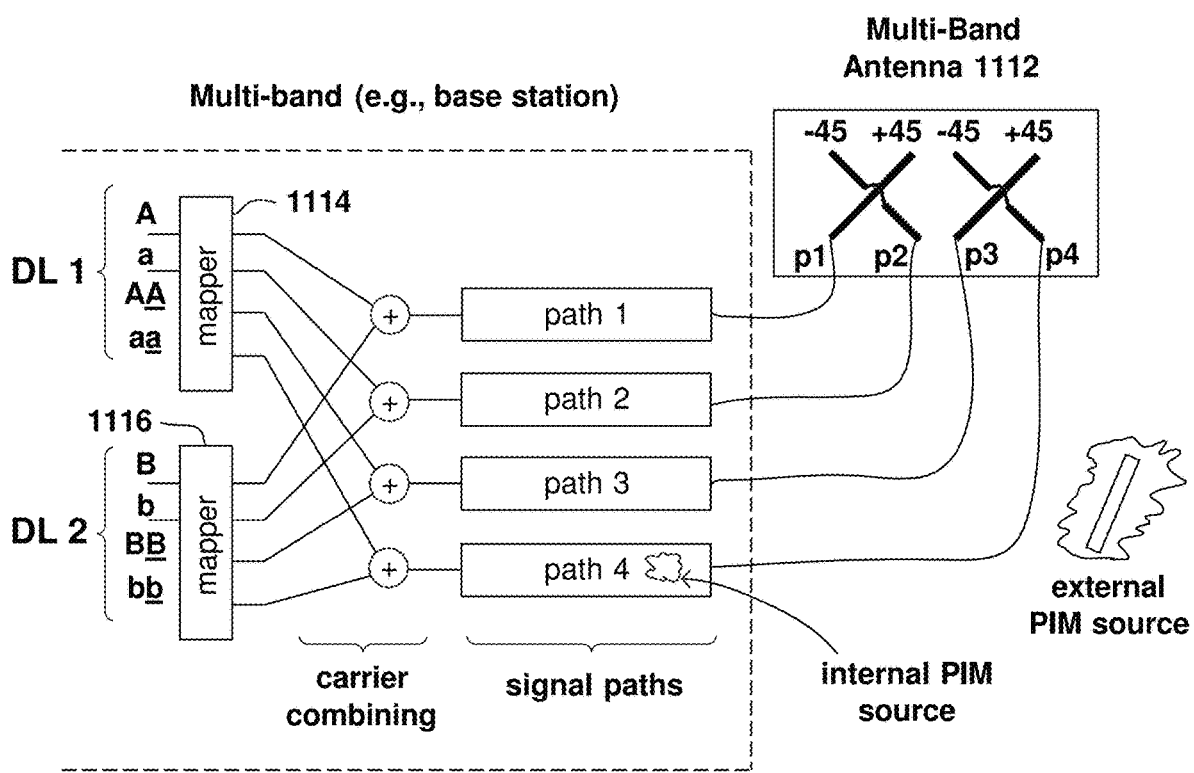
FIG. 11B is a block diagram illustrating an example, non-limiting embodiment of path/port mapping functionality in a downlink signal path of a multi-band communications system in accordance with various aspects described herein.

In exemplary embodiments, mapping block(s)/functionality may be provided in DLs to change or alter path and antenna port mapping. The mapping may be hardcoded or hardwired or may, alternatively, be implemented as a control system (e.g., in hardware, software, or a combination of hardware and software) that selectively maps signals to paths/ports based on detected PIM characteristics, such as the polarization of the PIM. Configuring how the constituent signals of each of the DL carriers are mapped to the paths and antenna ports can affect (or alter) how/whether PIM is generated. FIG. 11B is a block diagram 1110 illustrating an example, non-limiting embodiment of path/port mapping functionality in a downlink signal path of a multi-band communications system in accordance with various aspects described herein. As shown in FIG. 11B, a multi-band antenna 1112 may be communicatively coupled to paths 1, 2, 3, and 4 of a multi-band base station via ports p1, p2, p3, and p4. In various embodiments, the multi band antenna 1112 may be similar to, may be the same as, or may otherwise correspond to the antenna 210 of FIG. 2A. In certain embodiments, the multi-band base station of FIG. 11B may correspond to a radio, a baseband unit (e.g., one or more distributed units), or any other device or system of a radio access network (RAN). In the above-described default mapping, carrier combining may result in A+B feeding into path 1, a+b feeding in path 2, AA+BB feeding into path 3, and aa+bb feeding into path 4. However, inclusion of mappers 1114 and 1116 into the base station as shown in FIG. 11B permits altered mapping of constituent signals to the paths/antenna ports to affect (or alter) how/whether PIM is generated.

Figure 11C:
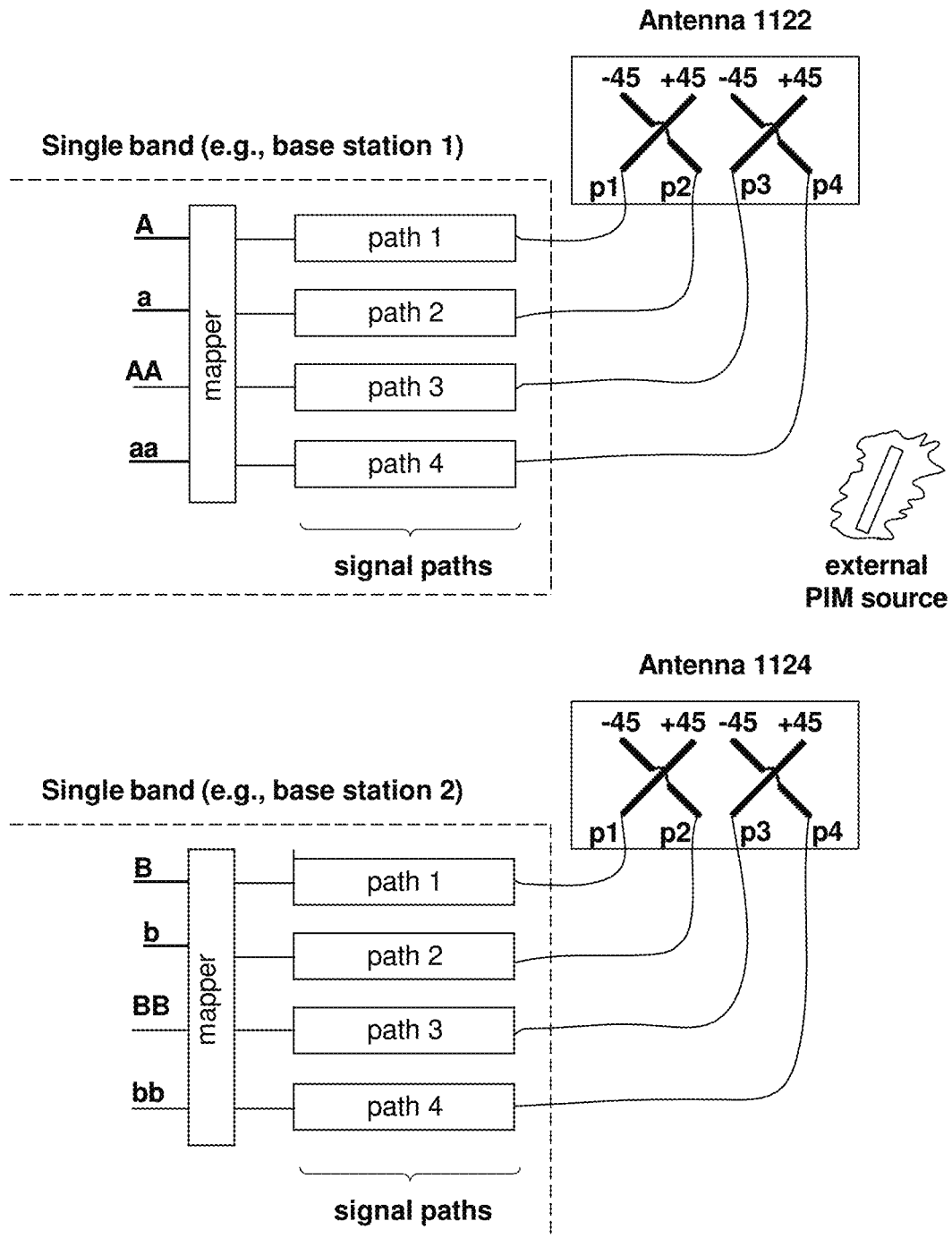
FIG. 11C is a block diagram illustrating an example, non-limiting embodiment of path/port mapping functionality in downlink signal paths of single-band communications systems in accordance with various aspects described herein.

In certain embodiments, mapping block(s) or functionality may similarly be employed in separate single-band base stations or transmitters, each with its own antenna system. FIG. 11C is a block diagram 1120 illustrating an example, non-limiting embodiment of path/port mapping functionality in downlink signal paths of single-band communications systems (including antennas 1122 and 1124) in accordance with various aspects described herein. While internal PIM might not be an issue here since each of the signal path blocks is illuminated by a single carrier, external PIM is nevertheless a problem due to possible illumination of an external PIM source by both carriers. The inclusion of mapping blocks as shown in FIG. 11C may enable mapping of constituent signals to specific paths/antenna ports to affect (or alter) how/whether PIM is generated.

Figure 11D:
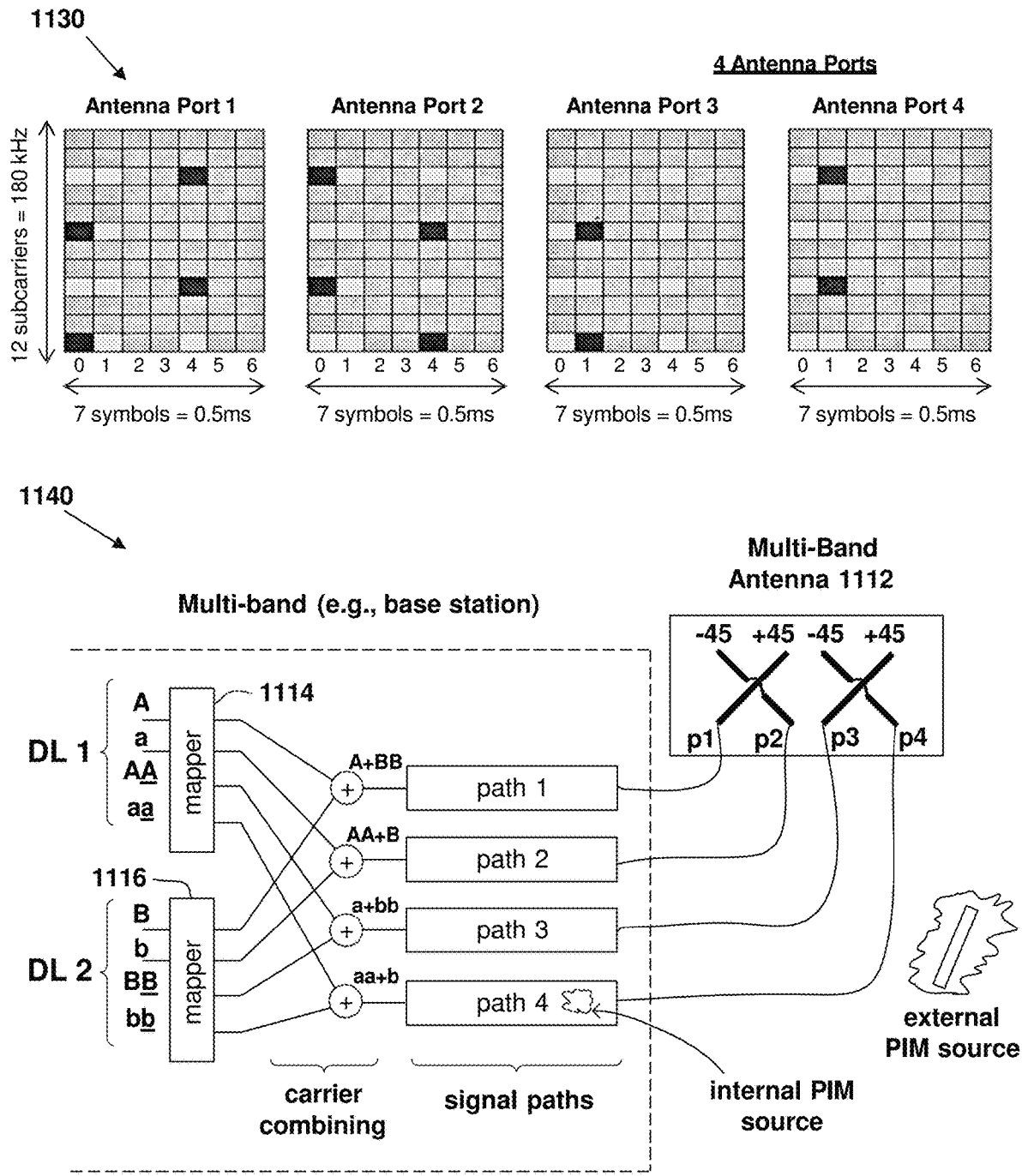
FIG. 11D illustrates an example, non-limiting embodiment of a particular path/port mapping in a downlink signal path of a multi-band communications system in accordance with various aspects described herein.

In exemplary embodiments, the timing of DL signal transmissions can be leveraged in conjunction with the aforementioned path and port mapping to mitigate or avoid PIM. In LTE, for instance, the DL cell specific reference signal (RS) is generally used to support demodulation at UEs. RS may be transmitted at different times on different antenna ports. FIG. 11D illustrates an example, non-limiting embodiment of a particular path/port mapping in a downlink signal path of a multi-band communications system in accordance with various aspects described herein. The communications system 1140 shown may correspond to the system 1110 of FIG. 11B. Reference number 1130 of FIG. 11D illustrates RS timing for a 4 Tx mode. As shown, RS is transmitted in symbols 0 and 4 via antenna ports 1 and 2 (i.e., early transmissions) and on symbols 1 via antenna ports 3 and 4 (i.e., late transmissions). With reference to the abovementioned constituent signal terminology, RS for DL 1 is transmitted early in A and a and late in AA and aa. Similarly, RS for DL 2 is transmitted early in B and b and late in BB and bb. Here, adding the letters e and/to these signal names to designate early/late transition timing, and using default path and antenna port mapping, yields:

- p1 =Ae, Be;
- p2=ae, be;
- p3=AAl, BBl; and
- p4=aal, bbl.

If a PIM source, whether internal or external, receives the RS of DL 1 and DL 2 at the same time, PIM may be generated from the mixing of these RS. However, if the PIM source receives the RS from DL 1 and RS from DL 2 at different times, PIM can be avoided. PIM that is generated from the mixing of RS is referred to herein as RS PIM. While RS signals are not the only DL signals that mix and generate PIM, the impact of RS PIM is significant to the overall degradation of the UL because RS PIM can introduce interference every 3 out of every 7 time slots, regardless of the amount of DL traffic or number of active users. Therefore, RS PIM can impact the reception of every UL message that is received by a given base station.

Under the aforementioned default or standard path and port mapping, RS from DL 1 and DL 2 are transmitted at the same time on all paths. Thus, if there are internal PIM sources in any of the four signal paths, PIM will be generated. Exemplary DL swapping embodiments address this issue and avoid generation of internal PIM due to RS by altering path mapping based on the timing of RS signals for each of the ports—i.e. as follows (1140 of FIG. 11D):

- p1=Ae, BBl;
- p2=AAl, Be;

p3=ae, bbl; and p4=aal, be.

With this exemplary path mapping, the generation of RS PIM can be avoided altogether since RS from DL 1 and DL 2 are prevented from being simultaneously active in any of the paths. In this way, knowledge of RS timing can be used to map the DL constituent signals to particular paths/ports to avoid generation of RS PIM.

It is to be appreciated and understood that the DL swapping implementation/algorithm is not limited to mitigating intermodulation from passive sources. In various embodiments, DL swapping can be employed to reduce intermodulation caused by active component(s), including, but not limited to, diodes, transistors, power amplifiers, and any other devices in the transmit signal path. It is also to be appreciated and understood that other path mapping schemes may be utilized to eliminate or reduce RS PIM generation.

Figure 11E:
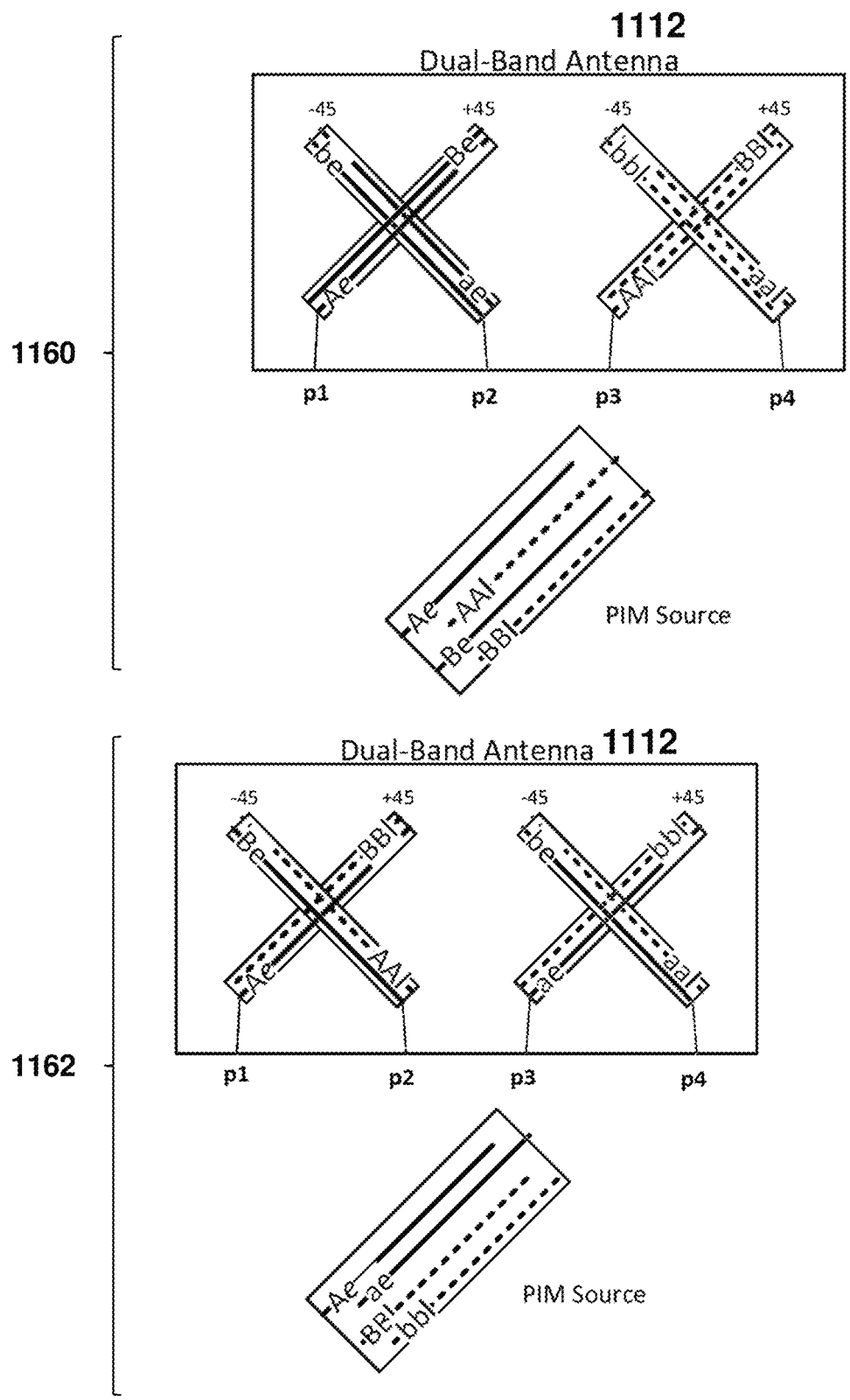
FIG. 11E illustrates a dual-band antenna with default path/port mapping in comparison with altered path/port mapping in accordance with various aspects described herein.

To reiterate, external PIM sources are typically linearly polarized, meaning that the electric field generated by the source has a dominant orientation. For the PIM source to generate a significant amount of PIM, it needs to be a "good antenna"—i.e., capable of receiving the DLs effectively, mixing them, and then radiating the mixed signals. Dipole- and monopole-like structures, such as pipes, ducts, and roof flashing mounted in the vicinity of an antenna, make for good antennas, and therefore, are good PIM sources. The electric field of PIM generated by any of these objects will be linearly polarized (a polarization that matches the orientation of the physical structure of the object). Thus, the amount of energy received by the PIM source from each of the DL signals will depend on the relative polarization of the PIM source with respect to the polarization of the DL signals. Consider a simple example where an external PIM source, with a +45 degree polarization, is located in front of an antenna. Because of its orientation, the PIM source will pick up energy transmitted by the +45 dipole ports of the antenna. FIG. 11E illustrates a dual-band antenna with default path/port mapping in comparison with altered path/port mapping in accordance with various aspects described herein. With the aforementioned default path and antenna port mapping, the PIM source will be illuminated by the DL signals Ae, AAl, Be, and BBl, and not by ae, aal, be, or bbl (1160 of FIG. 11E). Since the PIM source is illuminated by two early and two late transmissions, RS PIM will be generated. In exemplary embodiments of DL swapping, knowledge of RS timing can be used in conjunction with the known polarizations of antenna ports to facilitate avoidance of RS PIM. In various embodiments, alteration of path/port mapping based on the timing of RS signals and port polarization may be as follows:

p1 (+45)=Ae, BBl;

p2 (−45)=AAl, Be;

p3 (+45)=ae, bbl; and p4 (−45)=aal, be (1162 of FIG. 11E).

With this mapping, DL 1 may transmit early on the +45 degree polarization and late on the −45 degree polarization. Similarly, DL 2 may transmit late on the +45 degree polarization and early on the −45 degree polarization. This results in the +45 degree polarized PIM source receiving only early transmissions from DL 1 and late transmissions from DL 2. Since RS is not received simultaneously by the PIM source, RS PIM may therefore be avoided. This may be the case whether the PIM source is oriented at a +45 degree tilt or a −45 degree tilt.

Figure 11F:
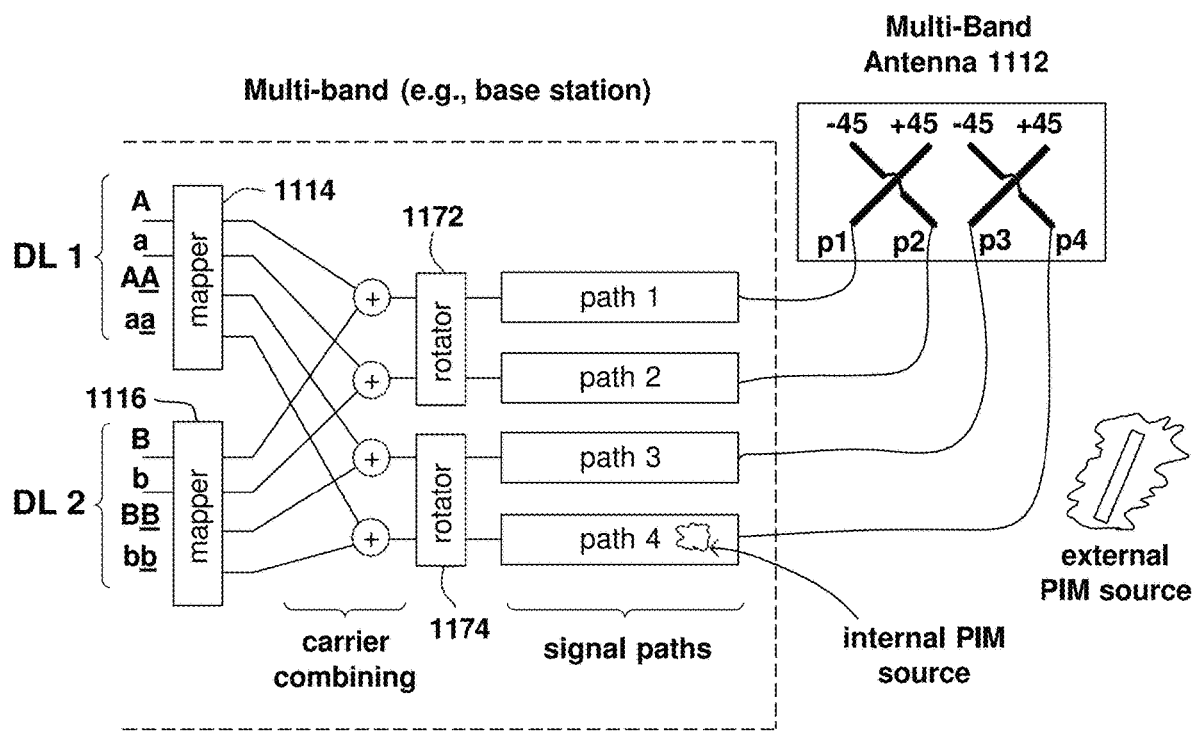
FIG. 11F is a block diagram illustrating an example, non-limiting embodiment of path/port mapping functionality employed in conjunction with polarization rotation functions in a downlink signal path of a multi-band communications system in accordance with various aspects described herein.

In various embodiments, DL swapping may be adapted to address external PIM sources oriented in other angles or polarizations (i.e., other than at a +45 degree tilt or a −45 degree tilt). In exemplary embodiments, DL polarization may be rotated to be orthogonal to the determined orientation/polarization of an external PIM source. FIG. 11F is a block diagram 1170 illustrating an example, non-limiting embodiment of path/port mapping functionality (1114, 1116) employed in conjunction with polarization rotation functions (1172, 1174) in a downlink signal path of a multi-band communications system in accordance with various aspects described herein. The communications system 1170 shown may correspond to the system 1140 of FIG. 11D, but with the addition of rotator functionality 1172, 1174. In various embodiments, the polarization of DL 1 may be rotated by rotator 1172 such that early RS are aligned with the PIM source and late RS are perpendicular to the PIM source, or vice versa. Additionally, or alternatively, the polarization of DL 2 may be rotated by rotator 1174 such that late RS are aligned with the PIM source and early RS are perpendicular to the PIM source, or vice versa. Polarization rotation may be performed by mixing the DL signals destined for each of the crossed-dipoles. In certain embodiments, rotators 1172 and 1174 may each be implemented using digital signal processing techniques (e.g., based on the equations $202p/202q/202r$ of FIGS. 2C-2E or equivalents of equations $202p/202q/202r$).

Figure 11G:
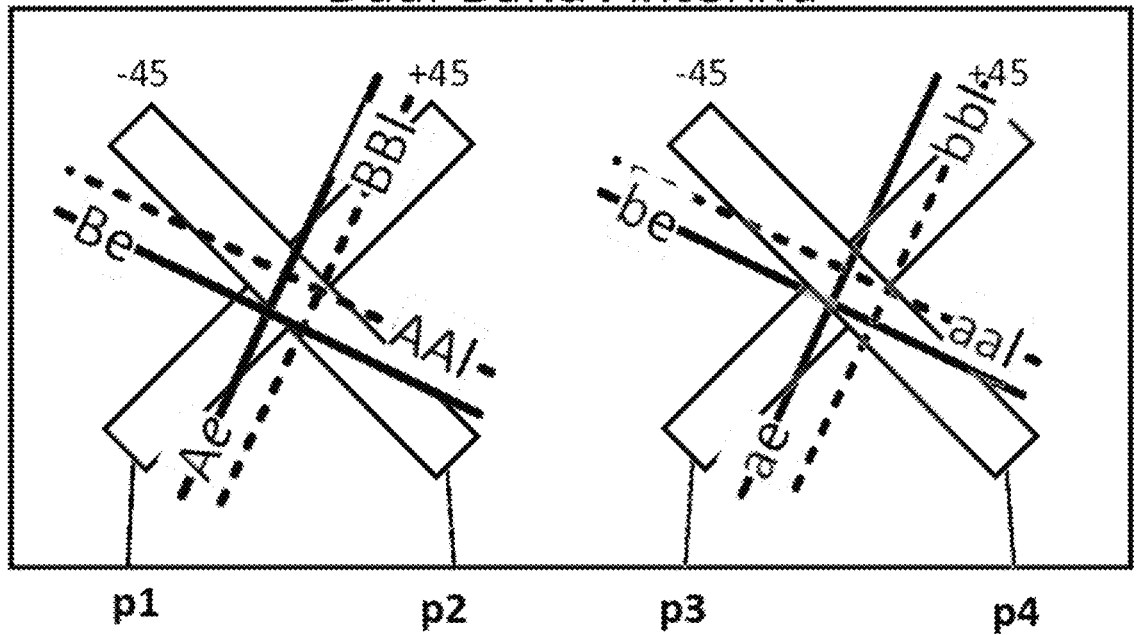
FIG. 11G illustrates a dual-band antenna with altered path/port mapping employed with polarization rotation in accordance with various aspects described herein.
Figure 11G:
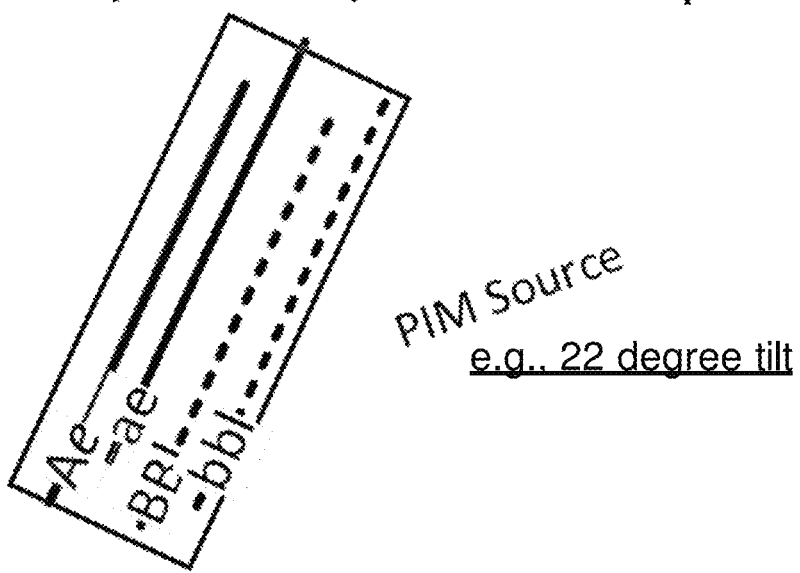

FIG. 11G illustrates a dual-band antenna with altered path/port mapping employed with polarization rotation in accordance with various aspects described herein. As an illustration of DL swapping and rotation, consider a case where an external PIM source with a determined tilt of 22 degrees is located in front of the antenna (e.g., 1180 of FIG. 11G). Here, DL signal constituents may be remapped, and the polarizations of DL 1 and DL 2 may be rotated to match the 22 degree tilt of the PIM source. By virtue of these manipulations, the PIM source may only receive early RS from DL 1 and late RS from DL 2 (i.e., DLs at different times), thereby avoiding generation of RS PIM. In this way, knowledge of RS timing can be used in conjunction with known antenna port polarizations and a determined PIM source polarization to (i) map the DL constituent signals to particular paths/ports and/or (ii) rotate the DL polarizations so as to facilitate avoidance generation of RS PIM.

It is to be appreciated and understood that rotation of the polarizations of DL signals (1172, 1174, etc.) can be performed in any suitable manner, such as in the RF domain via physical rotation of crossed-dipoles of an antenna.

It is also to be appreciated and understood that the quantities of base stations, DLs or carriers, constituent signals per DL, carrier combiners, paths, mappers, rotators, antennas, crossed-dipole pairs, PIM sources, etc. shown in one or more of FIGS. 11B-11D and 11F are merely exemplary. That is, the systems shown in FIGS. 11B-11D and 11F may include any quantities of (e.g., more or fewer) base stations, DLs or carriers, constituent signals per DL, carrier combiners, paths, mapper blocks, rotators, antennas, crossed-dipole pairs, PIM sources, etc.

More generally, it is also to be appreciated and understood that the quantities and/or arrangement of systems, devices, components, elements, etc. shown in any of the various drawing figures described above are merely exemplary. In practice, there may be additional systems, devices, components, and/or elements, fewer systems, devices, components, and/or elements, different systems, devices, components, and/or elements, or differently arranged systems, devices, components, and/or elements than those shown in the various drawing figures. Furthermore, two or more systems, devices, components, or elements may be implemented within a single system, device, component, or element, or a single system, device, component, or element may be implemented as multiple systems, devices, components, or elements. Additionally, or alternatively, a set of systems, devices, components, or elements may perform one or more functions described as being performed by another set of systems, devices, components, or elements.

It is further to be understood and appreciated that, although various of the drawing figures are described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 12A:
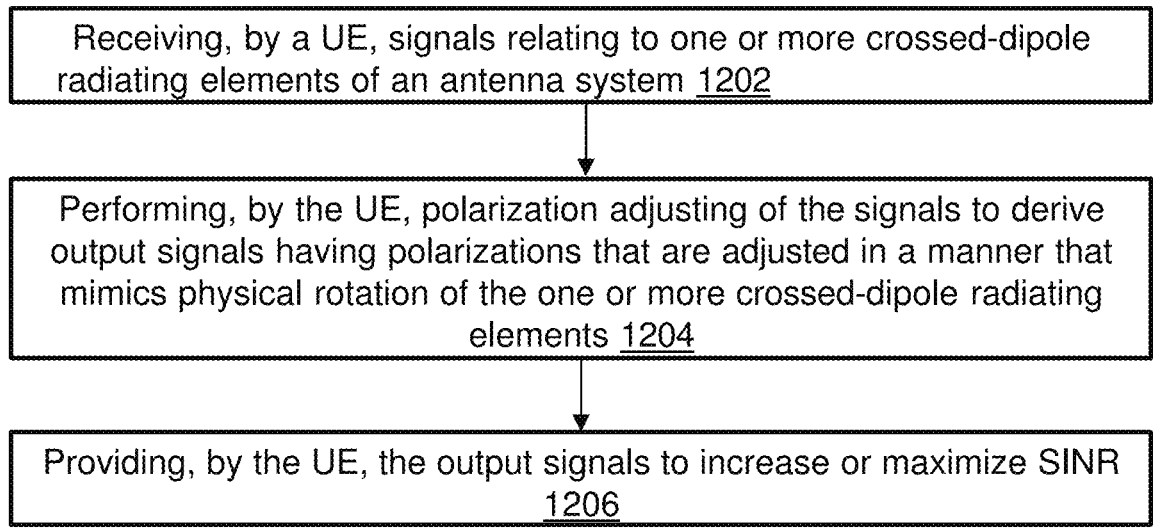
FIG. 12A depicts an illustrative embodiment of a method in accordance with various aspects described herein.

FIG. 12A depicts an illustrative embodiment of a method 1210 in accordance with various aspects described herein. In some embodiments, one or more process blocks of FIG. 12A can be performed by a UE.

At 1202, the method can include receiving, by a UE, signals relating to one or more crossed-dipole radiating elements of an antenna system. For example, similar to that described elsewhere herein, a UE may receive signals relating to one or more crossed-dipole radiating elements of an antenna system.

At 1204, the method can include performing, by the UE, polarization adjusting of the signals to derive output signals having polarizations that are adjusted in a manner that mimics physical rotation of the one or more crossed-dipole radiating elements. For example, similar to that described elsewhere herein, the UE may perform polarization adjusting of the signals to derive output signals having polarizations that are adjusted in a manner that mimics physical rotation of the one or more crossed-dipole radiating elements.

At 1206, the method can include providing, by the UE, the output signals to increase or maximize signal to noise ratio. For example, similar to that described elsewhere herein, the UE may provide the output signals to increase or maximize signal to noise ratio.

While for purposes of simplicity of explanation, the respective processes are shown and described as a series of blocks in FIG. 12A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 12B depicts an illustrative embodiment of a method 1230 in accordance with various aspects described herein. In some embodiments, one or more process blocks of FIG. 12B can be performed by a radio, a baseband unit (e.g., one or more distributed units), or any other device or system of a radio access network (RAN).

At 1232, the method can include obtaining data regarding interference or passive intermodulation (PIM) originating from one or more interference sources. For example, similar to that described elsewhere herein, data regarding interference or passive intermodulation (PIM) originating from one or more interference sources may be obtained.

At 1234, the method can include electronically adjusting polarizations of signals relating to radiating elements of an antenna system, the electronically adjusting being performed for multiple frequency bands and facilitating mitigation of the interference or the PIM. For example, similar to that described elsewhere herein, polarizations of signals relating to radiating elements of an antenna system may be electronically adjusted, the electronically adjusting being performed for multiple frequency bands and facilitating mitigation of the interference or the PIM.

While for purposes of simplicity of explanation, the respective processes are shown and described as a series of blocks in FIG. 12B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13:
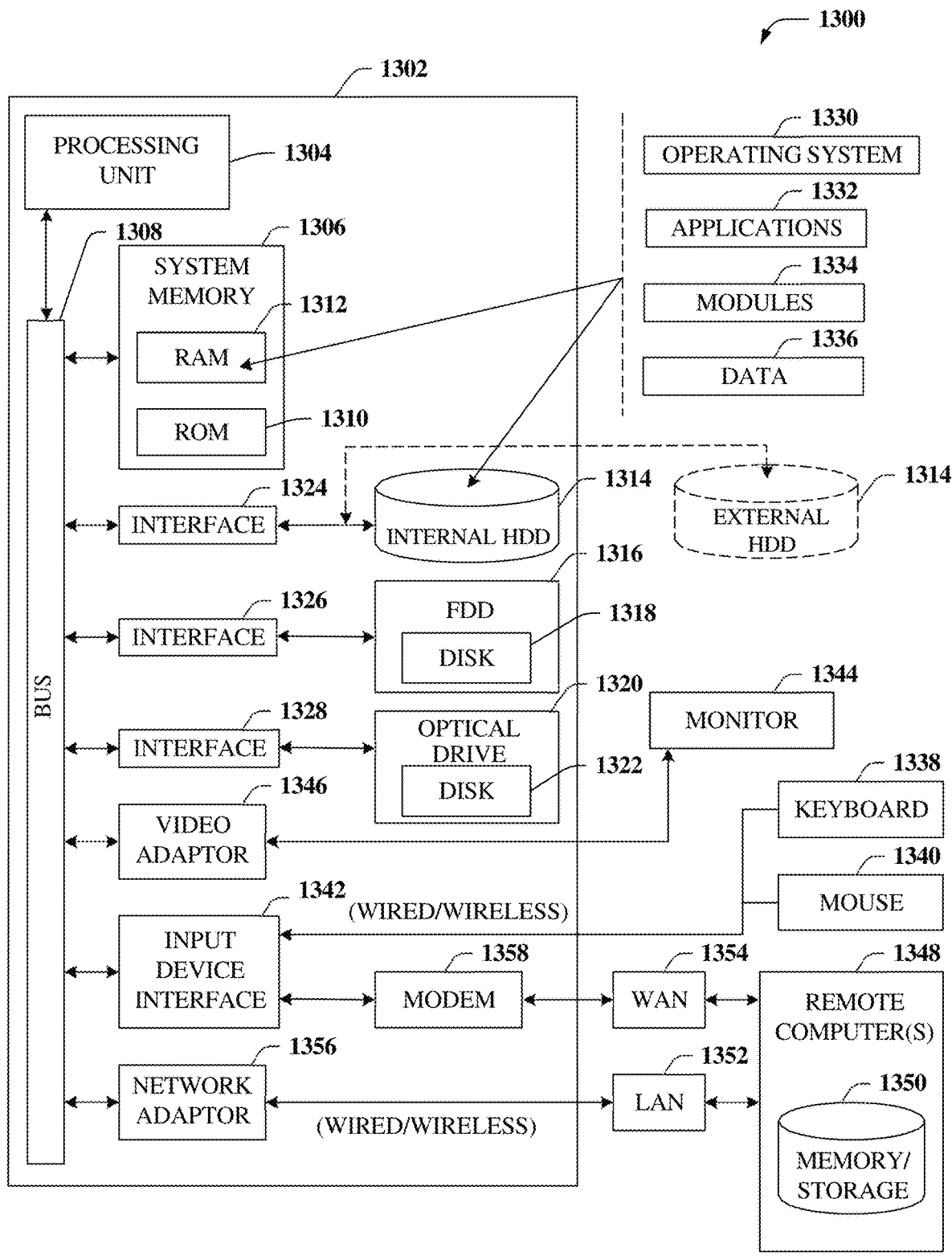
FIG. 13 is a block diagram of an example, non-limiting embodiment of a computing environment in accordance with various aspects described herein.

Turning now to FIG. 13, there is illustrated a block diagram of a computing environment in accordance with various aspects described herein. To provide additional context for various embodiments of the embodiments described herein, FIG. 13 and the following discussion are intended to provide a brief, general description of a suitable computing environment 1300 in which the various embodiments of the subject disclosure can be implemented. In particular, computing environment 1300 can be used in the implementation of network elements 150, 152, 154, 156, access terminal 112, base station or access point 122, switching device 132, media terminal 142, one or more (or a combination) of control and monitoring/detection units, component(s) of one or more of the systems of FIGS. 11B-11D and 11F, etc. Each of these devices can be implemented via computer-executable instructions that can run on one or more computers, and/or in combination with other program modules and/or as a combination of hardware and software. For example, computing environment 1300 can facilitate, in whole or in part, providing or effecting of polarization shifting for SINR improvement or optimization and/or to mitigate or avoid detected interference/PIM.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 13, the example environment can comprise a computer 1302, the computer 1302 comprising a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multiprocessor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 comprises ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also comprise a high-speed RAM such as static RAM for caching data.

The computer 1302 further comprises an internal hard disk drive (HDD) 1314 (e.g., EIDE, SATA), which internal HDD 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The HDD 1314, magnetic FDD 1316 and optical disk drive 1320 can be connected to the system bus 1308 by a hard disk drive interface 1324, a magnetic disk drive interface 1326 and an optical drive interface 1328, respectively. The hard disk drive interface 1324 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, comprising an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can comprise a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of display device can be also connected to the system bus 1308 via an interface, such as a video adapter 1346. It will also be appreciated that in alternative embodiments, a monitor 1344 can also be any display device (e.g., another computer having a display, a smart phone, a tablet computer, etc.) for receiving display information associated with computer 1302 via any communication means, including via the Internet and cloud-based networks. In addition to the monitor 1344, a computer typically comprises other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically comprises many or all of the elements described relative to the computer 1302, although, for purposes of brevity, only a remote memory/storage device 1350 is illustrated. The logical connections depicted comprise wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the LAN 1352 through a wired and/or wireless communications network interface or adapter 1356. The adapter 1356 can facilitate wired or wireless communication to the LAN 1352, which can also comprise a wireless AP disposed thereon for communicating with the adapter 1356.

When used in a WAN networking environment, the computer 1302 can comprise a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In various embodiments, a method comprises forming multiple beams associated with subarrays of an antenna, the antenna being part of a communications system, and performing different polarization rotations of signals associated with beams of the multiple beams that at least partially overlap so as to reduce interference imposed by those signals on one another.

In some embodiments, the multiple beams comprise downlink (DL) beams. In some embodiments, polarizations of received signals associated with uplink (UL) beams are independent of polarizations of transmitted signals associated with the DL beams.

In some embodiments, the multiple beams comprise uplink (UL) beams. In some embodiments, polarizations of transmitted signals associated with downlink (DL) beams are independent of polarizations of received signals associated with the UL beams.

In some embodiments, the performing the different polarization rotations comprises electronically rotating signals associated with a subset of the subarrays of the antenna differently from signals associated with one or more other subsets of the subarrays.

In some embodiments, the performing the different polarization rotations comprises electronically rotating signals associated with one row of the subarrays of the antenna differently from signals associated with one or more neighboring rows of the subarrays of the antenna so as to increase or maximize beam isolation in an elevation direction. In some embodiments, the electronically rotating the signals associated with the one row differently from the signals associated with the one or more neighboring rows enables a reduction in a size of the antenna.

In some embodiments, the performing the different polarization rotations comprises electronically rotating signals associated with one column of the subarrays of the antenna differently from signals associated with one or more neighboring columns of the subarrays of the antenna so as to increase or maximize beam isolation in an azimuth direction.

In some embodiments, the performing the different polarization rotations results in a first polarization for a first group of signals and a second polarization for a second group of signals that is orthogonal to the first polarization.

In some embodiments, the communications system comprises a time division duplex (TDD) communications system or a frequency division duplex (FDD) communications system.

In some embodiments, the performing the different polarization rotations does not affect one or more directions or one or more shapes of the beams.

In various embodiments, a non-transitory machine-readable medium, comprises executable instructions that, when executed by a processing system including a processor and associated with an antenna of a communications system, facilitate performance of operations. The operations include forming multiple beams associated with subarrays of the antenna, and performing polarization rotations of signals associated with beams of the multiple beams that at least partially overlap so as to mitigate interference imposed by those signals on one another.

In some embodiments, the performing the polarization rotations comprises electronically rotating signals associated with a subset of the subarrays of the antenna differently from signals associated with one or more other subsets of the subarrays.

In some embodiments, the performing the polarization rotations comprises electronically rotating signals associated with one row of the subarrays of the antenna differently from signals associated with one or more neighboring rows of the subarrays of the antenna so as to increase or maximize beam isolation in an elevation direction. In some embodiments, the electronically rotating the signals associated with the one row differently from the signals associated with the one or more neighboring rows enables a reduction in a size of the antenna.

In some embodiments, the performing the polarization rotations comprises electronically rotating signals associated with one column of the subarrays of the antenna differently from signals associated with one or more neighboring columns of the subarrays of the antenna so as to increase or maximize beam isolation in an azimuth direction.

In some embodiments, the performing the polarization rotations does not affect one or more directions or one or more shapes of the beams.

In various embodiments, a device comprises a processing system including a processor; and a memory that stores executable instructions that, when executed by the processing system, facilitate performance of operations. The operations include forming a beam using one or more antennas, and performing one or more polarization rotations of one or more signals associated with the beam to reduce interference caused by an overlap of the beam with another beam associated with another device.

In some embodiments, the operations further comprise receiving instructions from a communications system requesting the one or more polarization rotations based on the communications system detecting the interference.

In various embodiments, a method comprises obtaining, from a communications system, information regarding signal conditions associated with multiple uplink (UL) beams, electronically rotating polarizations of received signals associated with the multiple UL beams based on the information, resulting in adjusted signals, and performing signal conditioning on the adjusted signals to increase a signal to noise ratio based on the information.

In some embodiments, the signal conditioning involves mitigation or cancellation of interference. In some embodiments, the interference comprises passive intermodulation (PIM).

In some embodiments, the communications system is associated with a panel antenna system that comprises an antenna integrated radio (AIR) that includes a massive multiple-input-multiple-output (MIMO) antenna integrated with a low band passive antenna in a single form factor.

In some embodiments, the method further comprises electronically rotating polarizations of signals associated with multiple downlink (DL) beams.

In some embodiments, the electronically rotating is performed for a select number of UL beams associated with different frequency bands of multiple frequency bands and is performed in a same or a different manner for signals in the different frequency bands.

In some embodiments, the signal conditioning is performed for an aggregate signal associated with the multiple UL beams, wherein the signal conditioning is performed in a panel antenna system, a remote radio unit (RRU), a remote radio head (RRH), a Common Public Radio Interface (CPRI) device, a baseband unit, or another device in a radio access network (RAN).

In some embodiments, the electronically rotating is performed in a panel antenna system, a remote radio unit (RRU), a remote radio head (RRH), a Common Public Radio Interface (CPRI) device, a baseband unit, or another device in a radio access network (RAN), wherein the electronically rotating is performed in coordination with signal conditioning for aggregated beams.

In some embodiments, the communications system comprises a time division duplex (TDD) communications system or a frequency division duplex (FDD) communications system.

In some embodiments, the electronically rotating the polarizations does not affect one or more directions or one or more shapes of the UL beams.

In various embodiments, an apparatus comprises a processing system configured to perform operations. The operations include obtaining, from a communications system, information regarding signal conditions associated with multiple uplink (UL) beams, electronically rotating polarizations of received signals associated with the multiple UL beams based on the information, resulting in adjusted signals, and performing signal conditioning on the adjusted signals to increase a signal to noise ratio based on the information.

In some embodiments, the signal conditioning involves mitigation or cancellation of interference. In some embodiments, the interference comprises passive intermodulation (PIM).

In some embodiments, the communications system is associated with a panel antenna system that comprises an antenna integrated radio (AIR) that includes a massive multiple-input-multiple-output (MIMO) antenna integrated with a low band passive antenna in a single form factor.

In some embodiments, the operations further comprise electronically rotating polarizations of signals associated with multiple downlink (DL) beams.

In some embodiments, the electronically rotating is performed for a select number of UL beams associated with different frequency bands of multiple frequency bands and is performed in a same or a different manner for signals in the different frequency bands.

In various embodiments, a non-transitory machine-readable medium comprises executable instructions that, when executed by a processing system including a processor, facilitate performance of operations. The operations include obtaining, from a communications system, information regarding signal conditions associated with multiple uplink (UL) beams, electronically adjusting polarizations of received signals associated with the multiple UL beams based on the information, resulting in adjusted signals, and performing signal conditioning on the adjusted signals to increase a signal to noise ratio based on the information.

In some embodiments, the signal conditioning involves mitigation or cancellation of interference. In some embodiments, the interference comprises passive intermodulation (PIM).

In some embodiments, the communications system is associated with a panel antenna system that comprises an antenna integrated radio (AIR) that includes a massive multiple-input-multiple-output (MIMO) antenna integrated with a low band passive antenna in a single form factor.

In various embodiments, a method comprises forming one or more downlink (DL) beams associated with subarrays of an antenna, the antenna being part of a communications system, and performing polarization adjusting for signals associated with the one or more DL beams such that each of the signals is oriented in a particular polarization, thereby improving signal reception by user equipment (UEs) associated with the one or more DL beams.

In some embodiments, the performing the polarization adjusting comprises electronically rotating a polarization of each of the signals.

In some embodiments, the antenna operates in multiple frequency bands, and the performing the polarization adjusting is for a select number of frequency bands of the multiple frequency bands.

In some embodiments, polarizations associated with uplink (UL) beams are independent of polarizations associated with the one or more DL beams.

In some embodiments, the performing the polarization adjusting of a signal reduces propagation loss of that signal in the particular polarization.

In some embodiments, the performing the polarization adjusting comprises rotating signals associated with a subset of radiating elements of the antenna.

In some embodiments, the performing the polarization adjusting comprises utilizing only a first dipole of a dual-polarized antenna element of the antenna, and not a second dipole of the dual-polarized antenna element, to transmit signals for a particular UE, thereby reducing transmit power.

In some embodiments, the communications system comprises a time division duplex (TDD) communications system or a frequency division duplex (FDD) communications system.

In some embodiments, the performing the polarization adjusting does not affect one or more directions or one or more shapes of the one or more DL beams.

In some embodiments, the particular polarization is based on data provided by one or more of the UEs.

In various embodiments, a non-transitory machine-readable medium, comprises executable instructions that, when executed by a processing system including a processor and associated with an antenna system, facilitate performance of operations. The operations include forming one or more downlink (DL) beams associated with subarrays of the antenna system, the antenna system being part of a communications system, and performing polarization rotation of signals associated with the one or more DL beams such that each of the signals is oriented in a particular polarization, thereby improving signal reception by user equipment (UEs) associated with the one or more DL beams.

In some embodiments, the performing the polarization rotation comprises electronically rotating a polarization of each of the signals.

In some embodiments, the antenna system operates in multiple frequency bands, wherein the performing the polarization rotation is for a select number of frequency bands of the multiple frequency bands.

In some embodiments, the performing the polarization rotation of a signal reduces propagation loss of that signal in the particular polarization.

In some embodiments, the performing the polarization rotation comprises rotating signals associated with a subset of radiating elements of the antenna system. In some embodiments, the performing the polarization rotation involves utilizing only a first dipole of a dual-polarized antenna element of the antenna system, and not a second dipole of the dual-polarized antenna element, to transmit signals for a particular UE, thereby reducing transmit power.

In some embodiments, the performing the polarization rotation does not affect one or more directions or one or more shapes of the one or more DL beams.

In some embodiments, the particular polarization is based on data provided by one or more of the UEs.

In various embodiments, a device comprises a processing system including a processor; and a memory that stores executable instructions that, when executed by the processing system, facilitate performance of operations. The operations include forming an uplink (UL) beam using one or more antennas, and performing polarization adjusting for signals associated with the UL beam such that each of the signals is oriented in a particular polarization, thereby improving signal reception by a communications system associated with the UL beam.

In some embodiments, the operations further comprise receiving instructions from the communications system that request the polarization adjusting be in the particular polarization, wherein the communications system determines the particular polarization based on a location of the device, a comparative location of the device and one or more other devices, or a combination thereof.

In various embodiments, a device comprises a processing system including a processor and associated with a user equipment (UE); and a memory that stores executable instructions that, when executed by the processing system, facilitate performance of operations. The operations include determining a polarization for a signal that enables a signal to noise ratio to be increased, and performing polarization adjusting by rotating the signal according to the polarization, resulting in an adjusted signal.

In some embodiments, the operations further comprise determining the signal to noise ratio, wherein the determining the polarization is responsive to the determining the signal to noise ratio.

In some embodiments, the signal comprises a downlink (DL) signal received via a DL beam. In some embodiments, the performing the polarization adjusting enables the UE to form a beam with a particular polarization that matches a polarization of the DL beam.

In some embodiments, the signal comprises an uplink (UL) signal, wherein the operations further comprise transmitting the adjusted signal to a communications system via an UL beam.

In some embodiments, the operations further comprise receiving an instruction from a communications system to use the polarization for the signal, wherein the polarization is identified by the communications system in accordance with information regarding the signal to noise ratio.

In some embodiments, the determining the polarization adjusting is based at least in part on an orientation of the UE. In some embodiments, the device further comprises one or more sensors configured to provide information regarding the orientation, wherein the one or more sensors comprise one or more accelerometers, one or more gyroscopes, or a combination thereof.

In some embodiments, the UE operates in multiple frequency bands, wherein the rotating is performed for a select number of frequency bands of the multiple frequency bands.

In some embodiments, a polarization of an uplink (UL) beam is independent of a polarization of a downlink (DL) beam.

In some embodiments, the performing the polarization adjusting does not affect one or more directions or one or more shapes of a beam associated with the signal.

In various embodiments, a method comprises determining, by a system of a user equipment (UE), a polarization for a signal that enables a signal to noise ratio to be increased, and performing polarization adjusting by rotating the signal according to the polarization, resulting in an adjusted signal.

In some embodiments, the method further comprises determining the signal to noise ratio, wherein the determining the polarization is responsive to the determining the signal to noise ratio.

In some embodiments, the signal comprises a downlink (DL) signal received via a DL beam.

In some embodiments, the signal comprises an uplink (UL) signal, wherein the method further comprises transmitting the adjusted signal to a communications system via an UL beam. In some embodiments, the method further comprises receiving an instruction from the communications system to use the polarization for the signal, wherein the polarization is identified by the communications system in accordance with information regarding the signal to noise ratio.

In some embodiments, the determining the polarization adjusting is based at least in part on an orientation of the UE. In some embodiments, the UE comprises one or more sensors configured to provide information regarding the orientation, wherein the one or more sensors comprise one or more accelerometers, one or more gyroscopes, or a combination thereof.

In various embodiments, a non-transitory machine-readable medium comprises executable instructions that, when executed by a processing system including a processor and associated with a user equipment (UE), facilitate performance of operations. The operations include obtaining a polarization for an uplink (UL) signal that enables a signal to noise ratio of the UL signal to be increased, performing polarization adjusting by rotating the UL signal according to the polarization, resulting in an adjusted UL signal, and transmitting the adjusted UL signal to a communications system.

In some embodiments, the obtaining comprises receiving instructions from the communications system for obtaining the polarization for the UL signal, wherein the polarization is determined by the communications system based on data regarding the signal to noise ratio.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, which may be used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. One or more embodiments can employ various AI-based schemes for carrying out various embodiments thereof. Moreover, a classifier can be employed. A classifier is a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to, training data. Other directed and undirected model classification approaches comprise, e.g., naïve Bayes, Bayesian networks, decision trees, neural networks, fuzzy logic models, and probabilistic classification models providing different patterns of independence. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

The foregoing embodiments can be combined in whole or in part with the embodiments described in any of U.S. Patent Publication No. 2022/0069855 (published on Mar. 3, 2022), U.S. patent application Ser. No. 17/709,724 (filed on Mar. 31, 2022) (issued as U.S. Pat. No. 11,476,585 on Oct. 18, 2022), and U.S. patent application Ser. No. 17/825,565 (filed on May 26, 2022) (issued as U.S. Pat. No. 11,515,652 on Nov. 29, 2022). For instance, embodiments of one or more of the aforementioned U.S. publication(s)/application(s)/patent(s) can be combined in whole or in part with embodiments of the subject disclosure. For example, one or more features and/or embodiments described in one or more of the aforementioned U.S. publication(s)/application(s)/patent(s) can be used in conjunction with (or as a substitute for) one or more features and/or embodiments described herein, and vice versa. Accordingly, all sections of the aforementioned U.S. publication(s)/application(s)/patent(s) are incorporated herein by reference in their entirety.

What is claimed is:

1. A method comprising:
    obtaining, from a communications system, information regarding signal conditions associated with multiple uplink (UL) beams;
    electronically rotating polarizations of received signals associated with the multiple UL beams based on the information, resulting in polarization adjusted signals; and
    performing signal conditioning on the polarization adjusted signals based on the information to increase a signal to noise ratio of received signals associated with the multiple UL beams.

2. The method of claim 1, wherein the signal conditioning involves mitigation or cancellation of interference.

3. The method of claim 2, wherein the interference comprises passive intermodulation (PIM).

4. The method of claim 1, wherein the communications system is associated with a panel antenna system that comprises an antenna integrated radio (AIR) that includes a massive multiple-input-multiple-output (MIMO) antenna integrated with a low band passive antenna in a single form factor.

5. The method of claim 1, further comprising electronically rotating polarizations of signals associated with multiple downlink (DL) beams.

6. The method of claim 1, wherein the electronically rotating is performed for a select number of UL beams associated with different frequency bands of multiple frequency bands and is performed in a same or a different manner for signals in the different frequency bands.

7. The method of claim 1, wherein the signal conditioning is performed for an aggregate signal associated with the multiple UL beams, and wherein the signal conditioning is performed in a panel antenna system, a remote radio unit (RRU), a remote radio head (RRH), a Common Public Radio Interface (CPRI) device, a baseband unit, or another device in a radio access network (RAN).

8. The method of claim 1, wherein the electronically rotating is performed in a panel antenna system, a remote radio unit (RRU), a remote radio head (RRH), a Common Public Radio Interface (CPRI) device, a baseband unit, or another device in a radio access network (RAN), and wherein the electronically rotating is performed in coordination with signal conditioning for aggregated beams.

9. The method of claim 1, wherein the communications system comprises a time division duplex (TDD) communications system or a frequency division duplex (FDD) communications system.

10. The method of claim 1, wherein the electronically rotating the polarizations does not affect one or more directions or one or more shapes of the UL beams.

11. An apparatus, comprising:
    a processing system configured to perform operations, comprising:
    obtaining, from a communications system, information regarding signal conditions associated with multiple uplink (UL) beams;
    electronically rotating polarizations of received signals associated with the multiple UL beams based on the information, resulting in polarization adjusted signals; and
    performing signal conditioning on the polarization adjusted signals based on the information to increase a signal to noise ratio of received signals associated with the multiple UL beams.

12. The apparatus of claim 11, wherein the signal conditioning involves mitigation or cancellation of interference.

13. The apparatus of claim 12, wherein the interference comprises passive intermodulation (PIM).

14. The apparatus of claim 11, wherein the communications system is associated with a panel antenna system that comprises an antenna integrated radio (AIR) that includes a massive multiple-input-multiple-output (MIMO) antenna integrated with a low band passive antenna in a single form factor.

15. The apparatus of claim 11, wherein the operations further comprise electronically rotating polarizations of signals associated with multiple downlink (DL) beams.

16. The apparatus of claim 11, wherein the electronically rotating is performed for a select number of UL beams associated with different frequency bands of multiple frequency bands and is performed in a same or a different manner for signals in the different frequency bands.

17. A non-transitory machine-readable medium, comprising executable instructions that, when executed by a processing system including a processor, facilitate performance of operations, comprising:
 obtaining, from a communications system, information regarding signal conditions associated with multiple uplink (UL) beams;
 electronically adjusting polarizations of received signals associated with the multiple UL beams based on the information, resulting in polarization adjusted signals; and
 performing signal conditioning on the polarization adjusted signals based on the information to increase a signal to noise ratio of received signals associated with the multiple UL beams.

18. The non-transitory machine-readable medium of claim 17, wherein the signal conditioning involves mitigation or cancellation of interference.

19. The non-transitory machine-readable medium of claim 18, wherein the interference comprises passive intermodulation (PIM).

20. The non-transitory machine-readable medium of claim 17, wherein the communications system is associated with a panel antenna system that comprises an antenna integrated radio (AIR) that includes a massive multiple-input-multiple-output (MIMO) antenna integrated with a low band passive antenna in a single form factor.

* * * * *